United States Patent [19]
Harumatsu et al.

[11] Patent Number: 6,134,374
[45] Date of Patent: *Oct. 17, 2000

[54] METHOD AND APPARATUS FOR PROCESSING PICTURE INFORMATION, AND RECORDING MEDIUM

[75] Inventors: Mitsuo Harumatsu; Takeo Ohishi, both of Yokohama, Japan

[73] Assignee: Victor Company of Japan, Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,965

[22] Filed: Feb. 24, 1997

[30]  Foreign Application Priority Data

May 17, 1995 [JP] Japan ................................... 7-142702
Aug. 28, 1995 [JP] Japan ................................... 7-242426
Feb. 27, 1996 [JP] Japan ................................... 8-065258

[51] Int. Cl.[7] .............................. H04N 5/91; H04N 5/917
[52] U.S. Cl. ................................................ 386/33; 386/27
[58] Field of Search ................................ 386/33, 27, 34, 386/1, 21, 109, 111, 112, 46, 76, 2, 22, 25; 360/32; H04N 5/91, 5/917

[56]  References Cited

U.S. PATENT DOCUMENTS 5,841,936 11/1998 Kobayashi ................................ 386/33
5,848,220 12/1998 Henmi et al. ............................. 386/33

OTHER PUBLICATIONS

"Future of the Image Information Recording Technologies" by C. Yamamitsu; pp., 1222–1229 (w/English translation).

*Primary Examiner*—Robert Chevalier
*Attorney, Agent, or Firm*—Pollock, Vande Sande & Amernick

[57] ABSTRACT

Input picture information is divided into first and second division-resultant signals. Y-signal DCT blocks, Cr-signal DCT blocks, and Cb-signal DCT blocks are generated from the first division-resultant signal. Y-signal DCT blocks, Cr-signal DCT blocks, and Cb-signal DCT blocks are generated from the second division-resultant signal. Dummy DCT blocks are generated which are distinguishable from the Y-signal DCT blocks related to the first and second division-resultant signals. The Y-signal DCT blocks, the Cr-signal DCT blocks, and the Cb-signal DCT blocks related to the first division-resultant signal, and the dummy DCT blocks are grouped into macro-blocks each having two Y-signal DCT blocks, one Cr-signal DCT block, one Cb-signal DCT block, and two dummy DCT blocks to modify the first-division-resultant signal into a first modification-resultant signal. The Y-signal DCT blocks, the Cr-signal DCT blocks, and the Cb-signal DCT blocks related to the second division-resultant signal, and the dummy DCT blocks are grouped into macro-blocks each having two Y-signal DCT blocks, one Cr-signal DCT block, one Cb-signal DCT block, and two dummy DCT blocks to modify the second division-resultant signal into a second modification-resultant signal. The first modification-resultant signal is compressed by DCT and variable length encoding while a data amount of the first compression-resultant signal per given number of macro-blocks is maintained at a fixed amount. The second modification-resultant signal is similarly compressed.

37 Claims, 52 Drawing Sheets

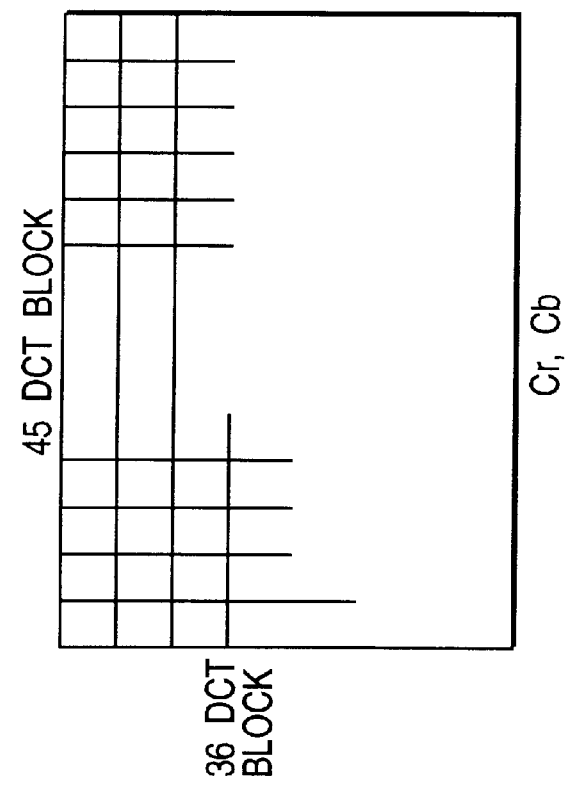
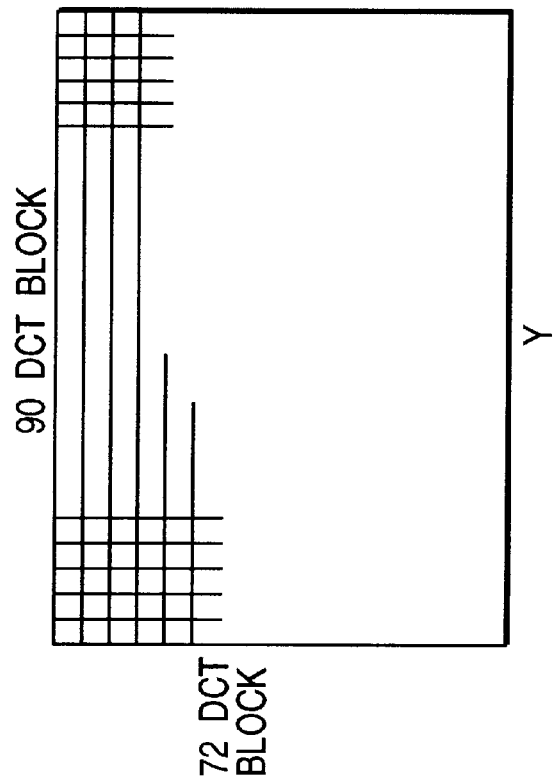

FIG. 11

Si,0 AND Si,2

| 0 | 11 | 12 | 23 | 24 | ← 8×8(Y) |
| 1 | 10 | 13 | 22 | 25 | |
| 2 | 9 | 14 | 21 | 26 | ← 32×8(Y), 8×8(Cr,Cb) |
| 3 | 8 | 15 | 20 | | |
| 4 | 7 | 16 | 19 | | |
| 5 | 6 | 17 | 18 | | |

Si,1 AND Si,3

|   |   | 8 | 9 | 20 | 21 |
|   |   | 7 | 10 | 19 | 22 |
|   |   | 6 | 11 | 18 | 23 |
| 0 | 5 | 12 | 17 | 24 |
| 1 | 4 | 13 | 16 | 25 |
| 2 | 3 | 14 | 15 | 26 |

Si,4
i = 0~9

| 0 | 11 | 12 | 23 | 24 |
| 1 | 10 | 13 | 22 | |
| 2 | 9 | 14 | 21 | 25 |
| 3 | 8 | 15 | 20 | |
| 4 | 7 | 16 | 19 | 26 |
| 5 | 6 | 17 | 18 | |

525/60 SYSTEM

| 0 | 5 | 6 | 11 | 12 | 17 | 18 | 23 | 24 | ← 8×8(Y) |
| 1 | 4 | 7 | 10 | 13 | 16 | 19 | 22 | 25 | |
| 2 | 3 | 8 | 9 | 14 | 15 | 20 | 21 | 26 | ← 16×16(Y), 8×8(Cr,Cb) |

625/50 SYSTEM

FIG. 14

625/50 SYSTEM

| i \ j | 0 | 1 | 2 | 3 | 4 |
|---|---|---|---|---|---|
| 0 | S0,0 | S0,1 | S0,2 | S0,3 | S0,4 |
| 1 | S1,0 | S1,1 | S1,2 | S1,3 | S1,4 |
| 2 | S2,0 | S2,1 | S2,2 | S2,3 | S2,4 |
| 3 | S3,0 | S3,1 | S3,2 | S3,3 | S3,4 |
| 4 | S4,0 | S4,1 | S4,2 | S4,3 | S4,4 |
| 5 | S5,0 | S5,1 | S5,2 | S5,3 | S5,4 |
| 6 | S6,0 | S6,1 | S6,2 | S6,3 | S6,4 |
| 7 | S7,0 | S7,1 | S7,2 | S7,3 | S7,4 |
| 8 | S8,0 | S8,1 | S8,2 | S8,3 | S8,4 |
| 9 | S9,0 | S9,1 | S9,2 | S9,3 | S9,4 |
| 10 | S10,0 | S10,1 | S10,2 | S10,3 | S10,4 |
| 11 | S11,0 | S11,1 | S11,2 | S11,3 | S11,4 |

FIG. 13

525/60 SYSTEM

| i \ j | 0 | 1 | 2 | 3 | 4 |
|---|---|---|---|---|---|
| 0 | S0,0 | S0,1 | S0,2 | S0,3 | S0,4 |
| 1 | S1,0 | S1,1 | S1,2 | S1,3 | S1,4 |
| 2 | S2,0 | S2,1 | S2,2 | S2,3 | S2,4 |
| 3 | S3,0 | S3,1 | S3,2 | S3,3 | S3,4 |
| 4 | S4,0 | S4,1 | S4,2 | S4,3 | S4,4 |
| 5 | S5,0 | S5,1 | S5,2 | S5,3 | S5,4 |
| 6 | S6,0 | S6,1 | S6,2 | S6,3 | S6,4 |
| 7 | S7,0 | S7,1 | S7,2 | S7,3 | S7,4 |
| 8 | S8,0 | S8,1 | S8,2 | S8,3 | S8,4 |
| 9 | S9,0 | S9,1 | S9,2 | S9,3 | S9,4 |

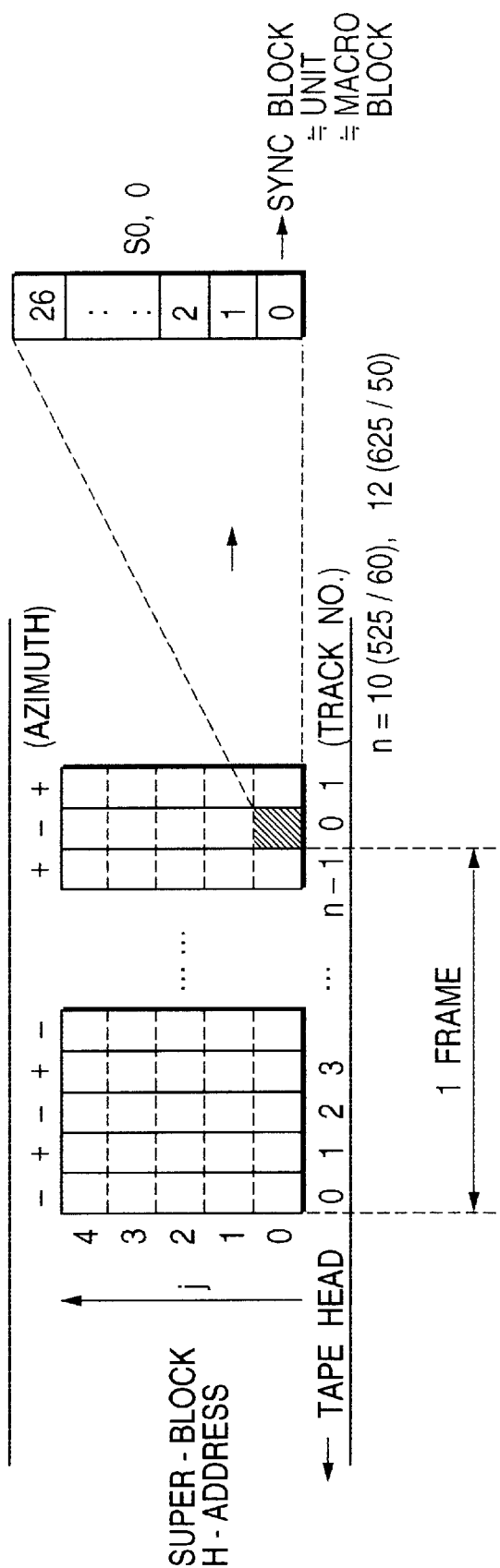

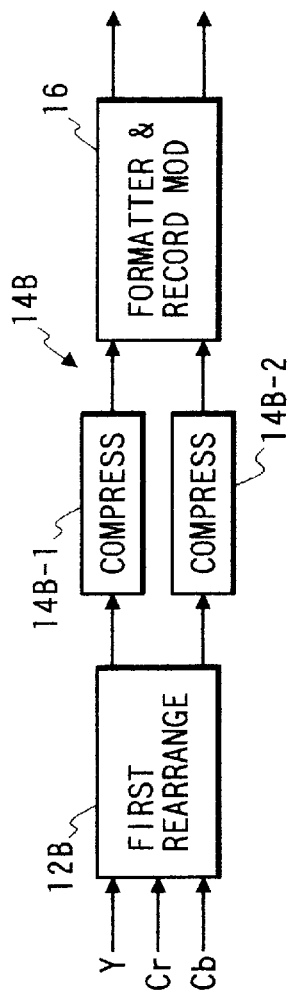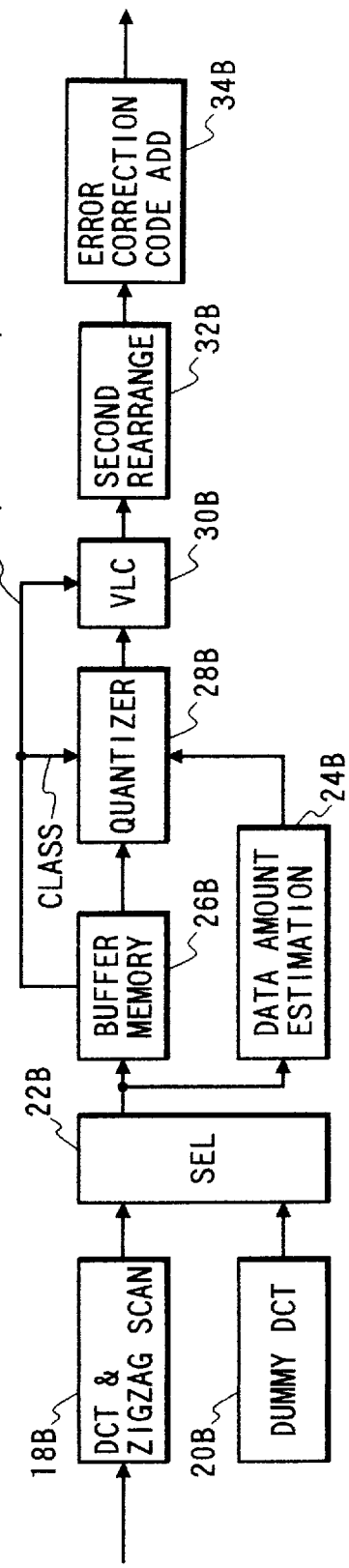

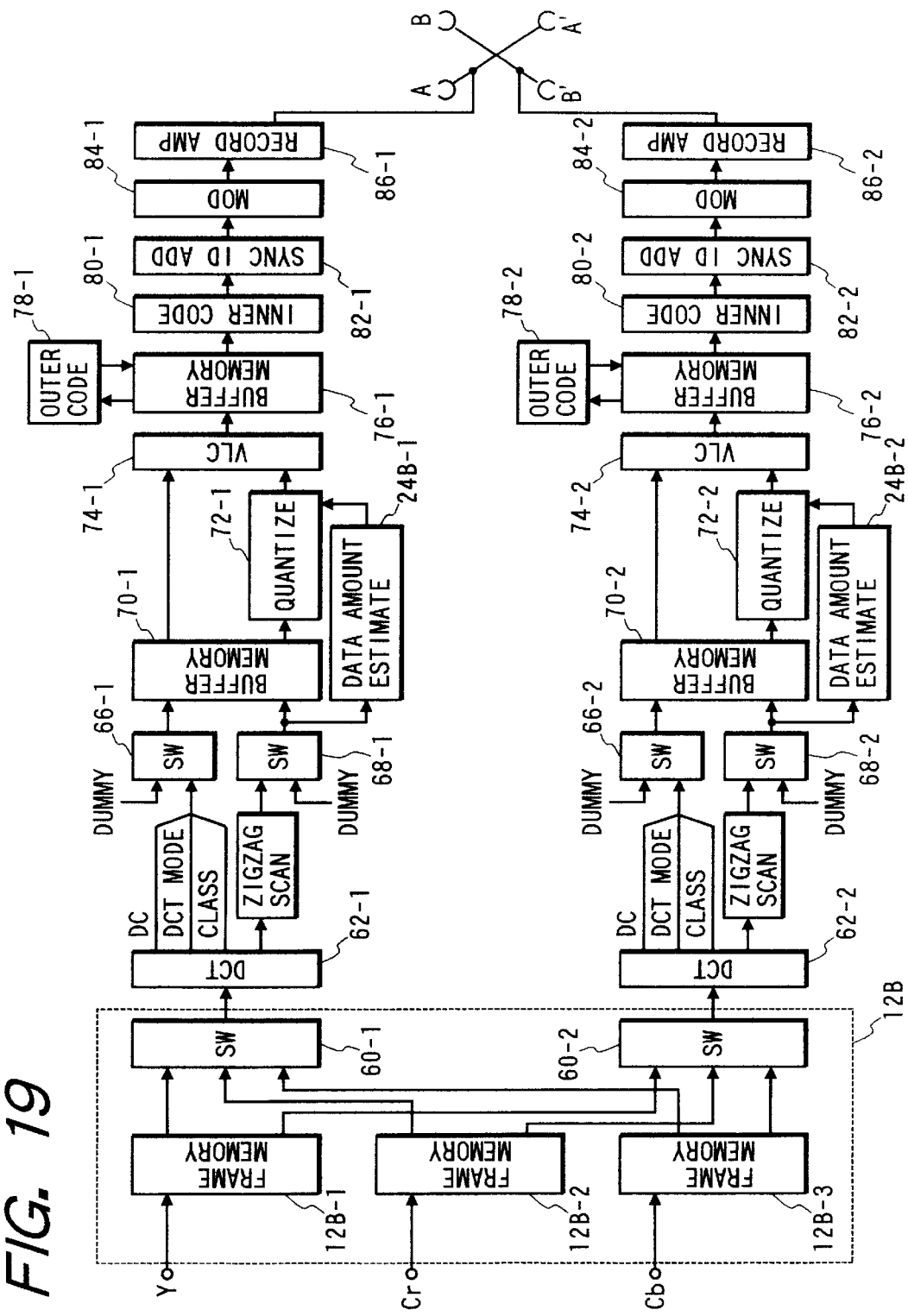

FIG. 28

| a0 | a5 | a6 | a11 | a12 | a17 | a18 | a23 | a24 |
|----|----|----|-----|-----|-----|-----|-----|-----|
| a1 | a4 | a7 | a10 | a13 | a16 | a19 | a22 | a25 |
| a2 | a3 | a8 | a9  | a14 | a15 | a20 | a21 | a26 |
| b0 | b5 | b6 | b11 | b12 | b17 | b18 | b23 | b24 |
| b1 | b4 | b7 | b10 | b13 | b16 | b19 | b22 | b25 |
| b2 | b3 | b8 | b9  | b14 | b15 | b20 | b21 | b26 |

GROUP "a" (rows 1–3), GROUP "b" (rows 4–6)

| $i$ | 0 | 1 | 2 | 3 | 4 |
|---|---|---|---|---|---|
| 0 | S0, 0 | S0, 1 | S0, 2 | S0, 3 | S0, 4 |
| 1 | S1, 0 | S1, 1 | S1, 2 | S1, 3 | S1, 4 |
| 2 | S2, 0 | S2, 1 | S2, 2 | S2, 3 | S2, 4 |
| 3 | S3, 0 | S3, 1 | S3, 2 | S3, 3 | S3, 4 |
| 4 | S4, 0 | S4, 1 | S4, 2 | S4, 3 | S4, 4 |
| 5 | S5, 0 | S5, 1 | S5, 2 | S5, 3 | S5, 4 |
| 6 | S6, 0 | S6, 1 | S6, 2 | S6, 3 | S6, 4 |
| 7 | S7, 0 | S7, 1 | S7, 2 | S7, 3 | S7, 4 |
| 8 | S8, 0 | S8, 1 | S8, 2 | S8, 3 | S8, 4 |
| 9 | S9, 0 | S9, 1 | S9, 2 | S9, 3 | S9, 4 |
| 10 | S10, 0 | S10, 1 | S10, 2 | S10, 3 | S10, 4 |
| 11 | S11, 0 | S11, 1 | S11, 2 | S11, 3 | S11, 4 |

525/60 SYSTEM (rows 0–9), 625/50 SYSTEM (rows 0–11)

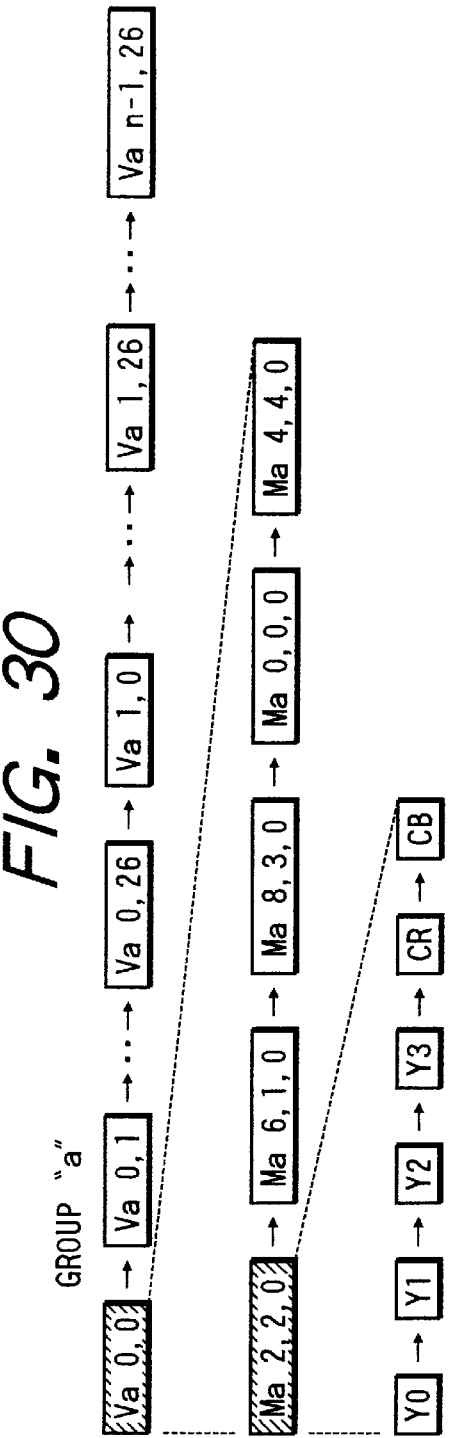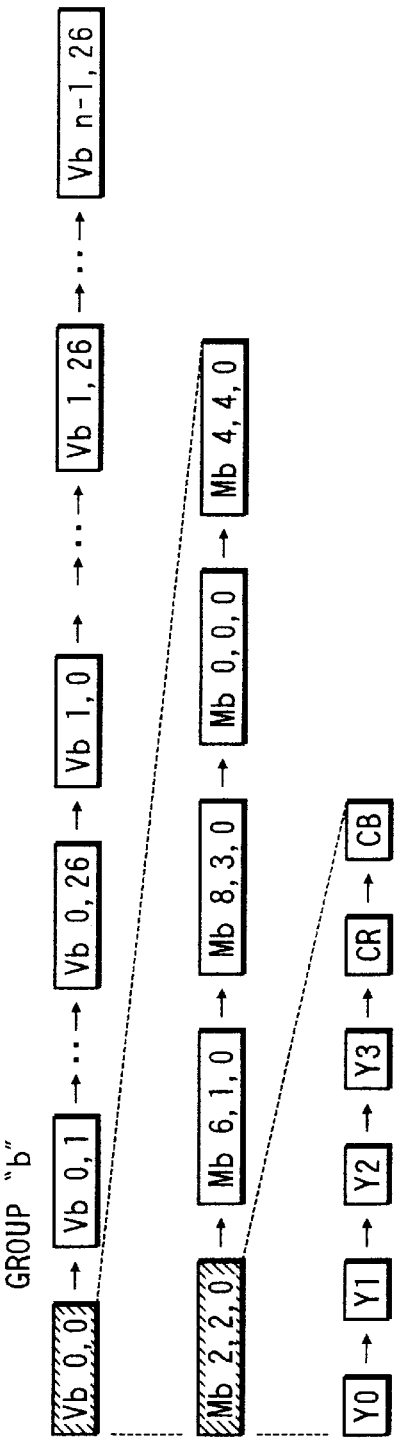

FIG. 35

| | | | | | | |
|---|---|---|---|---|---|---|
| VIDEO SECTOR "1" | Ua1,4,26<br>Ua1,4,25<br>:<br>Ua1,4,0<br>Ua1,3,26<br>Ua1,3,25<br>:<br>Ua1,3,0<br>Ua1,2,26<br>Ua1,2,25<br>:<br>Ua1,2,0<br>Ua1,1,26<br>Ua1,1,25<br>:<br>Ua1,1,0<br>Ua1,0,26<br>Ua1,0,25<br>:<br>Ua1,0,0 | Ub1,4,26<br>Ub1,4,25<br>:<br>Ub1,4,0<br>Ub1,3,26<br>Ub1,3,25<br>:<br>Ub1,3,0<br>Ub1,2,26<br>Ub1,2,25<br>:<br>Ub1,2,0<br>Ub1,1,26<br>Ub1,1,25<br>:<br>Ub1,1,0<br>Ub1,0,26<br>Ub1,0,25<br>:<br>Ub1,0,0 | ···<br>···<br>···<br>···<br>···<br>···<br>···<br>···<br>···<br>···<br>···<br>···<br>···<br>···<br>···<br>···<br>···<br>··· | Ua2m+1,4,26<br>Ua2m+1,4,25<br>:<br>Ua2m+1,4,0<br>Ua2m+1,3,26<br>Ua2m+1,3,25<br>:<br>Ua2m+1,3,0<br>Ua2m+1,2,26<br>Ua2m+1,2,25<br>:<br>Ua2m+1,2,0<br>Ua2m+1,1,26<br>Ua2m+1,1,25<br>:<br>Ua2m+1,1,0<br>Ua2m+1,0,26<br>Ua2m+1,0,25<br>:<br>Ua2m+1,0,0 | Ub2m+1,4,26<br>Ub2m+1,4,25<br>:<br>Ub2m+1,4,0<br>Ub2m+1,3,26<br>Ub2m+1,3,25<br>:<br>Ub2m+1,3,0<br>Ub2m+1,2,26<br>Ub2m+1,2,25<br>:<br>Ub2m+1,2,0<br>Ub2m+1,1,26<br>Ub2m+1,1,25<br>:<br>Ub2m+1,1,0<br>Ub2m+1,0,26<br>Ub2m+1,0,25<br>:<br>Ub2m+1,0,0 | ···<br>···<br>···<br>···<br>···<br>···<br>···<br>···<br>···<br>···<br>···<br>···<br>···<br>···<br>···<br>···<br>···<br>··· | Ub n-1,4,26<br>Ub n-1,4,25<br>:<br>Ub n-1,4,0<br>Ub n-1,3,26<br>Ub n-1,3,25<br>:<br>Ub n-1,3,0<br>Ub n-1,2,26<br>Ub n-1,2,25<br>:<br>Ub n-1,2,0<br>Ub n-1,1,26<br>Ub n-1,1,25<br>:<br>Ub n-1,1,0<br>Ub n-1,0,26<br>Ub n-1,0,25<br>:<br>Ub n-1,0,0 |
| VIDEO SECTOR "0" | Ua0,4,26<br>Ua0,4,25<br>:<br>Ua0,4,0<br>Ua0,3,26<br>Ua0,3,25<br>:<br>Ua0,3,0<br>Ua0,2,26<br>Ua0,2,25<br>:<br>Ua0,2,0<br>Ua0,1,26<br>Ua0,1,25<br>:<br>Ua0,1,0<br>Ua0,0,26<br>Ua0,0,25<br>:<br>Ua0,0,0 | Ub0,4,26<br>Ub0,4,25<br>:<br>Ub0,4,0<br>Ub0,3,26<br>Ub0,3,25<br>:<br>Ub0,3,0<br>Ub0,2,26<br>Ub0,2,25<br>:<br>Ub0,2,0<br>Ub0,1,26<br>Ub0,1,25<br>:<br>Ub0,1,0<br>Ub0,0,26<br>Ub0,0,25<br>:<br>Ub0,0,0 | ···<br>···<br>···<br>···<br>···<br>···<br>···<br>···<br>···<br>···<br>···<br>···<br>···<br>···<br>···<br>···<br>···<br>··· | Ua 2m,4,26<br>Ua 2m,4,25<br>:<br>Ua 2m,4,0<br>Ua 2m,3,26<br>Ua 2m,3,25<br>:<br>Ua 2m,3,0<br>Ua 2m,2,26<br>Ua 2m,2,25<br>:<br>Ua 2m,2,0<br>Ua 2m,1,26<br>Ua 2m,1,25<br>:<br>Ua 2m,1,0<br>Ua 2m,0,26<br>Ua 2m,0,25<br>:<br>Ua 2m,0,0 | Ub 2m,4,26<br>Ub 2m,4,25<br>:<br>Ub 2m,4,0<br>Ub 2m,3,26<br>Ub 2m,3,25<br>:<br>Ub 2m,3,0<br>Ub 2m,2,26<br>Ub 2m,2,25<br>:<br>Ub 2m,2,0<br>Ub 2m,1,26<br>Ub 2m,1,25<br>:<br>Ub 2m,1,0<br>Ub 2m,0,26<br>Ub 2m,0,25<br>:<br>Ub 2m,0,0 | ···<br>···<br>···<br>···<br>···<br>···<br>···<br>···<br>···<br>···<br>···<br>···<br>···<br>···<br>···<br>···<br>···<br>··· | Ub n-2,4,26<br>Ub n-2,4,25<br>:<br>Ub n-2,4,0<br>Ub n-2,3,26<br>Ub n-2,3,25<br>:<br>Ub n-2,3,0<br>Ub n-2,2,26<br>Ub n-2,2,25<br>:<br>Ub n-2,2,0<br>Ub n-2,1,26<br>Ub n-2,1,25<br>:<br>Ub n-2,1,0<br>Ub n-2,0,26<br>Ub n-2,0,25<br>:<br>Ub n-2,0,0 |
| TRACK No. | 0 | 1 | | 2m | 2m+1 | | n-1 | m = 0~4(525/60), 0~5(625/50)
n = 10 (525/60), 12 (625/50)

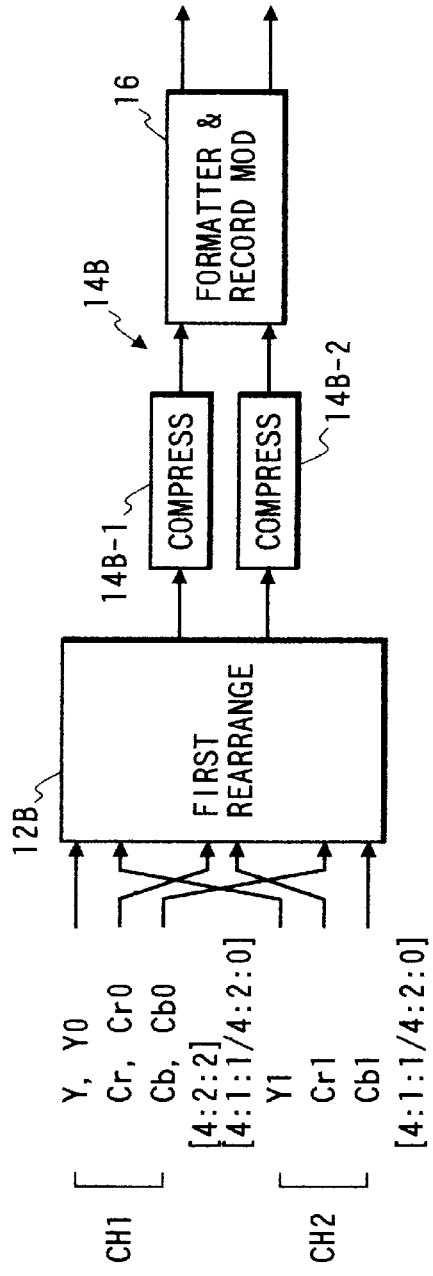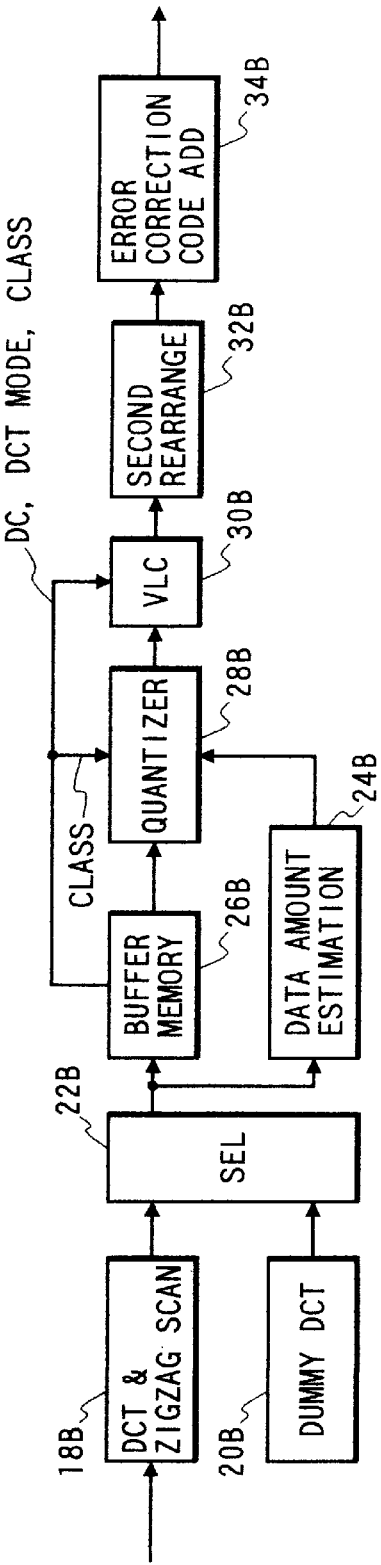

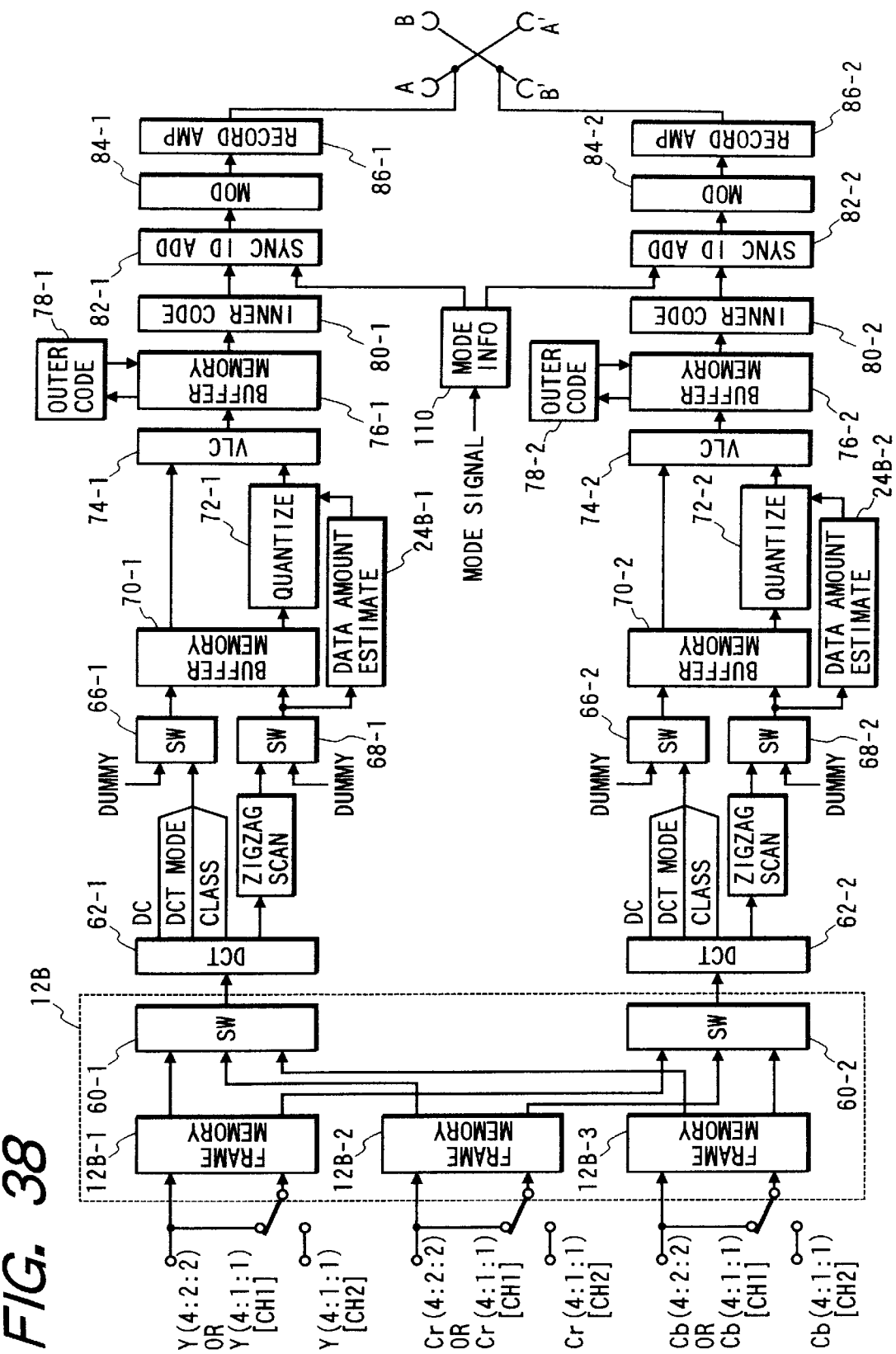

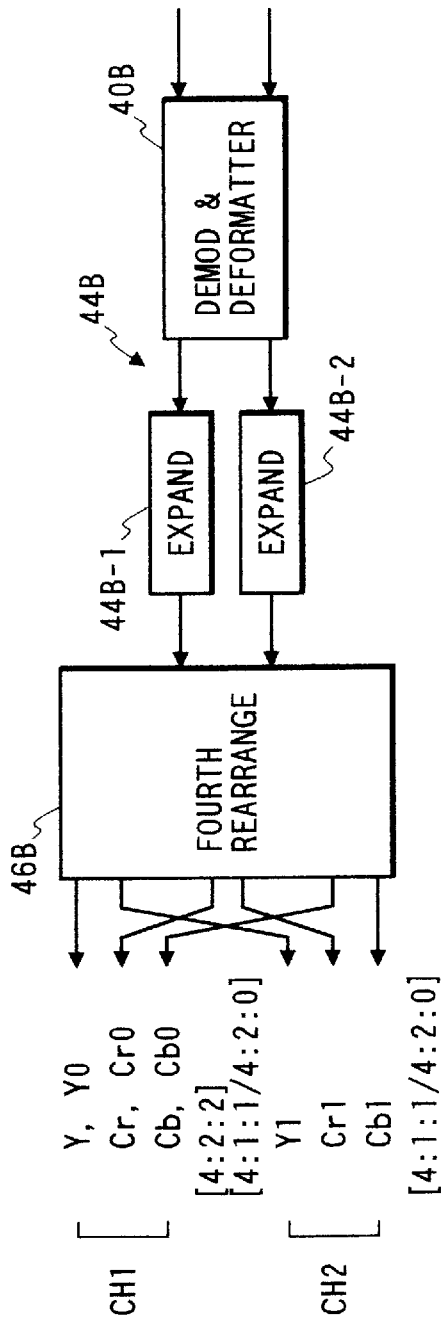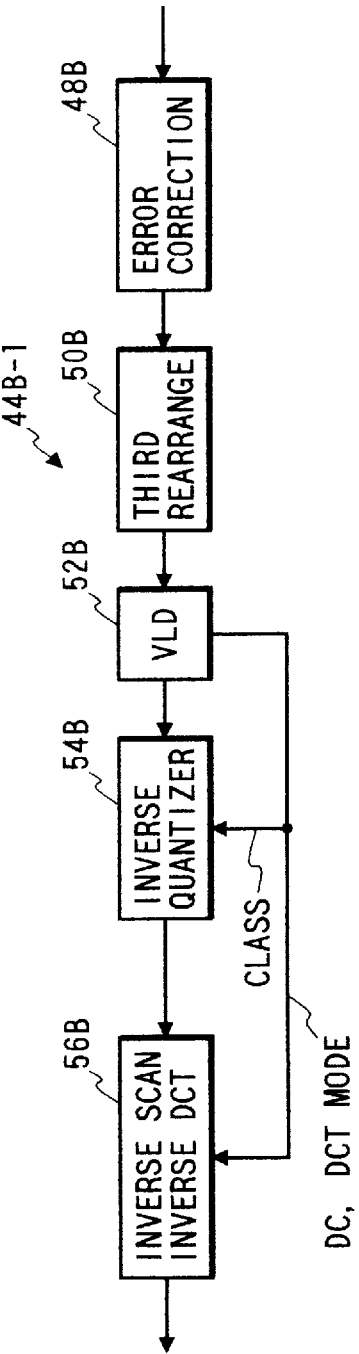

FIG. 42

|   | j |   |   |   |   |
|---|---|---|---|---|---|
|   | 0 | 1 | 2 | 3 | 4 |
| 0 | S0,0 | S0,1 | S0,2 | S0,3 | S0,4 |
| 2 | S2,0 | S2,1 | S2,2 | S2,3 | S2,4 |
| 4 | S4,0 | S4,1 | S4,2 | S4,3 | S4,4 |
| 6 | S6,0 | S6,1 | S6,2 | S6,3 | S6,4 |
| 8 | S8,0 | S8,1 | S8,2 | S8,3 | S8,4 | i

|   | j |   |   |   |   |
|---|---|---|---|---|---|
|   | 0 | 1 | 2 | 3 | 4 |
| 1 | S1,0 | S1,1 | S1,2 | S1,3 | S1,4 |
| 3 | S3,0 | S3,1 | S3,2 | S3,3 | S3,4 |
| 5 | S5,0 | S5,1 | S5,2 | S5,3 | S5,4 |
| 7 | S7,0 | S7,1 | S7,2 | S7,3 | S7,4 |
| 9 | S9,0 | S9,1 | S9,2 | S9,3 | S9,4 | i

32 × 8 (Y), 8 × 8 (Cr, Cb) : 1 MACRO-BLOCK

S i,0 OR S i,2

GROUP "a"

GROUP "b"

S i,1 OR S i,3

GROUP "a"

GROUP "b"

S i,4

GROUP "a"

GROUP "b"

|   | j |   |   |   |   |
|---|---|---|---|---|---|
|   | 0 | 1 | 2 | 3 | 4 |
| 0 | S0,0 | S0,1 | S0,2 | S0,3 | S0,4 |
| 2 | S2,0 | S2,1 | S2,2 | S2,3 | S2,4 |
| 4 | S4,0 | S4,1 | S4,2 | S4,3 | S4,4 |
| 6 | S6,0 | S6,1 | S6,2 | S6,3 | S6,4 |
| 8 | S8,0 | S8,1 | S8,2 | S8,3 | S8,4 |
| 10 | S10,0 | S10,1 | S10,2 | S10,3 | S10,4 | i (left axis), 4:2:0 (625/50)

|   | j |   |   |   |   |
|---|---|---|---|---|---|
|   | 0 | 1 | 2 | 3 | 4 |
| 1 | S1,0 | S1,1 | S1,2 | S1,3 | S1,4 |
| 3 | S3,0 | S3,1 | S3,2 | S3,3 | S3,4 |
| 5 | S5,0 | S5,1 | S4,2 | S5,3 | S5,4 |
| 7 | S7,0 | S7,1 | S7,2 | S7,3 | S7,4 |
| 9 | S9,0 | S9,1 | S9,2 | S9,3 | S9,4 |
| 11 | S11,0 | S11,1 | S11,2 | S11,3 | S11,4 | i (left axis), 4:2:0 (625/50)

CH2

4:2:0 (625/50)

|   | 0 | 1 | 2 | 3 | 4 |
|---|---|---|---|---|---|
| 0 | S0,0 | S0,1 | S0,2 | S0,3 | S0,4 |
| 1 | S1,0 | S1,1 | S1,2 | S1,3 | S1,4 |
| 2 | S2,0 | S2,1 | S2,2 | S2,3 | S2,4 |
| 3 | S3,0 | S3,1 | S3,2 | S3,3 | S3,4 |
| 4 | S4,0 | S4,1 | S4,2 | S4,3 | S4,4 |
| 5 | S5,0 | S5,1 | S5,2 | S5,3 | S5,4 |
| 6 | S6,0 | S6,1 | S6,2 | S6,3 | S6,4 |
| 7 | S7,0 | S7,1 | S7,2 | S7,3 | S7,4 |
| 8 | S8,0 | S8,1 | S8,2 | S8,3 | S8,4 |
| 9 | S9,0 | S9,1 | S9,2 | S9,3 | S9,4 |
| 10 | S10,0 | S10,1 | S10,2 | S10,3 | S10,4 |
| 11 | S11,0 | S11,1 | S11,2 | S11,3 | S11,4 | j (columns), i (rows), 525/60 SYSTEM (rows 0-9), 625/50 SYSTEM (rows 0-11)

16 × 8(Y), 8 × 8(Cr, Cb) : 1 MACRO BLOCK

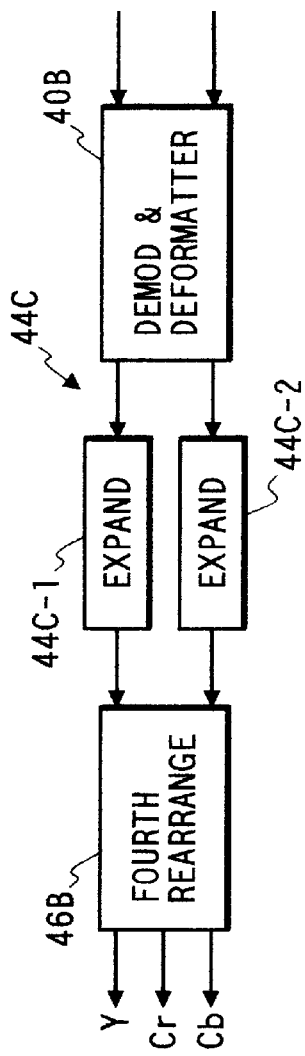
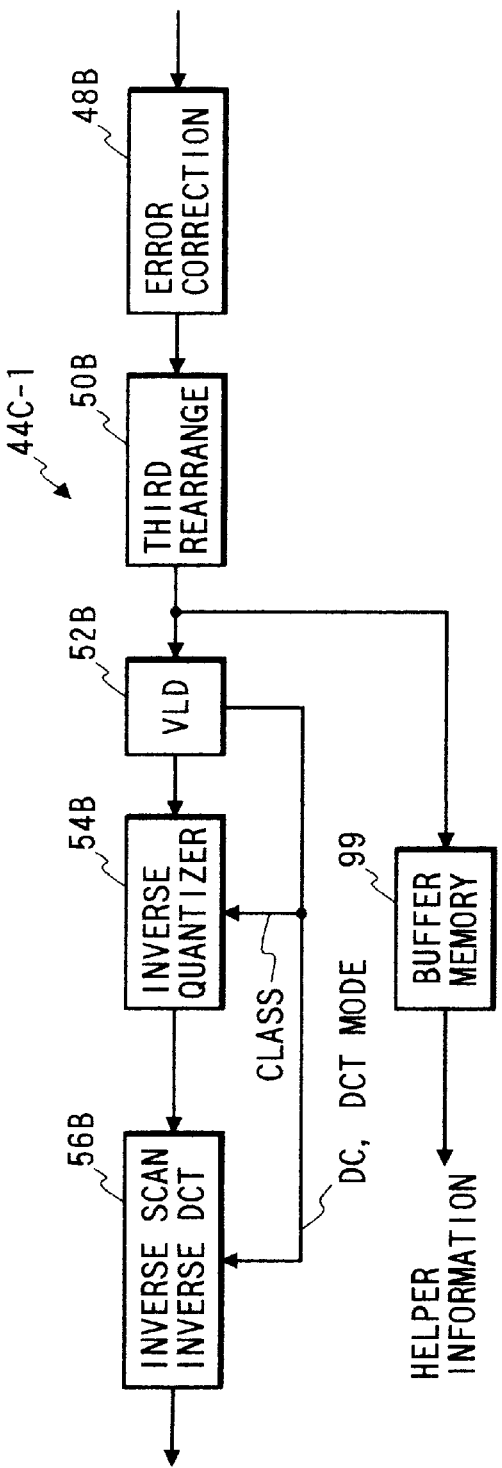

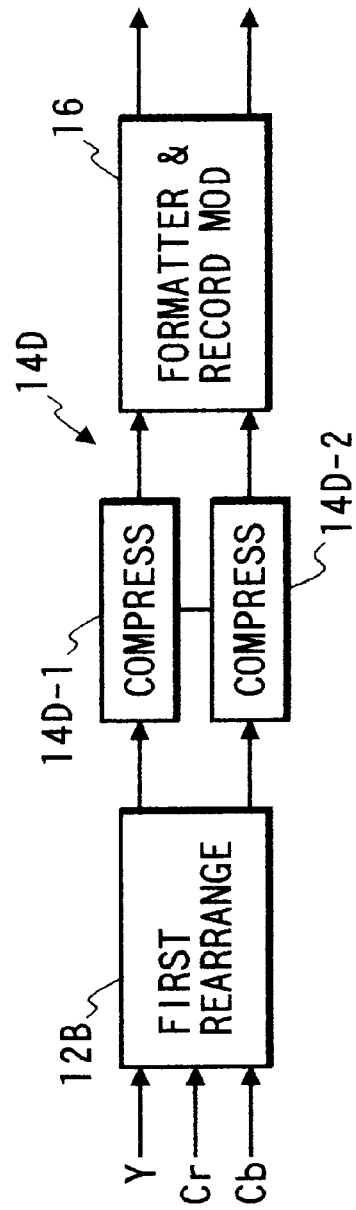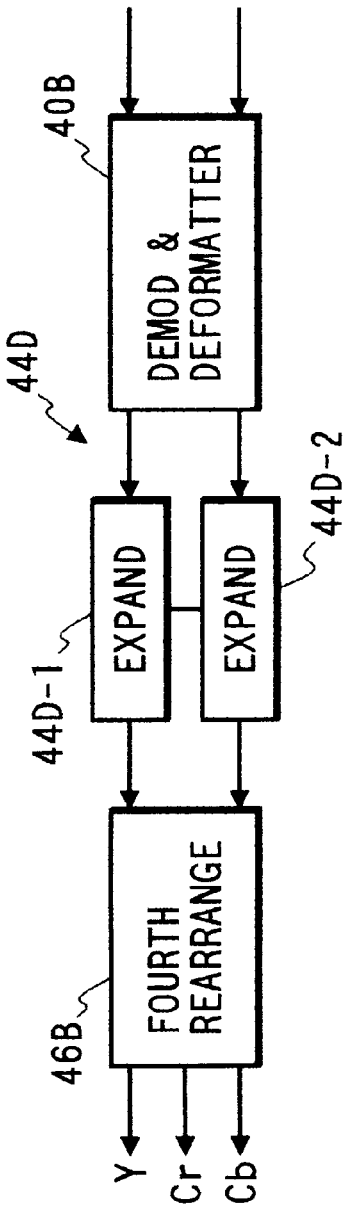

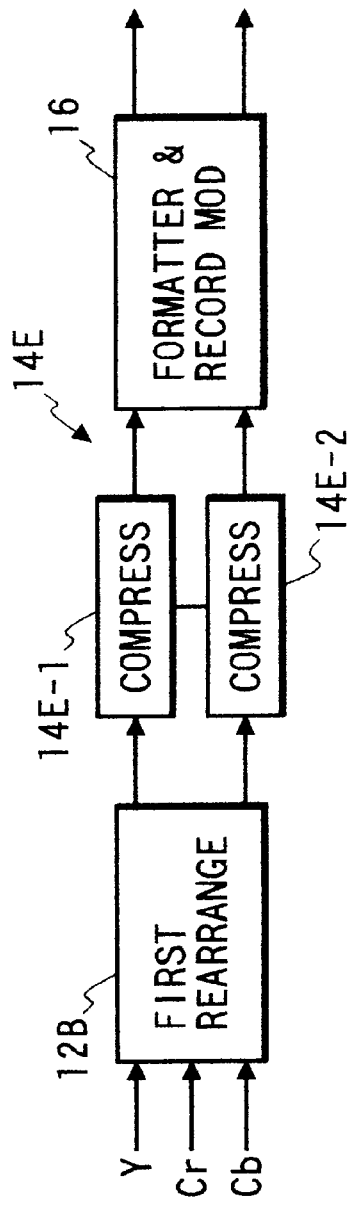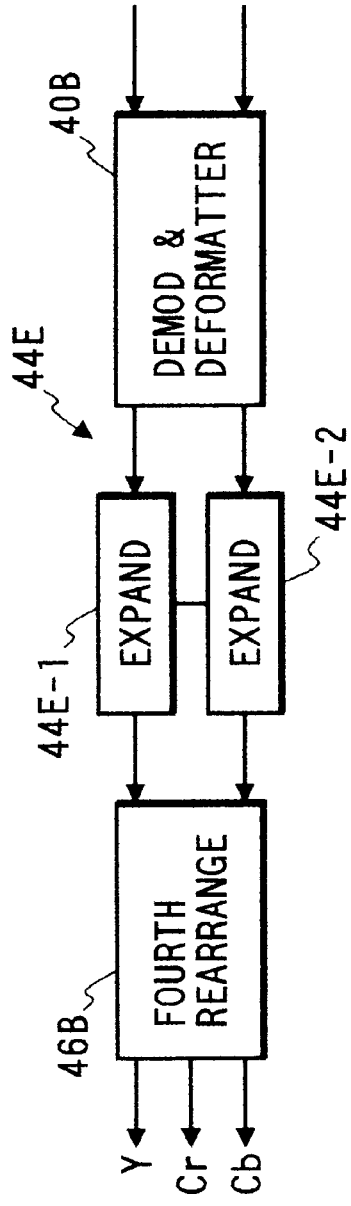

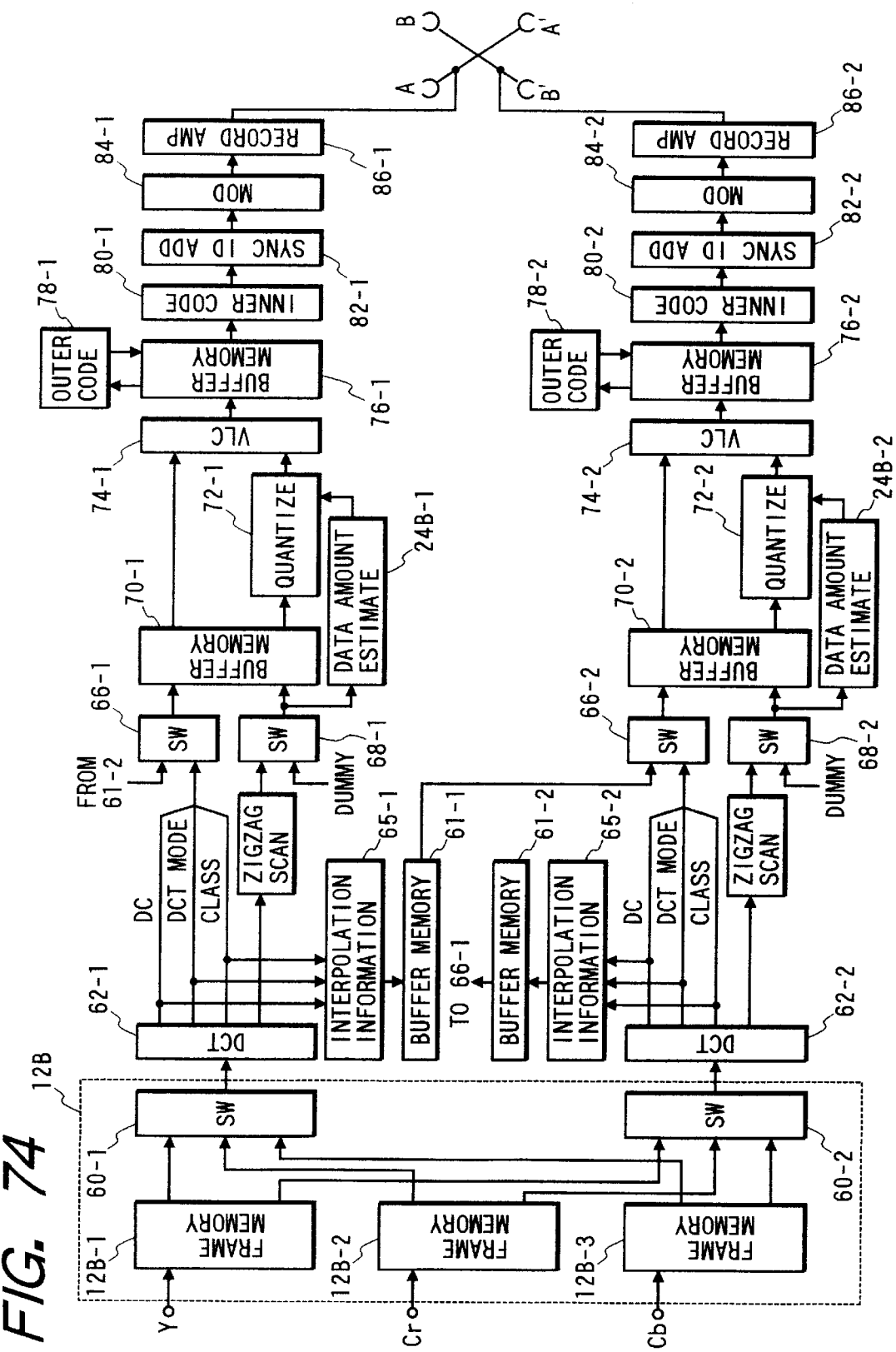

METHOD AND APPARATUS FOR PROCESSING PICTURE INFORMATION, AND RECORDING MEDIUM

BACKGROUND OF THE INVENTION

1. Field of the Invention

First, this invention relates to a method of compressing picture information. Second, this invention relates to an apparatus for compressing picture information. Third, this invention relates to a method of expanding picture information. Fourth, this invention relates to an apparatus for expanding picture information. Fifth, this invention relates to a method of recording picture information. Sixth, this invention relates to an apparatus for recording picture information. Seventh, this invention relates to a method of reproducing picture information. Eighth, this invention relates to an apparatus for reproducing picture information. Ninth, this invention relates to a recording medium.

2. Description of Related Art

Generally, digital VTR's (video tape recorders) have analog-to-digital converters for changing analog component video signals (analog Y, Cr, and Cb signals) of a given television system such as an NTSC system or a PAL system into corresponding digital component video signals (digital Y, Cr, and Cb signals). Here, the Y signals mean luminance signals. In addition, the Cr signals mean R-Y signals (first color difference signals) while the Cb signals mean B-Y signals (second color difference signals). Specifically, the analog-to-digital converters sample the analog Y, Cr, and Cb signals at given sampling frequencies respectively, and then digitize the samples of the analog Y, Cr, and Cb signals.

In a typical home-use digital VTR, the ratio among the sampling frequencies for the respective analog Y, Cr, and Cb signals is "4:1:1" or "4:2:0 (4:0:2)". The analog Y, Cr, and Cb signals result from interlaced scanning so that two successive fields represented by the analog Y, Cr, and Cb signals compose one frame. ITU-R Recommendation 601 prescribes the following frame sizes. In the case of a 525/60 system (that is, an NTSC system), the frame size is chosen so that the number of samples (pixels) of a Y signal will be equal to 720 (in the horizontal direction) by 480 (in the vertical direction) while the number of samples of each of a Cr signal and a Cb signal will be equal to 180 (in the horizontal direction) by 480 (in the vertical direction). Here, "525" means the number of horizontal scanning lines per frame, and "60" means the number of fields per second. In the case of a 625/50 system (that is, a PAL system), the frame size is chosen so that the number of samples (pixels) of a Y signal will be equal to 720 (in the horizontal direction) by 576 (the vertical direction) while the number of samples of each of a Cr signal and a Cb signal will be equal to 360 (the horizontal direction) by 288 (the vertical direction). Here, "625" means the number of horizontal scanning lines per frame, and "50" means the number of fields per second.

In the case of a 525/60 system, the ratio among the sampling frequencies for the respective analog Y, Cr, and Cb signals is denoted by "4:1:1". According to a 625/50 system, the Cr signal and the Cb signal are transmitted in a line sequence, and hence lines devoid of Cr information and lines devoid of Cb information alternate. Thus, lines related to a sampling frequency ratio of "4:2:0" alternate with lines related to a sampling frequency ratio of "4:0:2". Here, in the case of the 625/50 system, the ratio among the sampling frequencies for the respective analog Y, Cr, and Cb signals is denoted by "4:2:0" for convenience.

In a typical professional-use digital VTR (a typical business-use digital VTR), the ratio among the sampling frequencies for the respective analog Y, Cr, and Cb signals is "4:2:2". Parts of the professional-use digital VTR are more expensive than parts of the home-use digital VTR. It is difficult for the home-use digital VTR to handle digital Y, Cr, and Cb signals related to a sampling frequency ratio of "4:2:2". It is difficult for the professional-use digital VTR to handle digital Y, Cr, and Cb signals related to a sampling frequency ratio of "4:1:1" or "4:2:0".

SUMMARY OF THE INVENTION

It is a first object of this invention to provide an improved method of compressing picture information.

It is a second object of this invention to provide an improved apparatus for compressing picture information.

It is a third object of this invention to provide an improved method of expanding picture information.

It is a fourth object of this invention to provide an improved apparatus for expanding picture information.

It is a fifth object of this invention to provide an improved method of recording picture information.

It is a sixth object of this invention to provide an improved apparatus for recording picture information.

It is a seventh object of this invention to provide an improved method of reproducing picture information.

It is an eighth object of this invention to provide an improved apparatus for reproducing picture information.

It is a ninth object of this invention to provide an improved recording medium.

A first aspect of this invention provides a method of compressing picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing the first modification-resultant signal into a first compression-resultant signal by DCT and variable length encoding while maintaining a data amount of the first compression-resultant signal per "n" macro-blocks at a fixed amount, where "n" denotes a given natural number; and compressing the second modification-resultant signal into a second compression-resultant signal by DCT and variable length encoding while maintaining a data amount of the second compression-resultant signal per "n" macro-blocks at a fixed amount.

A second aspect of this invention is based on the first aspect thereof, and provides a method wherein each of the dummy DCT blocks has AC-coefficient data pieces all being "0".

A third aspect of this invention is based on the first aspect thereof, and provides a method further comprising the steps of providing super-blocks each having 9 macro-blocks in a horizontal direction of a frame by 3 macro-blocks in a vertical direction of the frame; providing extended super-blocks each having two super-blocks arranged along the vertical direction of the frame; assigning the first division-resultant signal to picture data corresponding to upper super-blocks in the extended super-blocks; and assigning the second division-resultant signal to picture data corresponding to lower super-blocks in the extended super-blocks.

A fourth aspect of this invention provides a method of recording picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing the first modification-resultant signal into a first compression-resultant signal by DCT and variable length encoding while maintaining a data amount of the first compression-resultant signal per "n" macro-blocks at a fixed amount, where "n" denotes a given natural number; compressing the second modification-resultant signal into a second compression-resultant signal by DCT and variable length encoding while maintaining a data amount of the second compression-resultant signal per "n" macro-blocks at a fixed amount; recording the first compression-resultant signal on first alternate tracks of a recording medium; and recording the second compression-resultant signal on second alternate tracks of the recording medium.

A fifth aspect of this invention is based on the fourth aspect thereof, and provides a method further comprising the steps of providing super-blocks each having 9 macro-blocks in a horizontal direction of a frame by 3 macro-blocks in a vertical direction of the frame; providing extended super-blocks each having two super-blocks arranged along the vertical direction of the frame; assigning the first division-resultant signal to picture data corresponding to upper super-blocks in the extended super-blocks; assigning the second division-resultant signal to picture data corresponding to lower super-blocks in the extended super-blocks; providing video sectors each having five super-blocks; and assigning two video sectors to one track of the recording medium.

A sixth aspect of this invention provides an apparatus for compressing picture information, comprising means for dividing input picture information into first and second division-resultant signals, the input picture information relating to a ratio of "4:2:2" among sampling frequencies for a Y signal, a Cr signal, and a Cb signal; means for generating Y-signal DCT blocks, Cr-signal DCT blocks, and Cb-signal DCT blocks from the first division-resultant signal; means for generating Y-signal DCT blocks, Cr-signal DCT blocks, and Cb-signal DCT blocks from the second division-resultant signal: means for generating dummy DCT blocks distinguishable from the Y-signal DCT blocks related to the first and second division-resultant signals; means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing the first modification-resultant signal into a first compression-resultant signal by DCT and variable length encoding while maintaining a data amount of the first compression-resultant signal per "n" macro-blocks at a fixed amount, where "n" denotes a given natural number; and means for compressing the second modification-resultant signal into a second compression-resultant signal by DCT and variable length encoding while maintaining a data amount of the second compression-resultant signal per "n" macro-blocks at a fixed amount.

A seventh aspect of this invention provides an apparatus for recording picture information, comprising means for dividing input picture information into first and second division-resultant signals, the input picture information relating to a ratio of "4:2:2" among sampling frequencies for a Y signal, a Cr signal, and a Cb signal; means for generating Y-signal DCT blocks, Cr-signal DCT blocks, and Cb-signal DCT blocks from the first division-resultant signal; means for generating Y-signal DCT blocks, Cr-signal DCT blocks, and Cb-signal DCT blocks from the second division-resultant signal; means for generating dummy DCT blocks distinguishable from the Y-signal DCT blocks related to the first and second division-resultant signals; means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing the first modification-resultant signal into a first compression-resultant signal by DCT and variable length encoding while maintaining a data amount of the first compression-resultant signal per "n" macro-blocks at a fixed amount, where "n" denotes a given natural number; means for compressing the second modification-resultant signal into a second compression-resultant signal by DCT and variable length encoding while maintaining a data amount of the second compression-resultant signal per "n" macro-blocks at a fixed amount; means for recording the first compression-resultant signal on first alternate tracks of a recording medium; and means for recording the second compression-resultant signal on second alternate tracks of the recording medium.

An eighth aspect of this invention provides an apparatus for expanding picture information, comprising means for expanding a first input signal into a first expansion-resultant signal by variable length decoding and inverse DCT; means for expanding a second input signal into a second expansion-resultant signal by variable length decoding and inverse DCT; means for removing two dummy DCT blocks from each of macro-blocks each having two Y-signal DCT blocks, one Cr-signal DCT block, one Cb-signal DCT block, and two dummy DCT blocks represented by the first expansion-resultant signal, and for converting the first expansion-resultant signal into a first dummy-free signal; means for removing two dummy DCT blocks from each of macro-blocks each having two Y-signal DCT blocks, one Cr-signal DCT block, one Cb-signal DCT block, and two dummy DCT blocks represented by the second expansion-resultant signal, and for converting the second expansion-resultant signal into a second dummy-free signal; and means for combining the first and second dummy-free signals into output picture information relating to a ratio of "4:2:2" among sampling frequencies for a Y signal, a Cr signal, and a Cb signal.

A ninth aspect of this invention provides an apparatus for reproducing picture information, comprising means for reading out a first record signal from first alternate tracks on a recording medium; means for reading out a second record signal from first alternate tracks on the recording medium; means for expanding the first read-out record signal into a first expansion-resultant signal by variable length decoding and inverse DCT; means for expanding the second read-out record signal into a second expansion-resultant signal by variable length decoding and inverse DCT; means for removing two dummy DCT blocks from each of macro-blocks each having two Y-signal DCT blocks, one Cr-signal DCT block, one Cb-signal DCT block, and two dummy DCT blocks represented by the first expansion-resultant signal, and for converting the first expansion-resultant signal into a first dummy-free signal; means for removing two dummy DCT blocks from each of macro-blocks each having two Y-signal DCT blocks, one Cr-signal DCT block, one Cb-signal DCT block, and two dummy DCT blocks represented by the second expansion-resultant signal, and for converting the second expansion-resultant signal into a second dummy-free signal; and means for combining the first and second dummy-free signals into output picture information relating to a ratio of "4:2:2" among sampling frequencies for a Y signal, a Cr signal, and a Cb signal.

A tenth aspect of this invention provides a recording medium having tracks on which picture information is recorded by a method comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing the first modification-resultant signal into a first compression-resultant signal by DCT and variable length encoding while maintaining a data amount of the first compression-resultant signal per "n" macro-blocks at a fixed amount, where "n" denotes a given natural number; compressing the second modification-resultant signal into a second compression-resultant signal by DCT and variable length encoding while maintaining a data amount of the second compression-resultant signal per "n" macro-blocks at a fixed amount; recording the first compression-resultant signal on first alternate tracks of the recording medium; and recording the second compression-resultant signal on second alternate tracks of the recording medium.

An eleventh aspect of this invention is based on the tenth aspect thereof, and provides a recording medium which has the tracks on which the picture information is recorded by the method further comprising the steps of providing super-blocks each having 9 macro-blocks in a horizontal direction of a frame by 3 macro-blocks in a vertical direction of the frame; providing extended super-blocks each having two super-blocks arranged along the vertical direction of the frame; assigning the first division-resultant signal to picture data corresponding to upper super-blocks in the extended super-blocks; assigning the second division-resultant signal to picture data corresponding to lower super-blocks in the extended super-blocks; providing video sectors each having five super-blocks; and assigning two video sectors to one track of the recording medium.

A twelfth aspect of this invention provides a method of compressing picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal, wherein two Y-signal DCT blocks in each of the macro-blocks related to the first modification-resultant signal correspond to two regions of a frame respectively, and said two regions adjoin each other in a horizontal direction of the frame, and wherein two Y-signal DCT blocks, one Cr-signal DCT block, and one Cb-signal DCT block in each of the macro-blocks related to the first modification-resultant signal correspond to a common region of a frame; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal, wherein two Y-signal DCT blocks in each of the macro-blocks related to the second modification-resultant signal correspond to two regions of a frame respectively, and said two regions adjoin each other in a horizontal direction of the frame, and wherein two Y-signal DCT blocks, one Cr-signal DCT block, and one Cb-signal DCT block in each of the macro-blocks related to the second modification-resultant signal correspond to a common region of a frame; compressing the first modification-resultant signal into a first compression-resultant signal by DCT and variable length encoding while maintaining a data amount of the first compression-resultant signal per "n" macro-blocks at a fixed amount, where "n" denotes a given natural number; and compressing the second modification-resultant signal into a second compression-resultant signal by DCT and variable length encoding while maintaining a data amount of the second compression-resultant signal per "n" macro-blocks at a fixed amount.

A thirteenth aspect of this invention is based on the twelfth aspect thereof, and provides a method further comprising the steps of separating every frame represented by the input picture information into "m" horizontally-extending band-like areas, where "m" denotes a given natural number; assigning the first division-resultant signal to first alternate horizontally-extending band-like areas; assigning the second division-resultant signal to second alternate horizontally-extending band-like areas; recording the first compression-resultant signal on first alternate tracks of a recording medium; and recording the second compression-resultant signal on second alternate tracks of the recording medium.

A fourteenth aspect of this invention provides a method of compressing picture information, comprising the steps of dividing input picture information into first and second division-resultant signals having segments corresponding to respective blocks, the input picture information relating to a predetermined ratio among sampling frequencies for a Y signal, a Cr signal, and a Cb signal; compressing the first division-resultant signal into a first compression-resultant signal by DCT and variable length encoding while maintaining a data amount of the first compression-resultant signal per "n" blocks at a fixed amount, where "n" denotes a given natural number; and compressing the second division-resultant signal into a second compression-resultant signal by DCT and variable length encoding while maintaining a data amount of the second compression-resultant signal per "n" blocks at a fixed amount.

A fifteenth aspect of this invention provides a method of compressing picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal; compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal; maintaining a data amount of the first compression-resultant signal per "n" macro-blocks at a fixed amount, where "n" denotes a given natural number; and maintaining a data amount of the second compression-resultant signal per "n" macro-blocks at a fixed amount.

A sixteenth aspect of this invention provides a recording medium having tracks on which picture information is recorded by a method comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal; compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal; maintaining a data amount of the first compression-resultant signal per "n" macro-blocks at a fixed amount, where "n" denotes a given natural number; maintaining a data amount of the second compression-resultant signal per "n" macro-blocks at a fixed amount; recording the first compression-resultant signal on first alternate tracks of the recording medium; and recording the second compression-resultant signal on second alternate tracks of the recording medium.

A seventeenth aspect of this invention provides an apparatus for reproducing picture information, comprising means for reading out a first record signal from first alternate tracks on a recording medium; means for reading out a second record signal from second alternate tracks on the recording medium; means for expanding the first read-out record signal into a first expansion-resultant signal by variable length decoding and inverse DCT; means for expanding the second read-out record signal into a second expansion-resultant signal by variable length decoding and inverse DCT; and means for rearranging and combining the first and second expansion-resultant signals into output picture information.

An eighteenth aspect of this invention provides an apparatus for recording picture information, comprising means for dividing input picture information into first and second division-resultant signals having segments corresponding to respective blocks, the input picture information relating to a predetermined ratio among sampling frequencies for a Y signal, a Cr signal, and a Cb signal; means for compressing the first division-resultant signal into a first compression-resultant signal by DCT and variable length encoding while maintaining a data amount of the first compression-resultant signal per "n" blocks at a fixed amount, where "n" denotes a given natural number; means for compressing the second division-resultant signal into a second compression-resultant signal by DCT and variable length encoding while maintaining a data amount of the second compression-resultant signal per "n" blocks at a fixed amount; means for recording the first compression-resultant signal on first alternate tracks of a recording medium; and means for recording the second compression-resultant signal on second alternate tracks of the recording medium.

A nineteenth aspect of this invention provides, in a system including at least first and second data compressors each for picture information relating to a ratio of one of "4:1:1" and "4:2:0" among sampling frequencies of a Y signal, a Cr signal, and a Cb signal, a method of compressing picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal, wherein said dummy DCT blocks in each macro-block cause the first modification-resultant signal to relate to a ratio of one of "4:1:1" and "4:2:0" among sampling frequencies of a Y signal, a Cr signal, and a Cb signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal, wherein said dummy DCT blocks in each macro-block cause the second modification-resultant signal to relate to a ratio of one of "4:1:1" and "4:2:0" among sampling frequencies of a Y signal, a Cr signal, and a Cb signal; compressing the first modification-resultant signal by the first data compressor; and compressing the second modification-resultant signal by the second data compressor.

A twentieth aspect of this invention provides a method of compressing picture information, comprising the steps of dividing first input picture information into first and second division-resultant signals, the first input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal; generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; grouping the Y-signal DCT blocks, the Cr-signal DCT blocks, and the Cb-signal DCT blocks related to the second input picture information into macro-blocks each having four Y-signal DCT blocks, one Cr-signal DCT block, and one Cb-signal DCT block; grouping the Y-signal DCT blocks, the Cr-signal DCT blocks, and the Cb-signal DCT blocks related to the third input picture information into macro-blocks each having four Y-signal DCT blocks, one Cr-signal DCT block, and one Cb-signal DCT block; compressing one of the first modification-resultant signal and the second input picture information into a first compression-resultant signal by DCT and variable length encoding while maintaining a data amount of the first compression-resultant signal per "n" macro-blocks at a fixed amount, where "n" denotes a given natural number; and compressing one of the second modification-resultant signal and the third input picture information into a second compression-resultant signal by DCT and variable length encoding while maintaining a data amount of the second compression-resultant signal per "n" macro-blocks at a fixed amount.

A twenty-first aspect of this invention is based on the twentieth aspect thereof, and provides a method wherein each of the dummy DCT blocks has AC-coefficient data pieces all being "0".

A twenty-second aspect of this invention is based on the twentieth aspect thereof, and provides a method further comprising the steps of providing super-blocks each having 9 macro-blocks in a horizontal direction of a frame by 3 macro-blocks in a vertical direction of the frame; providing extended super-blocks each having two super-blocks arranged along the vertical direction of the frame; assigning one of the first division-resultant signal and the second input picture information to picture data corresponding to upper super-blocks in the extended super-blocks; and assigning one of the second division-resultant signal and the third input picture information to picture data corresponding to lower super-blocks in the extended super-blocks.

A twenty-third aspect of this invention provides, in a system including at least first and second data compressors each for picture information relating to a ratio of one of "4:1:1" and "4:2:0" among sampling frequencies of a Y signal, a Cr signal, and a Cb signal, a method of recording picture information, comprising the steps of dividing first input picture information into first and second division-resultant signals, the first input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal; generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing one of the first modification-resultant signal and the second input picture information into a first compression-resultant signal by the first data compressor; compressing one of the second modification-resultant signal and the third input picture information into a second compression-resultant signal by the second data compressor; recording the first compression-resultant signal on a recording medium; and recording the second compression-resultant signal on the recording medium.

A twenty-fourth aspect of this invention provides an apparatus for compressing picture information, comprising means for dividing first input picture information into first and second division-resultant signals, the first input picture information relating to a ratio of "4:2:2" among sampling frequencies for a Y signal, a Cr signal, and a Cb signal; means for generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal; means for generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal; means for generating dummy DCT blocks distinguishable from the Y-signal DCT blocks related to the first and second division-resultant signals; means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing one of the first modification-resultant signal and the second input picture information into a first compression-resultant signal by DCT and variable length encoding while maintaining a data amount of the first compression-resultant signal per "n" macro-blocks at a fixed amount, where "n" denotes a given natural number; and means for compressing one of the second modification-resultant signal and the third input picture information into a second compression-resultant signal by DCT and variable length encoding while maintaining a data amount of the second compression-resultant signal per "n" macro-blocks at a fixed amount.

A twenty-fifth aspect of this invention provides an apparatus for recording picture information, comprising means for dividing first input picture information into first and second division-resultant signals, the first input picture information relating to a ratio of "4:2:2" among sampling frequencies for a Y signal, a Cr signal, and a Cb signal; means for generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal; means for generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal; means for generating dummy DCT blocks distinguishable from the Y-signal DCT blocks related to the first and second division-resultant signals; means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing one of the first modification-resultant signal and the second input picture information into a first compression-resultant signal by DCT and variable length encoding while maintaining a data amount of the first compression-resultant signal per "n" macro-blocks at a fixed amount, where "n" denotes a given natural number; means for compressing one of the second modification-resultant signal and the third input picture information into a second compression-resultant signal by DCT and variable length encoding while maintaining a data amount of the second compression-resultant signal per "n" macro-blocks at a fixed amount; means for recording the first compression-resultant signal on a recording medium; and means for recording the second compression-resultant signal on the recording medium.

A twenty-sixth aspect of this invention provides an apparatus for reproducing picture information, comprising means for expanding a first input signal into a first expansion-resultant signal by variable length decoding and inverse DCT; means for expanding a second input signal into a second expansion-resultant signal by variable length decoding and inverse DCT; means for, when each of macro-blocks represented by the first expansion-resultant signal contains dummy DCT blocks, removing said dummy DCT blocks from each of said macro-blocks to convert the first expansion-resultant signal into a first dummy-free signal; means for, when each of macro-blocks represented by the second expansion-resultant signal contains dummy DCT blocks, removing said dummy DCT blocks from each of said macro-blocks to convert the second expansion-resultant signal into a second dummy-free signal; means for combining the first and second dummy-free signals into first output picture information relating to a ratio of "4:2:2" among sampling frequencies for a Y signal, a Cr signal, and a Cb signal; means for, when each of macro-blocks represented by the first and second expansion-resultant signal does not contain any dummy DCT blocks, using the first and second expansion-resultant signals as second output picture information and third output picture information each relating to a ratio of one of "4:1:1" and "4:2:0" among sampling frequencies for a Y signal, a Cr signal, and a Cb signal; and means for selecting either the first output picture information or a pair of the second output picture information and the third output picture information as an output signal.

A twenty-seventh aspect of this invention provides an apparatus for compressing picture information, comprising means for dividing first input picture information into first and second division-resultant signals having segments corresponding to respective DCT blocks, the first input picture information relating to a ratio of "4:2:2" among sampling frequencies for a Y signal, a Cr signal, and a Cb signal; means for generating DCT blocks from second input picture information, the second input picture information relating to a ratio of one of "4:1:1" and "4:2:0" among sampling frequencies for a Y signal, a Cr signal, and a Cb signal; means for grouping the DCT blocks related to one of the first division-resultant signal and the second input picture information into macro-blocks each having a given number of DCT blocks; means for grouping the DCT blocks related to the second division-resultant signal into macro-blocks each having the given number of DCT blocks; means for compressing one of the first division-resultant signal and the second input picture information into a first compression-resultant signal by DCT and variable length encoding while maintaining a data amount of the first compression-resultant signal per "n" macro-blocks at a fixed amount, where "n" denotes a given natural number; and means for compressing the second division-resultant signal into a second compression-resultant signal by DCT and variable length encoding while maintaining a data amount of the second compression-resultant signal per "n" macro-blocks at a fixed amount.

A twenty-eighth aspect of this invention provides a method of compressing picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing the first modification-resultant signal into a first compression-resultant signal by DCT and variable length encoding while maintaining a data amount of the first compression-resultant signal per "n" macro-blocks at a fixed amount, where "n" denotes a given natural number; compressing the second modification-resultant signal into a second compression-resultant signal by DCT and variable length encoding while maintaining a data amount of the second compression-resultant signal per "n" macro-blocks at a fixed amount; and placing helper information in the dummy DCT blocks.

A twenty-ninth aspect of this invention is based on the twenty-eighth aspect thereof, and provides a method wherein the helper information in the dummy DCT blocks related to the first modification-resultant signal contains interpolation information for recovery of the second division-resultant signal, and the helper information in the dummy DCT blocks related to the second modification-resultant signal contains interpolation information for recovery of the first division-resultant signal.

A thirtieth aspect of this invention provides a method of recording picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing the first modification-resultant signal into a first compression-resultant signal by DCT and variable length encoding while maintaining a data amount of the first compression-resultant signal per "n" macro-blocks at a fixed amount, where "n" denotes a given natural number; compressing the second modification-resultant signal into a second compression-resultant signal by DCT and variable length encoding while maintaining a data amount of the second compression-resultant signal per "n" macro-blocks at a fixed amount; placing helper information in the dummy DCT blocks, wherein the helper information in the dummy DCT blocks related to the first modification-resultant signal contains interpolation information for recovery of the second division-resultant signal, and the helper information in the dummy DCT blocks related to the second modification-resultant signal contains interpolation information for recovery of the first division-resultant signal; and recording the first and second compression-resultant signals on separate regions of a recording medium, respectively.

A thirty-first aspect of this invention provides an apparatus for compressing picture information, comprising means for dividing input picture information into first and second division-resultant signals, the input picture information relating to a ratio of "4:2:2" among sampling frequencies for a Y signal, a Cr signal, and a Cb signal; means for generating Y-signal DCT blocks, Cr-signal DCT blocks, and Cb-signal DCT blocks from the first division-resultant signal; means for generating Y-signal DCT blocks, Cr-signal DCT blocks, and Cb-signal DCT blocks from the second division-resultant signal; means for generating dummy DCT blocks distinguishable from the Y-signal DCT blocks related to the first and second division-resultant signals; means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal; means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing the first modification-resultant signal into a first compression-resultant signal by DCT and variable length encoding while maintaining a data amount of the first compression-resultant signal per "n" macro-blocks at a fixed amount, where "n" denotes a given natural number; means for compressing the second modification-resultant signal into a second compression-resultant signal by DCT and variable length encoding while maintaining a data amount of the second compression-resultant signal per "n" macro-blocks at a fixed amount; and means for placing helper information in the dummy DCT blocks.

A thirty-second aspect of this invention provides an apparatus for recording picture information, comprising means for dividing input picture information into first and second division-resultant signals, the input picture information relating to a ratio of "4:2:2" among sampling frequencies for a Y signal, a Cr signal, and a Cb signal; means for generating Y-signal DCT blocks, Cr-signal DCT blocks, and Cb-signal DCT blocks from the first division-resultant signal; means for generating Y-signal DCT blocks, Cr-signal DCT blocks, and Cb-signal DCT blocks from the second division-resultant signal; means for generating dummy DCT blocks distinguishable from the Y-signal DCT blocks related to the first and second division-resultant signals; means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal; means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing the first modification-resultant signal into a first compression-resultant signal by DCT and variable length encoding while maintaining a data amount of the first compression-resultant signal per "n" macro-blocks at a fixed amount, where "n" denotes a given natural number; means for compressing the second modification-resultant signal into a second compression-resultant signal by DCT and variable length encoding while maintaining a data amount of the second compression-resultant signal per "n" macro-blocks at a fixed amount; means for placing helper information in the dummy DCT blocks; means for recording the first compression-resultant signal on first alternate tracks of a recording medium; and means for recording the second compression-resultant signal on second alternate tracks of the recording medium.

A thirty-third aspect of this invention is based on the thirty5 second aspect thereof, and provides an apparatus wherein the helper information in the dummy DCT blocks related to the first modification-resultant signal contains interpolation information for recovery of the second division-resultant signal, and the helper information in the dummy DCT blocks related to the second modification-resultant signal contains interpolation information for recovery of the first division-resultant signal.

A thirty-fourth aspect of this invention provides an apparatus for reproducing picture information, comprising means for reading out a first record signal from first alternate tracks on a recording medium; means for reading out a second record signal from second alternate tracks on the recording medium; means for expanding the first read-out record signal into a first expansion-resultant signal by variable length decoding and inverse DCT; means for expanding the second read-out record signal into a second expansion-resultant signal by variable length decoding and inverse DCT; means for extracting first helper information for the second record signal from dummy DCT blocks represented by the first read-out record signal; means for extracting second helper information for the first record signal from dummy DCT blocks represented by the second read-out record signal; means for removing two dummy DCT blocks from each of macro-blocks each having two Y-signal DCT blocks, one Cr-signal DCT block, one Cb-signal DCT block, and two dummy DCT blocks represented by the first expansion-resultant signal, and for converting the first expansion-resultant signal into a first dummy-free signal; means for removing two dummy DCT blocks from each of macro-blocks each having two Y-signal DCT blocks, one Cr-signal DCT block, one Cb-signal DCT block, and two dummy DCT blocks represented by the second expansion-resultant signal, and for converting the second expansion-resultant signal into a second dummy-free signal; and means for combining the first and second dummy-free signals into output picture information relating to a ratio of "4:2:2" among sampling frequencies for a Y signal, a Cr signal, and a Cb signal.

A thirty-fifth aspect of this invention provides a method of compressing picture information, comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal; compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal; maintaining a data amount of the first compression-resultant signal per "n" macro-blocks at a fixed amount, where "n" denotes a given natural number; maintaining a data amount of the second compression-resultant signal per "n" macro-blocks at a fixed amount; and placing helper information in areas within the dummy DCT blocks which are assigned to DC coefficients.

A thirty-sixth aspect of this invention provides a recording medium having tracks on which picture information is recorded by a method comprising the steps of dividing input picture information into first and second division-resultant signals, the input picture information relating to a ratio of "4:2:2" among sampling frequencies for a Y signal, a Cr signal, and a Cb signal; generating Y-signal DCT blocks, Cr-signal DCT blocks, and Cb-signal DCT blocks from the first division-resultant signal; generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals; grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal; grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal; compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal; maintaining a data amount of the first compression-resultant signal per "n" macro-blocks at a fixed amount, where "n" denotes a given natural number; maintaining a data amount of the second compression-resultant signal per "n" macro-blocks at a fixed amount; placing helper information in areas within the dummy DCT blocks which are assigned to DC coefficients; recording the first compression-resultant signal on first alternate tracks of the recording medium; and recording the second compression-resultant signal on second alternate tracks of the recording medium.

BRIEF DESCRIPTION OF THE DRAWINGS

FIG. 4 is a diagram of Y-signal DCT blocks corresponding to a 1-frame picture of a 625/50 system.

FIG. 5 is a diagram of Cr-signal DCT blocks or Cb-signal DCT blocks corresponding to a 1-frame picture of a 625/50 system.

FIG. 11 is a diagram of super-blocks composed of data units in a 525/60 system having a sampling frequency ratio of "4:1:1".

FIG. 12 is a diagram of a super-block composed of data units in a 625/50 system having a sampling frequency ratio of "4:2:0".

FIG. 13 is a diagram of super-blocks corresponding to a 1frame picture of a 525/60 system having a sampling frequency ratio of "4:1:1".

FIG. 14 is a diagram of super-blocks corresponding to a 125 frame picture of a 625/50 system having a sampling frequency ratio of "4:2:0".

FIG. 15 is a diagram of a magnetic tape, recording tracks on the magnetic tape, and super-blocks represented by data pieces recorded on the tracks.

FIG. 17 is a block diagram of a recording side of a digital VTR according to a first embodiment of this invention.

FIG. 18 is a block diagram of a data compressor in FIG. 17.

FIG. 19 is a detailed block diagram of the recording side of the digital VTR in FIG. 17.

FIG. 28 is a diagram of an extended super-block in the first embodiment of this invention.

FIG. 29 is a diagram of extended super-blocks corresponding to a 1-frame picture in the first embodiment of this invention.

FIG. 30 is a diagram of "a"-group DCT blocks, "a"-group macro-blocks, and "a"-group video segments arranged in a data reading sequence in the first embodiment of this invention.

FIG. 31 is a diagram of "b"-group DCT blocks, "b"-group macro-blocks, and "b"-group video segments arranged in a data reading sequence in the first embodiment of this invention.

FIG. 35 is a diagram of the relation among sync blocks, data units, and recording tracks in the first embodiment of this invention.

FIG. 36 is a block diagram of a recording side of a digital VTR according to a second embodiment of this invention.

FIG. 37 is a block diagram of a data compressor in FIG. 36.

FIG. 38 is a detailed block diagram of the recording side of the digital VTR in FIG. 36.

FIG. 39 is a block diagram of a reproducing side of the digital VTR according to the second embodiment of this invention.

FIG. 40 is a block diagram of a data expander in FIG. 39.

FIG. 42 is a diagram of extended super-blocks corresponding to a 1-frame picture of a first channel CH1 in a 525/60 system in the second embodiment of this invention.

FIG. 43 is a diagram of extended super-blocks corresponding to a 1-frame picture of a second channel CH2 in a 525/60 system in the second embodiment of this invention.

FIG. 44 is a diagram of extended super-blocks of a 525/60 system in the second embodiment of this invention.

FIG. 45 is a diagram of extended super-blocks corresponding to a 1-frame picture of a first channel CH1 in a 625/50 system in the second embodiment of this invention.

FIG. 46 is a diagram of extended super-blocks corresponding to a 1-frame picture of a second channel CH2 in a 625/50 system in the second embodiment of this invention.

FIG. 60 is a block diagram of a reproducing side of the digital VTR according to the third embodiment of this invention.

FIG. 61 is a block diagram of a data expander in FIG. 60.

FIG. 63 is a block diagram of a recording side of a digital VTR according to a fourth embodiment of this invention.

FIG. 66 is a block diagram of a reproducing side of the digital VTR according to the fourth embodiment of this invention.

FIG. 72 is a block diagram of a recording side of a digital VTR according to a fifth embodiment of this invention.

FIG. 74 is a detailed block diagram of the recording side of the digital VTR in FIG. 72.

FIG. 75 is a block diagram of a reproducing side of the digital VTR according to the fifth embodiment of this invention.

DESCRIPTION OF THE PREFERRED EMBODIMENTS

A prior-art digital VTR will be explained hereinafter for a better understanding of this invention.

Figure 1:
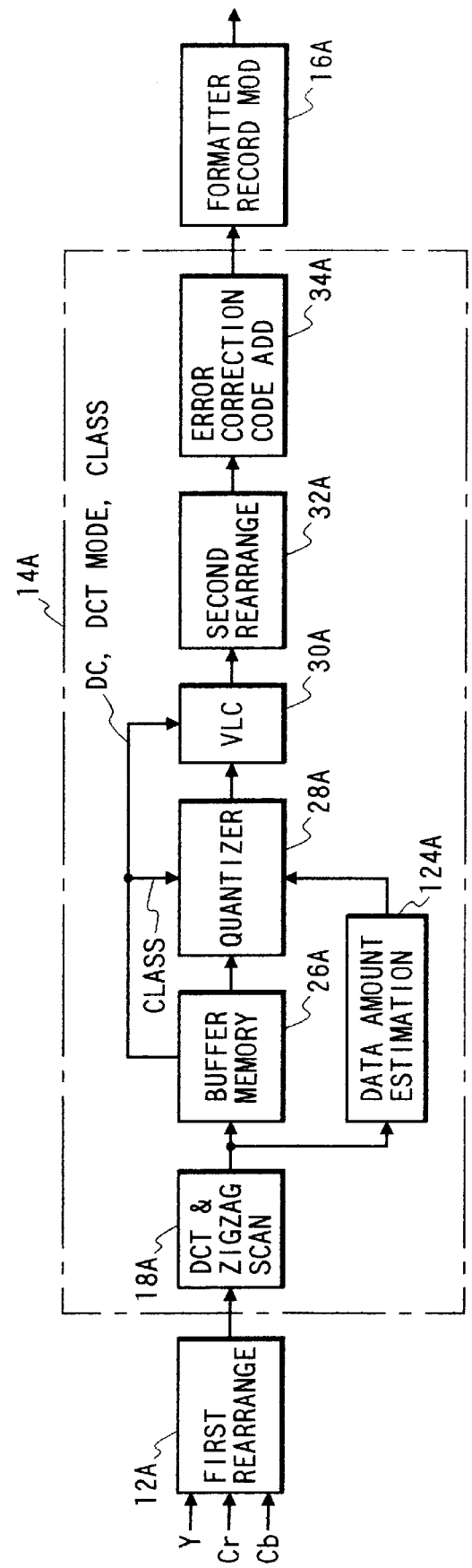
FIG. 1 is a block diagram of a recording side of a prior-art digital VTR.

FIG. 1 shows a recording side of a prior-art digital VTR designed to handle digital component video signals, that is, digital Y, Cr, and Cb signals of a given television format such as an NTSC system or a PAL system. Here, the Y signal means a luminance signal. In addition, the Cr signal means an R-Y signal (a first color difference signal) while the Cb signal means a B-Y signal (a second color difference signal). The digital Y, Cr, and Cb signals are generated from analog Y, Cr, and Cb signals by analog-to-digital conversion including sampling processes. The ratio among the sampling frequencies for the respective analog Y, Cr, and Cb signals is "4:1:1" or "4:2:0". The analog Y, Cr, and Cb signals result from interlaced scanning so that two successive fields represented by the analog Y, Cr, and Cb signals compose one frame.

In conformity with ITU-R Recommendation 601, the frame size related to the digital Y, Cr, and Cb signals is designed as follows. In the case of a 525/60 system (that is, an NTSC system), the frame size is chosen so that the number of samples (pixels) of a Y signal will be equal to 720 (in the horizontal direction) by 480 (the vertical direction) while the number of samples of each of a Cr signal and a Cb signal will be equal to 180 (the horizontal direction) by 480 (the vertical direction). Here, "525" means the number of horizontal scanning lines per frame, and "60" means the number of fields per second. In the case of a 625/50 system (that is, a PAL system), the frame size is chosen so that the number of samples (pixels) of a Y signal will be equal to 720 (the horizontal direction) by 576 (the vertical direction) while the number of samples of each of a Cr signal and a Cb signal will be equal to 360 (the horizontal direction) by 288 (the vertical direction). Here, "625" means the number of horizontal scanning lines per frame, and "50" means the number of fields per second.

As shown in FIG. 1, the recording side of the prior-art digital VTR includes a first rearranging circuit 12A having frame memories into which the digital Y, Cr, and Cb signals are stored frame by frame respectively. The digital Y, Cr, and Cb signals are read out from the frame memories signal-block by signal-block according to predetermined rules to implement given signal-piece rearrangement in every frame. Here, every signal block corresponds to 64 neighboring pixels equal to 8 pixels (in the horizontal direction) by 8 pixels (in the vertical direction). In addition, every signal block agrees with a DCT (discrete cosine transform) block. The digital Y, Cr, and Cb signals outputted from the first rearranging circuit 12A will be processed by later-stage circuits DCT-block by DCT-block.

Figure 2:
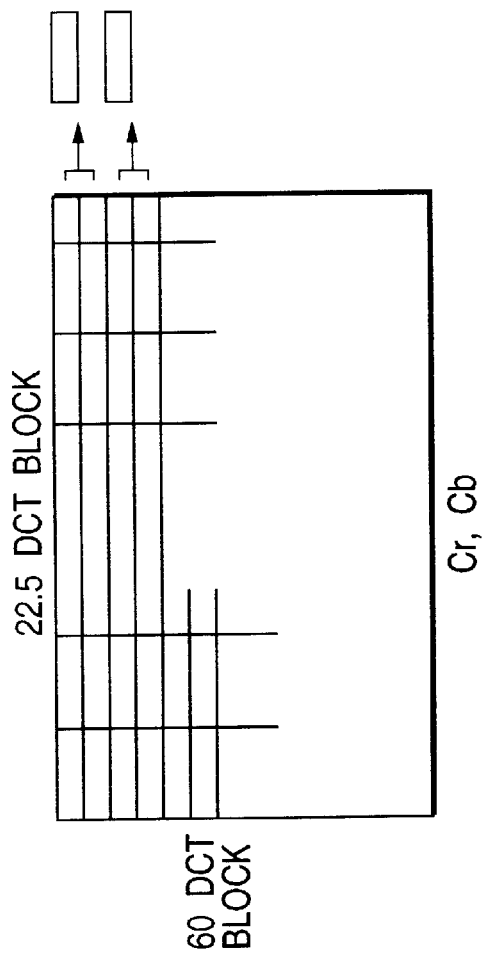
FIG. 2 is a diagram of Y-signal DCT blocks corresponding to a 1-frame picture of a 525/60 system.
Figure 3:
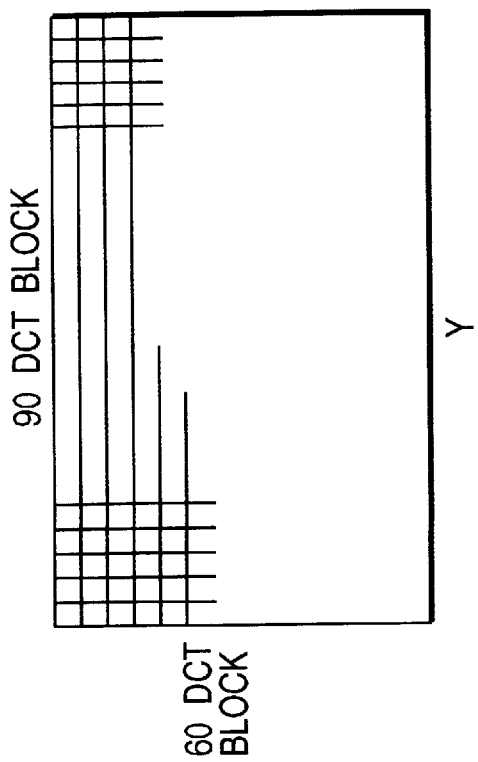
FIG. 3 is a diagram of Cr-signal DCT blocks or Cb-signal DCT blocks corresponding to a 1-frame picture of a 525/60 system.

FIGS. 2 and 3 show the relations between every frame and DCT blocks regarding the 525/60 system. As shown in FIG. 2, every 1-frame picture related to the digital Y signal outputted from the first rearranging circuit 12A is composed of 90 DCT blocks (in the horizontal direction) by 60 DCT blocks (in the vertical direction). As shown in FIG. 3, every 1-frame picture related to the digital Cr or Cb signal outputted from the first rearranging circuit 12A is composed of 22.5 DCT blocks (in the horizontal direction) by 60 DCT blocks (in the vertical direction). As shown in FIG. 3, half-size blocks appear along the right-hand edge of every frame. The half-size blocks are paired. Each pair of neighboring half-size blocks constitutes a normal-size DCT block. Each pair is handled as a normal DCT block.

FIGS. 4 and 5 show the relations between every frame and DCT blocks regarding the 625/50 system. As shown in FIG. 4, every 1-frame picture related to the digital Y signal outputted from the first rearranging circuit 12A is composed of 90 DCT blocks (in the horizontal direction) by 72 DCT blocks (in the vertical direction). As shown in FIG. 5, every 1-frame picture related to the digital Cr or Cb signal outputted from the first rearranging circuit 12A is composed of 45 DCT blocks (in the horizontal direction) by 36 DCT blocks (in the vertical direction).

With reference back to FIG. 1, a DCT and zigzag scan circuit 18A follows the first rearranging circuit 12A. Every 1-DCT-block corresponding segment of the digital Y, Cr, and Cb signals outputted from the first rearranging circuit 12A is subjected to two-dimensional discrete cosine transform (two-dimensional DCT) by the DCT and zigzag scan circuit 18A. For every 1-DCT-block corresponding segment of the digital Y, Cr, and Cb signals, the discrete cosine transform (DCT) generates 64 DCT coefficients having 63 AC coefficients and one DC coefficient. Data pieces representing 63 AC coefficients are rearranged in a zigzag scan order by the DCT and zigzag scan circuit 18A before being outputted therefrom. The AC-coefficient data pieces outputted from the DCT and zigzag scan circuit 18A are stored into a buffer memory 26A. Also, the AC-coefficient data pieces are fed from the DCT and zigzag scan circuit 18A to a data amount estimation circuit 124A.

The discrete cosine transform implemented by the DCT and zigzag scan circuit 18A is changeable between two different modes. Information (DCT mode information) of the mode of the actually-implemented discrete cosine transform, class information representing a value corresponding to the activity of a related DCT block, and a data piece representing a DC coefficient are outputted from the DCT and zigzag scan circuit 18A, and are stored into the buffer memory 26A.

The data amount estimation circuit 124A operates for data-amount control or data-rate control. Specifically, the data amount estimation circuit 124A estimates the amounts of variable-length-code data (the numbers of bits of variable-length-code data) from the AC coefficients for various quantization levels respectively. The data amount estimation circuit 124A decides a basic quantization step size in consideration of the estimated amounts of variable-length-code data. The basic quantization step size is chosen to enable the actual amount of variable-length-code data to be substantially fixed in every given period of time which corresponds to a predetermined number of DCT blocks. The data amount estimation circuit 124A informs an adaptive quantizer 28A of the basic quantization step size.

The AC-coefficient data pieces are fed from the buffer memory 26A to the adaptive quantizer 28A. Also, the class information is fed from the buffer memory 26A to the adaptive quantizer 28A. The adaptive quantizer 28A quantizes the AC-coefficient data pieces in response to the basic quantization step size and the class information. The quantization implemented by the adaptive quantizer 28A is designed in consideration of a human visual sensation. Specifically, data pieces representing low-frequency AC coefficients are exposed to fine quantization while data pieces representing high-frequency AC coefficients are exposed to rough quantization.

The quantization-resultant data pieces are outputted from the adaptive quantizer 28A to a VLC (variable length coding) circuit 30A. The DC-coefficient data piece, the DCT mode information, and the class information are fed from the buffer memory 26A to the VLC circuit 30A. The VLC circuit 30A combines the quantization-resultant data pieces, the DC-coefficient data piece, the DCT mode information, and the class information, and encodes the resultant combination into corresponding data of a given variable length code.

A second rearranging circuit 32A following the VLC circuit 30A includes a memory into which the variable-length-code data is written from the VLC circuit 30A as video-segment data.

Figure 7:
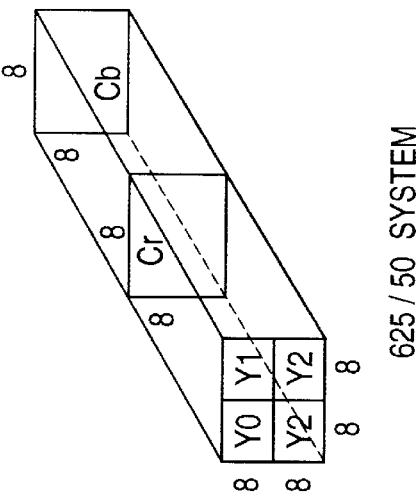
FIG. 7 is a diagram of a macro-block represented by digital video signals of a 625/50 system having a sampling frequency ratio of "4:2:0".
Figure 6:
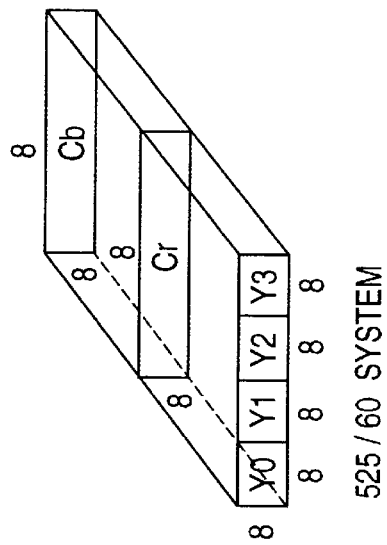
FIG. 6 is a diagram of a macro-block represented by digital video signals of a 525/60 system having a sampling frequency ratio of "4:1:1".

Here, "video segment" is a signal unit used in the data processing by the data amount estimation circuit 124A, the adaptive quantizer 28A, and the VLC circuit 30A. Every video segment is composed of five macro-blocks. Every macro-block is composed of six DCT blocks equal to four Y-signal DCT blocks, one Cr-signal DCT block, and one Cb-signal DCT block. Specifically, in the case of the 525/60 system, every macro-block is composed of four Y-signal DCT blocks, one Cr-signal DCT block, and one Cb-signal DCT block arranged in a manner shown in FIG. 6. Four Y-signal DCT blocks, one Cr-signal DCT block, and one Cb-signal DCT block in every macro-block correspond to a common segment of a frame. In the case of the 625/50 system, every macro-block is composed of four Y-signal DCT blocks, one Cr-signal DCT block, and one Cb-signal DCT block arranged in a manner shown in FIG. 7. Four Y-signal DCT blocks, one Cr-signal DCT block, and one Cb-signal DCT block in every macro-block correspond to a common segment of a frame.

Figure 9:
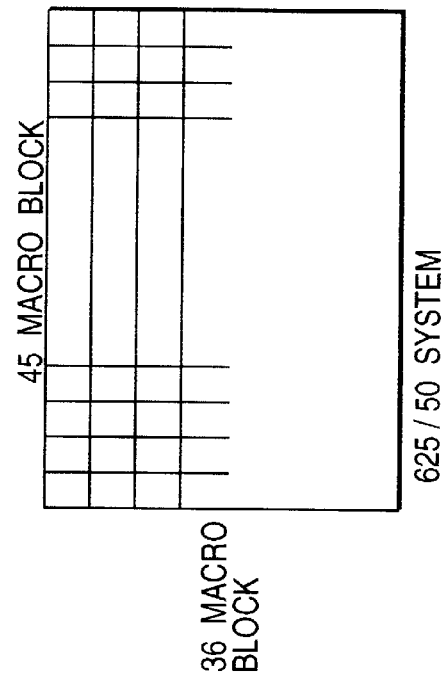
FIG. 9 is a diagram of macro-blocks corresponding to a 1-frame picture of a 625/50 system having a sampling frequency ratio of "4:2:0".
Figure 8:
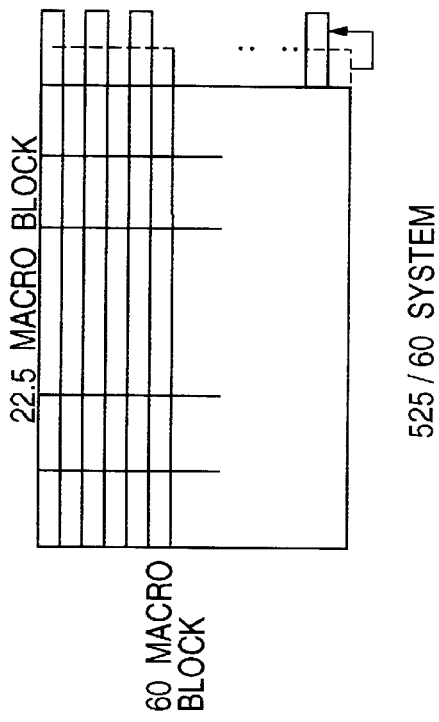
FIG. 8 is a diagram of macro-blocks corresponding to a 1-frame picture of a 525/60 system having a sampling frequency ratio of "4:1:1".

As shown in FIG. 8, in the case of the 525/60 system, every 1-frame picture is composed of 22.5 macro-blocks (in the horizontal direction) by 60 macro-blocks (in the vertical direction). As shown in FIG. 8, half-size macro-blocks appear along the right-hand edge of every frame. The half-size macro-blocks are paired. Each pair of neighboring half-size macro-blocks constitutes a normal-size macro-block. Each pair is handled as a normal macro-block. Specifically, a half-size macro-block in every other horizontal line of macro-blocks is combined with a half-size macro-block in the immediately upper horizontal line. As shown in FIG. 9, in the case of the 625/50 system, every 1-frame picture is composed of 45 macro-blocks (in the horizontal direction) by 36 macro-blocks (in the vertical direction).

As previously indicated, every video segment is composed of five macro-blocks. Specifically, five macro-blocks are collected into a video segment from widely distributed positions in a frame according to predetermined rules. Thus, the positions of five macro-blocks in a frame extend over a wide range. The previously-indicated data-amount control is implemented video-segment by video-segment.

The reason for the collection of five macro-blocks from widely distributed positions in a frame is as follows. Even in the presence of a bias in an information-amount distribution in a frame, the collection of five macro-blocks from widely distributed positions in the frame equalizes the amounts of information in different video segments so that a uniform picture quality is available over the frame. This process is referred to as shuffling.

The shuffling is implemented in the readout of the AC-coefficient data pieces from the buffer memory 26A. Therefore, the AC-coefficient data pieces are fed to the adaptive quantizer 28A video-segment by video-segment. Data pieces in each of five macro-blocks in a video segment are quantized by the adaptive quantizer 28A at quantization step sizes which are controlled in response to the basic quantization step size and the class information. The quantization step sizes are chosen so that the amount of data (the number of bits) in the video segment will be slightly lower than a given amount. As previously explained, the quantization-resultant data pieces and other data pieces are encoded by the VLC circuit 30A into corresponding data of a given variable length code. The variable-length-code data is stored into five memory units in the VLC circuit 30A.

The five memory units in the VLC circuit 30A substantially correspond to five macro-blocks in every video segment, respectively. Each memory unit stores all data or almost all data in the corresponding macro-block. In some cases, at least one memory unit additionally stores AC-coefficient data pieces in a macro-block or macro-blocks other than the corresponding macro-block.

Figure 10:
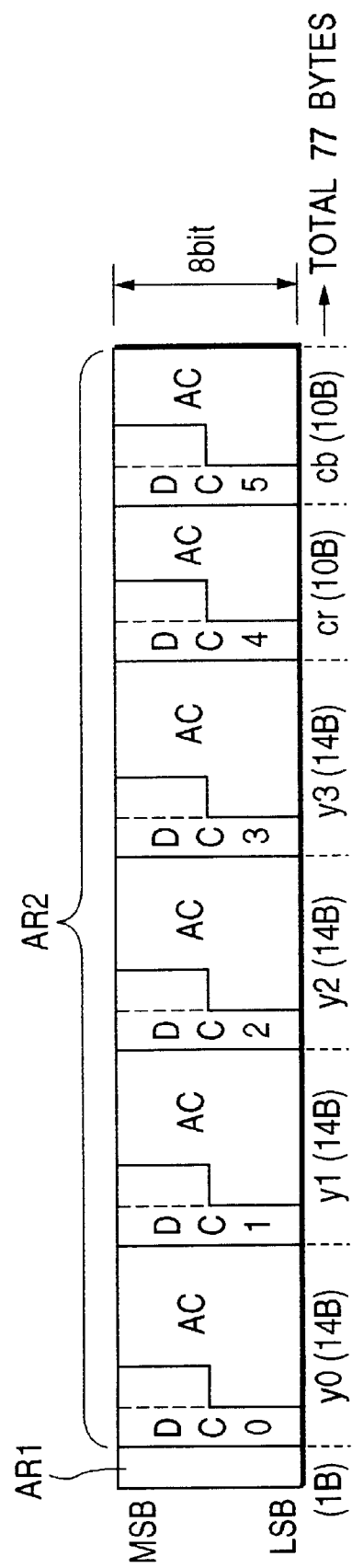
FIG. 10 is a diagram of a memory unit corresponding to a data unit.

As shown in FIG. 10, each memory unit in the VLC circuit 30A has a control-information area AR1 and a main-information area AR2. The control-information area AR1 stores data of used quantization step sizes, and also data of other control information. The control-information area AR1 has a size of one byte. The main-data area AR2 is divided into six sub areas substantially corresponding to six DCT blocks composing one macro-block. The sub areas are also referred to as DCT coefficient areas. Four DCT coefficient areas for a Y signal have a size of 14 bytes. Two DCT coefficient areas for Cr and Cb signals have a size of 10 bytes. Accordingly, one memory unit in the VLC circuit 30A has a size of 77 bytes. Each of the six DCT coefficient areas has a 12-bit region and a remaining region assigned to a DC-coefficient data piece and AC-coefficient data pieces of the variable length code respectively. The 12-bit region is also referred to as a DC region while the remaining region is also referred to as an AC region. It should be noted that a DC-coefficient data piece generally has 9 bits. The 12-bit region stores information of characteristics of the related discrete cosine transform (DCT) in addition to the DC-coefficient data piece in the related DCT block. It should be noted that the information of characteristics of the related discrete cosine transform (DCT) will be used in recovering original data from the DCT block. Specifically, the 12-bit region stores the DCT mode information and the class information having one bit and two bits per DCT block respectively.

The writing of data into the five memory units in the VLC circuit 30A is implemented as follows. Regarding each of the five memory units, DC-coefficient data pieces and other information pieces in a corresponding macro-block are stored into the six 12-bit DC regions. In addition, AC-coefficient data pieces of the variable length code for six DCT blocks are sequentially stored into the six AC regions respectively. The storing sequence starts from the lowest order coefficient data piece toward the highest order coefficient data piece. A given code word representing an end of a block (EOB) is added to the end of a final AC-coefficient data piece of the variable length code for a DCT block. Overflow data pieces, which can not be stored into the six AC regions, are stored into an overflow memory in the VLC circuit 30A. When the writing of data into the six DCT coefficient areas of each memory unit is completed, typical memory conditions are such that some of the DCT coefficient areas have unoccupied portions and the others are fully occupied. In some cases, there are overflow data pieces which can not be stored into the DCT coefficient areas. These processes are carried out for each of the five memory units.

In the presence of overflow data pieces, a related memory unit is searched for unoccupied places in a sequence starting from the head area (the head DCT coefficient area). The overflow data pieces are sequentially stored into the unoccupied places in the memory unit regardless of the correspondence relation between the DCT blocks and the DCT coefficient areas. In some cases, as a result of these processes, there are second overflow data pieces which can not be stored into the unoccupied places in the memory unit. The second overflow data pieces are stored into the overflow memory or a second overflow memory in the VLC circuit 30A. When the above-indicated processes related to the unoccupied places in the memory unit is completed, typical memory conditions are such that some of the DCT coefficient areas have unoccupied portions and the others are fully occupied. In some cases, all the DCT coefficient areas in the memory unit are fully occupied. In these cases, there is a chance of the occurrence of second overflow data pieces. These processes are carried out for each of the five memory units.

In the presence of second overflow data pieces, the memory units are searched for unoccupied places in a sequence from the first memory unit to the last memory unit. The second overflow data pieces are sequentially stored into the unoccupied places in the memory unit or units regardless of the correspondence relation between the memory units and the macro-blocks, and also regardless of the correspondence relation between the DCT blocks and the DCT coefficient areas. As a result of these processes, all the second overflow data pieces are stored in the memory unit or units. In other words, all data pieces in a video segment are stored in the five memory units. These satisfactory conditions are ensured by the control of the quantization step sizes via the data amount estimation circuit 124A.

In this way, variable-length-code data pieces in every video segment are separated into five groups stored in the five memory units respectively. Variable-length-code data pieces in a video segment is also referred to as 1-video-segment data. As previously explained, data pieces in one macro-block are stored into a memory unit in the sequence from the lowest DCT order to the highest DCT order. This sequentially storing process provides an advantage as follows. If data pieces in some of the five memory units are reproduced but data pieces in the others fail to be reproduced during search or fast playback, the reproduced data pieces provide only small decreases in picture quality in connection with the corresponding memory units.

Video-segment data is fed from the VLC circuit 30A to the second rearranging circuit 32A. As previously explained, the video-segment data results from collecting five macro-blocks from widely distributed positions in a frame according to predetermined rules. The second rearranging circuit 32A serves to rearrange video-segment data pieces into a sequence such that corresponding data pieces sequentially recorded on tracks of a recording medium will represent sequentially-arranged picture portions of a frame respectively. This data-piece rearrangement provides more understandable reproduced pictures during search or fast playback.

The data-piece rearrangement by the second rearranging circuit 32A is implemented super-block by super-block. Every super-block is composed of 27 macro-blocks. Every super-block is denoted by "Si,j" where "i" indicates a variable integer representative of a super-block vertical address with respect to a frame, and "j" indicates a variable integer representative of a super-block horizontal address with respect to the frame. In the case of the 525/60 system, i=0, 1, 2, 3, . . . , 9 while j=0, 1, 2, 3, 4. In the case of the 525/60 system, super-blocks in every frame are of three types (first, second, and third types) different from each other in configuration of 27 data units corresponding to 27 macro-blocks respectively. Here, every data unit also corresponds to a memory unit in the VLC circuit 30A. Super-blocks Si,0 and Si,2 are of the first type shown in an upper part of FIG. 11 where 27 data units are numbered as "0", "1", "2", . . . , "26". Super-blocks Si,1 and Si,3 are of the second type shown in an intermediate part of FIG. 11. Super-blocks Si,4 are of the third type shown in a lower part of FIG. 11.

In the case of the 625/50 system, i=0, 1, 2, 3, . . . , 11 while j=0, 1, 2, 3, 4. In the case of the 625/50 system, super-blocks in every frame are of a common type with respect to configuration of 27 data units corresponding to 27 macro-blocks. The structure of every super-block in the 625/50 system is shown in FIG. 12 where 27 data units are numbered as "0", "1", "2", . . . , "26".

In the case of the 525/60 system, the number of tracks on a recording medium per frame is equal to 10. In addition, super-blocks Si,j are arranged to form a frame as shown in FIG. 13. Specifically, every fame is divided into 10 horizontally-extending portions assigned to 10 tracks respectively. Five super-blocks S0,0, S0,1, S0,2, S0,3, and S0,4 are sequentially arranged in the upper most horizontally-extending portion of the frame from the left to the right of the frame. Next five super-blocks S1,0, S1,1, S1,2, S1,3, and S1,4 are sequentially arranged in the second upper most horizontally-extending portion of the frame from the left to the right of the frame. Later super-blocks are similarly arranged in the subsequent horizontally-extending portions of the frame.

In the case of the 625/50 system, the number of tracks on a recording medium per frame is equal to 12. In addition, super-blocks Si,j are arranged to form a frame as shown in FIG. 14.

Specifically, every fame is divided into 12 horizontally-extending portions assigned to 12 tracks respectively. Five super-blocks S0,0, S0,1, S0,2, S0,3, and S0,4 are sequentially arranged in the upper most horizontally-extending portion of the frame from the left to the right of the frame. Next five super-blocks S1,0, S1,1, S1,2, S1,3, and S1,4 are sequentially arranged in the second upper most horizontally-extending portion of the frame from the left to the right of the frame. Later super-blocks are similarly arranged in the subsequent horizontally-extending portions of the frame.

With respect to every track, the second rearranging circuit 32A provides arrangement of five super-blocks in a common horizontally-extending portion of a frame in the order from the left to the right. For every super-block, the second rearranging circuit 32A operates so that 27 data units corresponding to 27 macro-blocks will be outputted in the order from "0" to "27" (see FIGS. 11 and 12). Accordingly, 135 data units are assigned to one track. It should be noted that every data unit corresponds to a memory unit in the VLC circuit 30A.

The recording side of the prior-art digital VTR of FIG. 1 includes an error correction code adding circuit 34A following the second rearranging circuit 32A. The error correction code adding circuit 34A receives the output signal of the second rearranging circuit 32A, that is, the rearrangement-resultant signal. The error correction code adding circuit 34A adds an inner code (inner-parity information or inner error checking and correcting information) and an outer code (outer-parity information or outer error checking and correcting information) to the output signal of the second rearranging circuit 32A. Specifically, outer code words are added to data segments with equal byte numbers which compose respective data units for every track. In addition, an inner code word is added for each of data units or outer code information pieces. The error correction code adding circuit 34A outputs the addition-resultant signal to a formatter and record modulation circuit 16A.

The DCT and zigzag scan circuit 18A, the buffer memory 26A, the adaptive quantizer 28A, the VLC circuit 30A, the second rearranging circuit 32A, the error correction code adding circuit 34A, and the data amount estimation circuit 124A compose a data compressing portion 14A.

The formatter and record modulation circuit 16A adds a sync signal and an ID number signal to every data unit or every outer code information piece, represented by the output signal of the error correction code adding circuit 34A, to complete a unit-containing sync block or an outer-parity-containing sync block. The formatter and record modulation circuit 16A subjects the resultant data sequences to modulation for record on a magnetic tape. The modulation-resultant signal is outputted from the formatter and record modulation circuit 16A before being recorded on a recording medium (for example, a magnetic tape) via a recording amplifier (not shown). The modulation-resultant signal may be outputted from the formatter and record modulation circuit 16A to a transmission line via a transmission circuit (not shown).

FIG. 15 shows the contents of data recorded on tracks on a recording medium (for example, a magnetic tape). In FIG. 15, the direction of movement of a magnetic tape is shown as a horizontal direction while the directions of movement of magnetic heads are shown as vertical directions. Every track corresponds to five super-blocks. An area of the magnetic tape which corresponds to one super-block contains 27 sync blocks. One sync block contains all information represented by one data unit. One data unit contains almost all information represented by a macro-block corresponding thereto. It should be noted that outer-parity-containing sync blocks and also information regions other than unit-containing sync blocks are omitted from FIG. 15.

Figure 16:
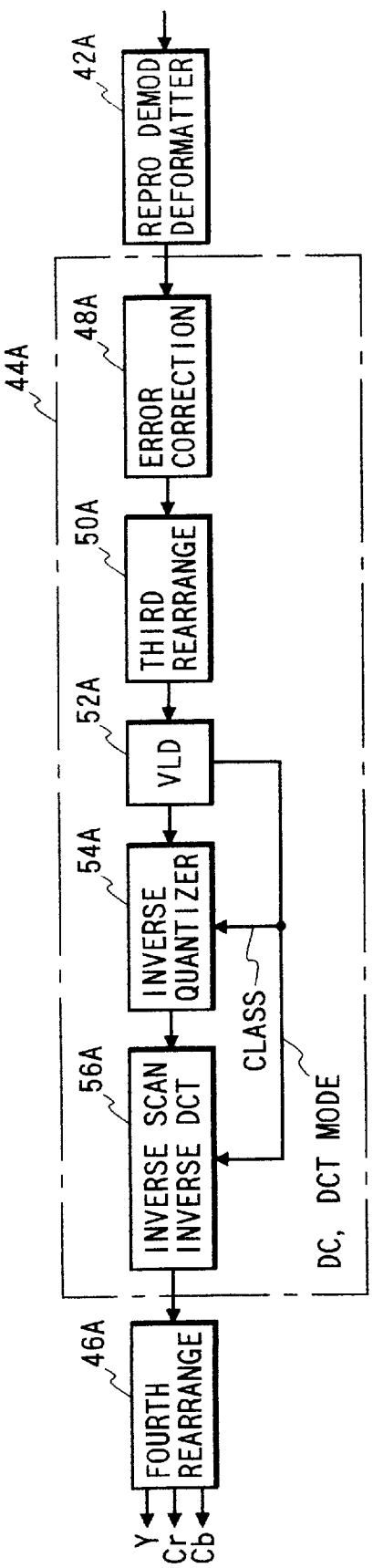
FIG. 16 is a block diagram of a reproducing side of the prior5 art digital VTR.

FIG. 16 shows a reproducing side of the prior-art digital VTR which includes a demodulation and deformatter circuit 42A. During playback or data reception, a reproducing circuit (not shown) or a receiving circuit (not shown) recovers a bit sequence from a reproduced signal or a received signal. The bit sequence is also referred to as the data sequence. The recovered data sequence is fed from the reproducing circuit or the receiving circuit to the demodulation and deformatter circuit 42A.

The demodulation and deformatter circuit 42A subjects the recovered data sequence to demodulation, sync detection, and ID detection. The demodulation and deformatter circuit 42A outputs the resultant data sequence to an error correction and interpolation circuit 48A.

The error correction and interpolation circuit 48A detects errors in the output signal of the demodulation and deformatter circuit 42A, and corrects the errors according to error checking and correcting information (an inner code and an outer code) contained in the output signal of the demodulation and deformatter circuit 42A. The error correction and interpolation circuit 48A includes a first frame memory loaded with data related to a current frame, and also a second frame memory loaded with data related to an immediately-preceding frame. When the correction of errors in a certain data unit of the current frame is difficult, this erroneous data unit of the current frame is replaced by a corresponding data unit of the immediately-preceding frame which is read out from the second frame memory. The error correction and interpolation circuit 48A outputs the error-correction-resultant signal to a third rearranging circuit 50A. The output signal of the error correction and interpolation circuit 48A corresponds to the output signal of the second rearranging circuit 32A in FIG. 1.

The third rearranging circuit 50A rearranges data pieces in the output signal of the error correction and interpolation circuit 48A. The data-piece rearrangement executed by the third rearranging circuit 50A is inverse with respect to the data-piece rearrangement executed by the second rearranging circuit 32A in FIG. 1. Accordingly, the data-piece rearrangement executed by the third rearranging circuit 50A retrieves the order or the sequence of video segments. The third rearranging circuit 50A outputs the rearrangement-resultant signal to a VLD (variable length decoding) circuit 52A.

The VLD circuit 52A decodes the output signal of the third rearranging circuit 50A, that is, the variable-length-code data, into main data pieces, a DC-coefficient data piece, DCT mode information, and class information. The decoding process executed by the VLD circuit 52A has an inverse relation with the encoding process executed by the VLC circuit 30A in FIG. 1. The decoding-resultant main data pieces represent quantization-resultant AC coefficients. The VLD circuit 52A outputs the quantization-resultant AC-coefficient data pieces and the class information to an inverse quantizer 54A. The VLD circuit 52A outputs the DC-coefficient data piece and the DCT mode information to an inverse zigzag scan and inverse DCT circuit 56A.

The inverse quantizer 54A subjects the quantization-resultant AC-coefficient data pieces to inverse quantization in response to the class information, thereby recovering original AC-coefficient data pieces. The inverse quantization executed by the inverse quantizer 54A is opposite to the quantization executed by the adaptive quantizer 28A in FIG. 1. Specifically, the operation of the inverse quantizer 54A is inverse with respect to the operation of the adaptive quantizer 28A in FIG. 1. The inverse quantizer 54A outputs the inverse-quantization-resultant signal to the inverse zigzag scan and inverse DCT circuit 56A. The output signal of the inverse quantizer 54A corresponds to the output signal of the buffer memory 26A or the output signal of the DCT and zigzag scan circuit 18A in FIG. 1.

For every 1-DCT-block, the inverse zigzag scan and inverse DCT circuit 56A rearranges data pieces (the output signal of the inverse quantizer 54A) of 63 AC coefficients in the original order or the normal order. For every 1-DCT-block, the inverse zigzag scan and inverse DCT circuit 56A subjects the rearrangement-resultant data pieces of 63 AC coefficients and the data piece of one DC coefficient to two-dimensional inverse discrete cosine transform responsive to the DCT mode information. Thereby, the inverse zigzag scan and inverse DCT circuit 56A recovers digital Y, Cr, and Cb signals. The inverse discrete cosine transform executed by the inverse zigzag scan and inverse DCT circuit 56A is opposite to the discrete cosine transform executed by the DCT and zigzag scan circuit 18A in FIG. 1. Specifically, the operation of the inverse zigzag scan and inverse DCT circuit 56A is inverse with respect to the operation of the DCT and zigzag scan circuit 18A in FIG. 1. The inverse zigzag scan and inverse DCT circuit 56A outputs the transform-resultant signal to a fourth rearranging circuit 46A. The output signal of the inverse zigzag scan and inverse DCT circuit 56A corresponds to the output signal of the first rearranging circuit 12A in FIG. 1. The transform-resultant signal, that is, the output signal of the inverse zigzag scan and inverse DCT circuit 56A, corresponds to digital Y, Cr, and Cb signals.

The error correction and interpolation circuit 48A, the third rearranging circuit 50A, the VLD circuit 52A, the inverse quantizer 54A, and the inverse zigzag scan and inverse DCT circuit 56A compose a data expanding portion 44A.

The fourth rearranging circuit 46A includes frame memories for digital Y, Cr, and Cb signals respectively. For each of the digital Y, Cr, and Cb signals, signal blocks represented by the output signal of the inverse zigzag scan and inverse DCT circuit 56A are sequentially stored into a related frame memory. Specifically, the signal blocks are written into memory storage segments in addresses corresponding to the original positions of the signal blocks with respect to a frame. Pieces of the digital Y signal are read out from the related memory in the normal line-by-line scanning order before being outputted from the fourth rearranging circuit 46A. Pieces of the digital Cr signal are read out from the related memory in the normal line-by-line scanning order before being outputted from the fourth rearranging circuit 46A. Pieces of the digital Cb signal are read out from the related memory in the normal line-by-line scanning order before being outputted from the fourth rearranging circuit 46A. In this way, the recovered digital Y, Cr, and Cb signals are outputted from the fourth rearranging circuit 46A. The operation of the fourth rearranging circuit 46A is inverse with respect to the operation of the first rearranging circuit 12A in FIG. 1.

First Embodiment

FIG. 17 shows a recording side of a digital VTR according to a first embodiment of this invention. As shown in FIG. 17, the recording side of the digital VTR includes a first rearranging circuit 12B, a data compressing portion 14B, and a formatter and record modulation circuit 16B. The first rearranging circuit 12B is followed by the data compressing portion 14B. The data compressing portion 14B is followed by the formatter and record modulation circuit 16B.

The data compressing portion 14B includes a first data compressor 14B-1 and a second data compressor 14B-2 arranged in parallel. The first and second data compressors 14B-1 and 14B-2 have equal structures. Accordingly, only the first data compressor 14B-1 will be explained in detail.

As shown in FIG. 18, the first data compressor 14B-1 includes a DCT and zigzag scan circuit 18B, a dummy DCT circuit 20B, a selection circuit 22B, a data amount estimation circuit 24B, a buffer memory 26B, an adaptive quantizer 28B, a VLC circuit 30B, a second rearranging circuit 32B, and an error correction code adding circuit 34B.

An input side of the DCT and zigzag scan circuit 18B is connected to an output side of the first rearranging circuit 12B in FIG. 17. Input sides of the selection circuit 22B are connected to output sides of the DCT and zigzag scan circuit 18B and the dummy DCT circuit 20B respectively. An input side of the buffer memory 26B is connected to an output side of the selection circuit 22B. An input side of the data amount estimation circuit 24B is connected to the output side of the selection circuit 22B. The buffer memory 26B is successively followed by the adaptive quantizer 28B, the VLC circuit 30B, the second rearranging circuit 32B, and the error correction code adding circuit 34B. An output side of the error correction code adding circuit 34B is connected to an input side of the formatter and record modulation circuit 16B in FIG. 17. The adaptive quantizer 28B is connected to an output side of the data amount estimation circuit 24B. The VLC circuit 30B is connected to the buffer memory 26B.

The DCT and zigzag scan circuit 18B is similar to the DCT and zigzag scan circuit 18A in FIG. 1. The data amount estimation circuit 24B, the buffer memory 26B, the adaptive quantizer 28B, the VLC circuit 30B, the second rearranging circuit 32B, and the error correction code adding circuit 34B are similar to the data amount estimation circuit 124A, the buffer memory 26A, the adaptive quantizer 28A, the VLC circuit 30A, the second rearranging circuit 32A, and the error correction code adding circuit 34A in FIG. 1 respectively. The connections among the data amount estimation circuit 24B, the buffer memory 26B, the adaptive quantizer 28B, the VLC circuit 30B, the second rearranging circuit 32B, and the error correction code adding circuit 34B are similar to those among the data amount estimation circuit 124A, the buffer memory 26A, the adaptive quantizer 28A, the VLC circuit 30A, the second rearranging circuit 32A, and the error correction code adding circuit 34A in FIG. 1.

Accordingly, the data compressor 14B-1 is similar to the data compressing portion 14A except that the dummy DCT circuit 20B and the selection circuit 22B are additionally provided. The dummy DCT circuit 20B serves to generate data representing dummy DCT blocks. The dummy DCT circuit 20B outputs the dummy DCT-block data to the selection circuit 22B. The device 22B selects one of the output signal of the DCT and zigzag scan circuit 18B and the output signal of the dummy DCT circuit 20B, and transmits the selected signal to the data amount estimation circuit 24B and the buffer memory 26B.

The recording side of the digital VTR of FIG. 17 is designed to handle digital component video signals, that is, digital Y, Cr, and Cb signals of a given television format such as an NTSC system (a 525/60 system) or a PAL system (a 625/50 system). Here, the Y signal means a luminance signal. In addition, the Cr signal means an R-Y signal (a first color difference signal) while the Cb signal means a B-Y signal (a second color difference signal). The digital Y, Cr, and Cb signals are generated from analog Y, Cr, and Cb signals by analog-to-digital conversion including sampling processes. The ratio among the sampling frequencies for the respective analog Y, Cr, and Cb signals is "4:2:2". The analog Y, Cr, and Cb signals result from interlaced scanning so that two successive fields represented by the analog Y, Cr, and Cb signals compose one frame.

In the recording side of the digital VTR of FIG. 17, the basic structure of the data compressing portion 14B has two data compressing sections each in a prior-art home-use digital VTR.

Accordingly, the data compressing portion 14B can use inexpensive parts for the prior-art home-use digital VTR. Specifically, the data compressing portion 14B except circuits for adding dummy DCT-block data is formed by IC's for the data compressing portion of the prior-art home-use digital VTR.

FIG. 19 shows the details of the recording side of the digital VTR in FIG. 17. As shown in FIG. 19, the first rearranging circuit 12B includes frame memories 12B-1, 12B-2, and 12B-3 for digital Y, Cr, and Cb signals respectively. The first rearranging circuit 12B further includes switch circuits 60-1 and 60-2. The frame memories 12B-1, 12B-2, and 12B-3 are connected to the switch circuit 60-1. Also, the frame memories 12B-1, 12B-2, and 12B-3 are connected to the switch circuit 60-2.

Digital Y, Cr, and Cb signals related to a sampling frequency ratio of "4:2:2" are stored into the frame memories 12B-1, 12B-2, and 12B-3 frame by frame, respectively. The digital Y, Cr, and Cb signals are read out from the frame memories 12B-1, 12B-2, and 12B-3 signal-block by signal-block according to predetermined rules to implement given signal-piece rearrangement in every frame. Here, every signal block corresponds to 64 neighboring pixels equal to 8 pixels (in the horizontal direction) by 8 pixels (in the vertical direction). In addition, every signal block agrees with a DCT (discrete cosine transform) block. During the reading of the digital Y, Cr, and Cb signals from the frame memories 12B-1, 12B-2, and 12B-3, each of the digital Y, Cr, and Cb signals is divided into two sequences of signal-block data pieces according to predetermined rules. The division-resultant data-piece sequences correspond to a group "a" and a group "b" respectively. The digital Y, Cr, and Cb signals outputted from the first rearranging circuit 12B will be processed by later-stage circuits DCT-block by DCT-block.

Specifically, the predetermined rules of the signal division are designed so that DCT blocks assigned to a same macro-block will be in a common group "a" or "b" corresponding to one of the division-resultant two data-piece sequences. DCT-block data pieces of the digital Y, Cr, and Cb signals in the group "a" are read out from the frame memories 12B-1, 12B-2, and 12B-3 in a predetermined shuffling order before being fed to the switch circuit 60-1 in the first rearranging circuit 12B. The switch circuit 60-1 multiplexes two Y signal pieces, one Cr signal piece, and one Cb signal piece for every same macro-block into a sequence of a first Y signal piece, a second Y signal piece, the Cr signal piece, and the Cb signal piece. The switch circuit 60-1 outputs the resultant sequence of DCT5 block data-pieces to a DCT circuit 62-1. Similarly, DCT-block data pieces of the digital Y, Cr, and Cb signals in the group "b" are read out from the frame memories 12B-1, 12B-2, and 12B-3 in the predetermined shuffling order before being fed to the switch circuit 60-2 in the first rearranging circuit 12B. The switch circuit 60-2 multiplexes two Y signal pieces, one Cr signal piece, and one Cb signal piece for every same macro-block into a sequence of a first Y signal piece, a second Y signal piece, the Cr signal piece, and the Cb signal piece. The switch circuit 60-2 outputs the resultant sequence of DCT-block data-pieces to a DCT circuit 62-2.

The DCT circuit 62-1 is in the first data compressor 14B-1 of FIG. 17. The DCT circuit 62-1 is in the DCT and zigzag scan circuit 18B of FIG. 18. The DCT circuit 62-2 is in the second data compressor 14B-2 of FIG. 17. The DCT circuit 62-2 is in a DCT and zigzag scan circuit within the second data compressor 14B-2.

The first data compressor 14B-1 in FIG. 17 processes the output signal of the first rearranging circuit 12B in the group "a". The second data compressor 14B-2 in FIG. 17 processes the output signal of the first rearranging circuit 12B in the group "b". The processes by the first and second data compressors 14B-1 and 14B-2 are similar to each other. Accordingly, only operation of the first data compressor 14B-1 will be explained in detail.

With reference back to FIG. 18, the DCT and zigzag scan circuit 18B in the first data compressor 14B-1 follows the first rearranging circuit 12B of FIG. 17. Every 1-DCT-block corresponding segment of the "a"-group digital Y, Cr, and Cb signals outputted from the first rearranging circuit 12B is subjected to two-dimensional discrete cosine transform (two-dimensional DCT) by the DCT and zigzag scan circuit 18B. For every 1-DCT-block corresponding segment of the "a"-group digital Y, Cr, and Cb signals, the discrete cosine transform (DCT) generates 64 DCT coefficients having 63 AC coefficients and one DC coefficient. Data pieces representing 63 AC coefficients are rearranged in a zigzag scan order by the DCT and zigzag scan circuit 18B before being outputted therefrom. The AC-coefficient data pieces outputted from the DCT and zigzag scan circuit 18B are fed via the selection circuit 22B to the buffer memory 26B, and are then stored into the buffer memory 26B. Also, the AC-coefficient data pieces are fed from the DCT and zigzag scan circuit 18B to the data amount estimation circuit 24B via the selection circuit 22B.

In FIG. 19, a zigzag scan circuit 64-1 follows the DCT circuit 62-1. The DCT circuit 62-1 and the zigzag scan circuit 64-1 compose the DCT and zigzag scan circuit 18B in FIG. 18. The DCT circuit 62-1 implements the discrete cosine transform. The zigzag scan circuit 64-1 implements the rearrangement of the AC-coefficient data pieces.

The discrete cosine transform implemented by the DCT and zigzag scan circuit 18B in FIG. 18 is changeable between two different modes. Information (DCT mode information) of the mode of the actually-implemented discrete cosine transform, class information representing a value corresponding to the activity of a related DCT block, and a data piece representing a DC coefficient are outputted from the DCT and zigzag scan circuit 18B, and are then stored into the buffer memory 26B.

In FIG. 19, a switch circuit 68-1 is connected between the zigzag scan circuit 64-1 and a buffer memory 70-1. The buffer memory 70-1 in FIG. 19 corresponds to the buffer memory 26B in FIG. 18. AC-coefficient data pieces are transmitted from the zigzag scan circuit 64-1 to the buffer memory 70-1 via the switch circuit 68-1. In FIG. 19, a switch circuit 66-1 is connected between the DCT circuit 62-1 and the buffer memory 70-1. The class information, the DCT mode information, and the DC-coefficient data piece are transmitted from the DCT circuit 62-1 to the buffer memory 70-1 via the switch circuit 66-1.

With reference to FIG. 18, the dummy DCT circuit 20B outputs dummy DCT-block data to the selection circuit 22B. For example, the dummy DCT-block data agrees with a signal of a bit sequence of "0". The selection circuit 22B multiplexes the output signal of the DCT and zigzag scan circuit 18B and the output signal of the dummy DCT circuit 20B into dummy-added DCT-block data. The dummy-added DCT-block data is fed to the buffer memory 26B before being stored thereinto. The dummy-added DCT-block data is also fed to the data amount estimation circuit 24B.

In FIG. 19, a signal of "0" is applied to the switch circuit 68-1 as dummy data. The switch circuit 68-1 combines the dummy data pieces and the AC-coefficient data pieces outputted from the zigzag scan circuit 64-1. Thereby, the switch circuit 68-1 provides dummy-added AC-coefficient data pieces. The switch circuit 68-1 outputs the dummy-added AC-coefficient data pieces to the buffer memory 70-1 and the data amount estimation circuit 24B-1. The dummy-added AC coefficient data is stored into the buffer memory 70-1. A signal of "0" is applied to the switch circuit 66-1 as dummy data. As previously explained, the switch circuit 66-1 receives the DC-coefficient data piece, the DCT mode information, and the class information from the DCT circuit 62-1. The switch circuit 66-1 combines the dummy data pieces, the DC-coefficient data piece, the DCT mode information, and the class information. The combination-resultant signal is outputted from the switch circuit 66-1 to the buffer memory 70-1 before being stored therein. The switch circuits 66-1 and 68-1 compose the selection circuit 22B in FIG. 17.

With reference to FIG. 18, the data amount estimation circuit 24B operates for data-amount control or data-rate control. Specifically, the data amount estimation circuit 24B estimates the amounts of variable-length-code data (the numbers of bits of variable-length-code data) from the AC coefficients for various quantization levels respectively. The data amount estimation circuit 24B decides a basic quantization step size in consideration of the estimated amounts of variable-length-code data. The basic quantization step size is chosen to enable the actual amount of variable-length-code data to be substantially fixed in every given period of time corresponding to a predetermined number of DCT blocks.

The data amount estimation circuit 24B informs the adaptive quantizer 28B of the basic quantization step size.

The dummy-added AC-coefficient data pieces are fed from the buffer memory 26B to the adaptive quantizer 28B. Also, the class information is fed from the buffer memory 26B to the adaptive quantizer 28B. The adaptive quantizer 28B quantizes the dummy-added AC-coefficient data pieces at quantization step sizes which are controlled in response to the basic quantization step size and the class information. The quantization implemented by the adaptive quantizer 28B is designed in consideration of a human visual sensation. Specifically, data pieces representing low-frequency AC coefficients are exposed to fine quantization while data pieces representing high-frequency AC coefficients are exposed to rough quantization.

In FIG. 19, the buffer memory 70-1 is followed by an adaptive quantizer 72-1 corresponding to the adaptive quantizer 28B of FIG. 18. In addition, a data amount estimation circuit 24B-1 is connected between the switch circuit 68-1 and the adaptive quantizer 72-1. The data amount estimation circuit 24B-1 corresponds to the data amount estimation circuit 24B in FIG. 18.

With reference to FIG. 18, the quantization-resultant data pieces are outputted from the adaptive quantizer 28B to a VLC (variable length coding) circuit 30B. The DC-coefficient data piece, the DCT mode information, and the class information are fed from the buffer memory 26B to the VLC circuit 30B. The VLC circuit 30B combines the quantization-resultant data pieces, the DC-coefficient data piece, the DCT mode information, and the class information, and encodes the resultant combination into corresponding data of a given variable length code. The variable-length code data is stored into a memory within the VLC circuit 30B. The DC-coefficient data piece has 9 bits per DCT block. The DCT mode information has one bit per DCT block. The class information has two bits per DCT data block. For every DCT block, the DC-coefficient data piece, the DCT mode information, and the class information are stored into an exclusive area of the memory within the VLC circuit 30B. The variable-length code data is read out from the memory before being outputted from the VLC circuit 30B.

In FIG. 19, the adaptive quantizer 72-1 is followed by a VLC circuit 74-1 corresponding to the VLC circuit 30B of FIG. 18. The VLC circuit 74-1 is connected to the buffer memory 70-1.

As shown in FIG. 18, the second rearranging circuit 32B follows the VLC circuit 30B. The second rearranging circuit 32B includes a memory into which the variable-length-code data is written from the VLC circuit 30B as video-segment data.

Here, "video segment" is a signal unit used in the data processing by the data amount estimation circuit 24B, the adaptive quantizer 28B, and the VLC circuit 30B. Every video segment is composed of five macro-blocks. Every macro-block is composed of six DCT blocks equal to two Y-signal DCT blocks, one Cr-signal DCT block, one Cb-signal DCT block, and two dummy DCT blocks. The previously-indicated data-amount control is implemented video-segment by video-segment.

As previously explained, video-segment data is fed from the VLC circuit 30B to the second rearranging circuit 32B. The video-segment data results from collecting five macro-blocks from widely distributed positions in a frame according to predetermined rules. The second rearranging circuit 32B serves to rearrange video-segment data pieces into a sequence such that corresponding data pieces sequentially recorded on tracks of a recording medium will represent sequentially-arranged picture portions of a frame respectively. This data-piece rearrangement provides more understandable reproduced pictures during search or fast playback.

The data-piece rearrangement by the second rearranging circuit 32B is implemented super-block by super-block. Every super-block is composed of 27 macro-blocks. Every frame is divided into horizontally-extending portions each composed of five super-blocks. Five super-blocks in a same horizontally-extending portion of a frame form a video sector. Regarding each horizontally-extending portion of a frame, super-block data pieces are outputted from the second rearranging circuit 32B in the order from the left-hand super-block to the right-hand super-block. Super-block data pieces related to the uppermost horizontally-extending portion of a frame, super-block data pieces related to the second uppermost horizontally-extending portion of the frame, . . . , and super-block data pieces related to the lowermost horizontally-extending portion of the frame are sequentially outputted from the second rearranging circuit 32B on a portion-by-portion basis.

Every super-block is composed of 27 data units corresponding to 27 macro-blocks respectively. Here, every data unit also corresponds to a memory unit in the VLC circuit 30B. Every video sector is composed of 135 data units. Regarding each of the first and second data compressors 14B-1 and 14B-2, the number of video sectors is equal to 10 per frame in the case of the 525/60 system. Regarding each of the first and second data compressors 14B-1 and 14B-2, the number of video sectors is equal to 12 per frame in the case of the 625/50 system.

As shown in FIG. 18, the error correction code adding circuit 34B follows the second rearranging circuit 32B. The error correction code adding circuit 34B receives the output signal of the second rearranging circuit 32B, that is, the rearrangement-resultant signal. The error correction code adding circuit 34B adds an inner code (inner-parity information or inner error checking and correcting information) and an outer code (outer-parity information or outer error checking and correcting information) to the output signal of the second rearranging circuit 32B. Specifically, outer code words are added to data segments with equal byte numbers which compose respective data units for every track. In addition, an inner code word is added for each of data units or outer code information pieces. The error correction code adding circuit 34B outputs the addition-resultant signal to the formatter and record modulation circuit 16B (see FIG. 17) as an output signal of the first data compressor 14B-1 (see FIG. 17). The output signal of the first data compressor 14B-1 originates from the digital Y, Cr, and Cb signals in the group "a".

In FIG. 19, the VLC circuit 74-1 is followed by a buffer memory 76-1 corresponding to the second rearranging circuit 32B of FIG. 18. The output signal of the VLC circuit 74-1 is stored into the buffer memory 76-1. An outer code generator 78-1 is connected to the buffer memory 76-1. The outer code generator 78-1 corresponds to a first part of the error correction code adding circuit 34B of FIG. 18. The outer code generator 78-1 sequentially reads out signal pieces from the buffer memory 76-1, and sequentially generates corresponding outer-code words. The outer code generator 78-1 sequentially writes the outer-code words into the buffer memory 76-1 to produce outer-code-added signal pieces. The outer-code-added signal pieces are read out from the buffer memory 76-1 in a given order corresponding to the data-piece rearrangement implemented by the second rearranging circuit 32B of FIG. 18. An inner code generator 80-1 is connected to the buffer memory 76-1. The outer-code-added signal pieces are sequentially transmitted from the buffer memory 76-1 to the inner code generator 80-1. The inner code generator 80-1 produces inner code words for the outer-code-added signal pieces, and combines the inner code words and the outer-code-added signal pieces to generate signal pieces containing the outer code words and the inner code words. The inner code generator 80-1 outputs the generated signal pieces. The inner code generator 80-1 corresponds to a second part of the error correction code adding circuit 34B of FIG. 18.

The second data compressor 14B-2 in FIG. 17 generates a signal containing error correcting information as the first data compressor 14B-1 does. The signal generated by the second data compressor 14B-2 originates from the digital Y, Cr, and Cb signals in the group "b". The second data compressor 14B-2 outputs the generated signal to the formatter and record modulation circuit 16B.

The formatter and record modulation circuit 16B adds a sync signal and an ID number signal to every data unit or every outer code information piece, represented by the output signal of the first data compressor 14B-1 or the second data compressor 14B-2, to complete a unit-containing sync block or an outer-parity-containing sync block. Since every data unit corresponds to a memory unit (for example, in the VLC circuit 30B), each sync block corresponds to a memory unit. In this way, there are generated a first sync-block data sequence originating from the digital Y, Cr, and Cb signals in the group "a" and a second sync-block data sequence originating from the digital Y, Cr, and Cb signals in the group "b".

The formatter and record modulation circuit 16B subjects the sync-block data sequences to modulation for record on a magnetic tape. The modulation-resultant signals are outputted from the formatter and record modulation circuit 16A before being recorded on a recording medium (for example, a magnetic tape). The modulation-resultant signal may be outputted from the formatter and record modulation circuit 16B to a transmission line via a transmission circuit (not shown).

In FIG. 19, the inner code generator 80-1 is followed by a sync and ID adding circuit 82-1. This circuit 82-1 adds a sync signal and an ID number signal to the output signal of the inner code generator 80-1 to generate a sequence of sync blocks related to the group "a". The sync and ID adding circuit 82-1 corresponds to a first part of the formatter and record modulation circuit 16B of FIG. 17.

The sync and ID adding circuit 82-1 is followed by a modulation circuit 84-1. The sync and ID adding circuit 82-1 outputs the sync-block data sequence of the group "a" to the modulation circuit 84-1. The sync-block data sequence of the group "a" is subjected by the modulation circuit 84-1 to modulation for record on a magnetic tape. The modulation circuit 84-1 corresponds to a second part of the formatter and record modulation circuit 16B of FIG. 17. The modulation-resultant signal related to the group "a" is transmitted from the modulation circuit 84-1 to a pair of magnetic heads A and A' via a recording amplifier 86-1.

In FIG. 19, an inner code generator 80-2 in the second data compressor 14B-2 (see FIG. 17) is followed by a sync and ID adding circuit 82-2. This circuit 82-2 adds a sync signal and an ID number signal to an output signal of the inner code generator 80-2 to generate a sequence of sync blocks related to the group "b". The sync and ID adding circuit 82-2 corresponds to a third part of the formatter and record modulation circuit 16B of FIG. 17.

The sync and ID adding circuit 82-2 is followed by a modulation circuit 84-2. The sync and ID adding circuit 82-2 outputs the sync-block data sequence of the group "b" to the modulation circuit 84-2. The sync-block data sequence of the group "b" is subjected by the modulation circuit 84-2 to modulation for record on a magnetic tape. The modulation circuit 84-2 corresponds to a fourth part of the formatter and record modulation circuit 16B of FIG. 17. The modulation-resultant signal related to the group "b" is transmitted from the modulation circuit 84-2 to a pair of magnetic heads B and B' via a recording amplifier 86-2.

The magnetic heads A, A', B, and B' are mounted on a rotary drum (not shown). The magnetic heads A and A' are opposed to and spaced from each other by an angle of 180 degrees. The magnetic heads A and A' have a "+" azimuth angle. The magnetic heads B and B' are opposed to and spaced from each other by an angle of 180 degrees. The magnetic heads B and B' have a "−" azimuth angle.

The modulation-resultant signal related to the group "a" is recorded on "+" azimuth tracks of a magnetic tape by the "+" azimuth heads A and A'. The modulation-resultant signal related to the group "b" is recorded on "−" azimuth tracks of the magnetic tape by the "−" azimuth heads B and B'. Generally, the "+" azimuth tracks alternate with the "−" azimuth tracks.

The magnetic heads A, A', B, and B' may be replaced by a pair of a "+" azimuth head and a "−" azimuth head. In this case, a buffer amplifier is provided between the sync and ID adding circuit 82-1 and the modulation circuit 84-1, and also a buffer amplifier is provided between the sync and ID adding circuit 82-2 and the modulation circuit 84-2. In addition, the modulation-resultant signal related to the group "a" is fed from the modulation circuit 84-1 to the "+" azimuth head via the recording amplifier 86-1 while the modulation-resultant signal related to the group "b" is fed from the modulation circuit 84-2 to the "−" azimuth head via the recording amplifier 86-2. Furthermore, the "+" azimuth head and the "−" azimuth head are rotated at a speed twice the speed of rotation of the magnetic heads A, A', B, and B'.

The output signals of the modulation circuits 84-1 and 84-2 or the output signals of the sync and ID adding circuits 82-1 and 82-2 may be fed to a transmission line via a transmission circuit (not shown).

Figure 20:
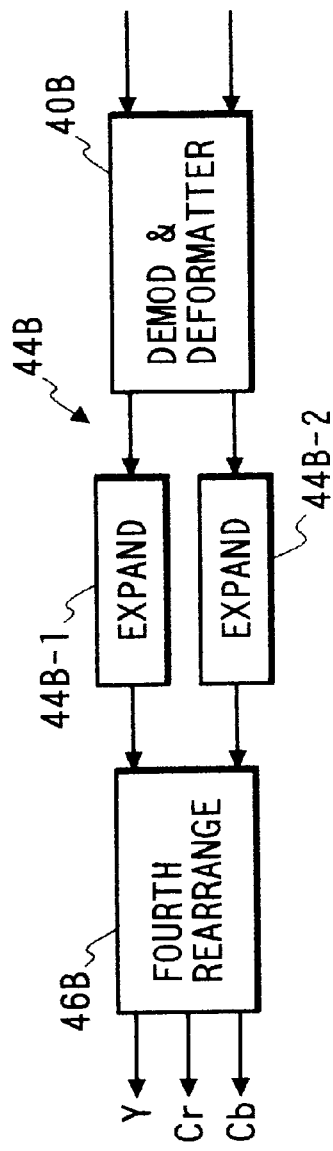
FIG. 20 is a block diagram of a reproducing side of the digital VTR according to the first embodiment of this invention.

FIG. 20 shows a reproducing side of the digital VTR according to the first embodiment of this invention. As shown in FIG. 20, the recording side of the digital VTR includes a demodulation and deformatter circuit 42B, a data expanding portion 44B, and a fourth rearranging circuit 46B. The demodulation and deformatter circuit 42B is successively followed by the data expanding portion 44B and the fourth rearranging circuit 46B.

The data expanding portion 44B includes a first data expander 44B-1 and a second data expander 44B-2. The first data expander 44B-1 processes data related to the group "a" while the second data expander 44B-2 processes data related to the group "b". The first and second data expanders 44B-1 and 44B-2 have equal structures. Accordingly, only the first data expander 44B-1 will be explained in detail.

Figure 21:
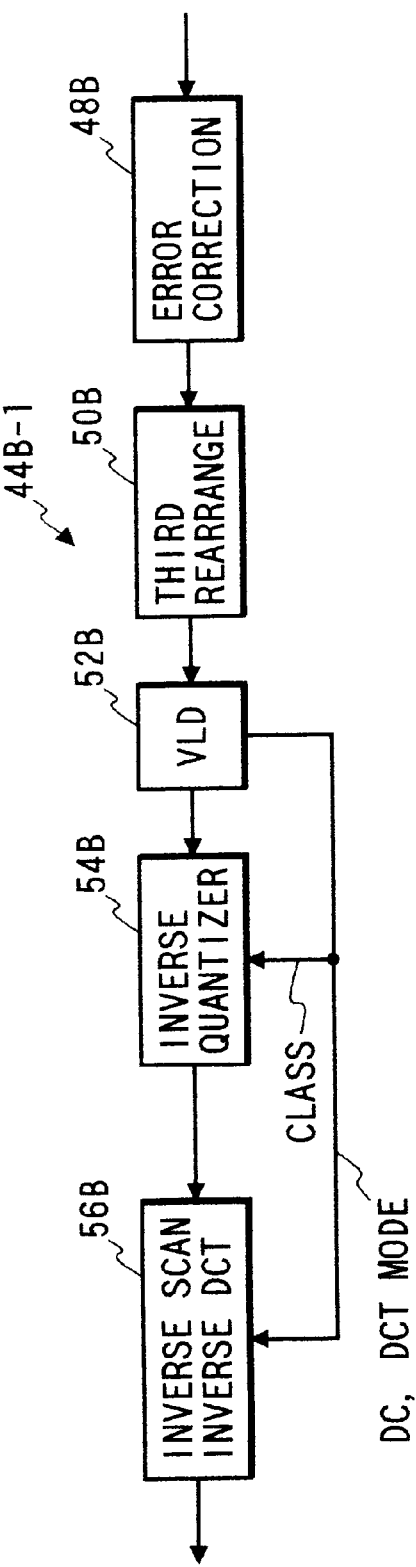
FIG. 21 is a block diagram of a data expander in FIG. 20.

As shown in FIG. 21, the first data expander 44B-1 includes an error correction and interpolation circuit 48B, a third rearranging circuit 50B, a VLD (variable length decoding) circuit 52B, an inverse quantizer 54B, and an inverse zigzag scan and inverse DCT circuit 56B. An input side of the error correction and interpolation circuit 48B is connected to an output side of the demodulation and deformatter circuit 42B of FIG. 20. The error correction and interpolation circuit 48B is successively followed by the third rearranging circuit 50B, the VLD circuit 52B, the inverse quantizer 54B, and the inverse zigzag scan and inverse DCT circuit 56B. An output side of the inverse zigzag scan and inverse DCT circuit 56B is connected to an input side of the fourth rearranging circuit 46B of FIG. 20. The VLD circuit 52B is also directly connected to the inverse zigzag scan and inverse DCT circuit 56B.

The error correction and interpolation circuit 48B, the third rearranging circuit 50B, the VLD circuit 52B, the inverse quantizer 54B, and the inverse zigzag scan and inverse DCT circuit 56B are similar to the error correction and interpolation circuit 48A, the third rearranging circuit 50A, the VLD circuit 52A, the inverse quantizer 54A, and the inverse zigzag scan and inverse DCT circuit 56A in FIG. 16, respectively. The connections among the error correction and interpolation circuit 48B, the third rearranging circuit 50B, the VLD circuit 52B, the inverse quantizer 54B, and the inverse zigzag scan and inverse DCT circuit 56B are similar to those among the error correction and interpolation circuit 48A, the third rearranging circuit 50A, the VLD circuit 52A, the inverse quantizer 54A, and the inverse zigzag scan and inverse DCT circuit 56A in FIG. 16.

Accordingly, the first data expander 44B-1 is similar to the data expanding portion 44A in FIG. 16. Also, the second data expander 44B-2 is similar to the data expanding portion 44A in FIG. 16. In the reproducing side of the digital VTR in FIG. 20, the basic structure of the data expanding portion 44B has two data expanding sections each in a prior-art home-use digital VTR. Accordingly, the data expanding portion 44B can use inexpensive parts for the prior-art home-use digital VTR.

The reproducing side of the digital VTR in FIGS. 20 and 21 operates as follows. During playback or data reception, a reproducing circuit (not shown) or a receiving circuit (not shown) recovers two bit sequences from reproduced signals or received signals. The reproduced signals are outputted from the magnetic heads A, A', B, and B' which scan a magnetic tape. On the other hand, the received signals are fed from a transmission line. The bit sequences are also referred to as the data sequences. The two data sequences relate to the group "a" and the group "b" respectively. The recovered data sequences are fed from the reproducing circuit or the receiving circuit to the demodulation and deformatter circuit 42B.

The demodulation and deformatter circuit 42B subjects the recovered data sequences to demodulation, sync detection, and ID detection. The demodulation and deformatter circuit 42B outputs the resultant data sequences to the first and second data expanders 44B-1 and 44B-2 in the data expanding portion 44B respectively.

Specifically, the data sequence related to the group "a" is outputted to the first data expander 44B-1 while the data sequence related to the group "b" is outputted to the second data expander 44B-2. Operation of the first data expander 44B-1 is similar to operation of the second data expander 44B-2. Accordingly, only operation of the first data expander 44B-1 will be explained in detail.

The error correction and interpolation circuit 48B in the first data expander 44B-1 detects errors in the "a"-group output signal of the demodulation and deformatter circuit 42B, and corrects the errors according to error checking and correcting information (an inner code and an outer code) contained in the "a"-group output signal of the demodulation and deformatter circuit 42B. The error correction and interpolation circuit 48B includes a first frame memory loaded with data related to a current frame, and also a second frame memory loaded with data related to an immediately-preceding frame. When the correction of errors in a certain data unit of the current frame is difficult, this erroneous data unit of the current frame is replaced by a corresponding data unit of the immediately-preceding frame which is read out from the second frame memory. The error correction and interpolation circuit 48B outputs the error-correction-resultant signal to the third rearranging circuit 50B. The output signal of the error correction and interpolation circuit 48B corresponds to the output signal of the second rearranging circuit 32B in FIG. 18.

The third rearranging circuit 50B rearranges data pieces in the output signal of the error correction and interpolation circuit 48B. The data-piece rearrangement executed by the third rearranging circuit 50B is inverse with respect to the data-piece rearrangement executed by the second rearranging circuit 32B in FIG. 18. Accordingly, the data-piece rearrangement executed by the third rearranging circuit 50B retrieves the order or the sequence of video segments. The third rearranging circuit 50B outputs the rearrangement-resultant signal to the VLD circuit 52B.

The VLD circuit 52B decodes the output signal of the third rearranging circuit 50B, that is, the variable-length-code data, into main data pieces, a DC-coefficient data piece, DCT mode information, and class information. The decoding process executed by the VLD circuit 52B is opposite to the encoding process executed by the VLC circuit 30B in FIG. 18. The decoding-resultant main data pieces represent quantization-resultant AC coefficients. The VLD circuit 52B outputs the quantization-resultant AC-coefficient data pieces and the class information to the inverse quantizer 54B. The VLD circuit 52B outputs the DC-coefficient data piece and the DCT mode information to the inverse zigzag scan and inverse DCT circuit 56B.

The inverse quantizer 54B subjects the quantization-resultant AC-coefficient data pieces to inverse quantization in response to the class information, thereby recovering original AC-coefficient data pieces. The inverse quantization executed by the inverse quantizer 54B is opposite to the quantization executed by the adaptive quantizer 28B in FIG. 18. Specifically, the operation of the inverse quantizer 54B is inverse with respect to the operation of the adaptive quantizer 28B in FIG. 18. The inverse quantizer 54B outputs the inverse-quantization-resultant signal to the inverse zigzag scan and inverse DCT circuit 56B. The output signal of the inverse quantizer 54B corresponds to the output signal of the buffer memory 26B or the output signal of the DCT and zigzag scan circuit 18B in FIG. 18.

For every 1-DCT-block, the inverse zigzag scan and inverse DCT circuit 56B rearranges data pieces (the output signal of the inverse quantizer 54B) of 63 AC coefficients in the original order or the normal order. For every 1-DCT-block, the inverse zigzag scan and inverse DCT circuit 56B subjects the rearrangement-resultant data pieces of 63 AC coefficients and the data piece of one DC coefficient to two-dimensional inverse discrete cosine transform responsive to the DCT mode information. Thereby, the inverse zigzag scan and inverse DCT circuit 56B recovers digital Y, Cr, and Cb signals in the group "a". The inverse discrete cosine transform executed by the inverse zigzag scan and inverse DCT circuit 56B is opposite to the discrete cosine transform executed by the DCT and zigzag scan circuit 18B in FIG. 18. Specifically, the operation of the inverse zigzag scan and inverse DCT circuit 56B is inverse with respect to the operation of the DCT and zigzag scan circuit 18B in FIG. 18. The inverse zigzag scan and inverse DCT circuit 56B outputs the "a"-group transform-resultant signal to the fourth rearranging circuit 46B as an output signal of the first data expander 44B-1. The output signal of the inverse zigzag scan and inverse DCT circuit 56B corresponds to the "a"-group output signal of the first rearranging circuit 12B in FIG. 17. The transform-resultant signal, that is, the output signal of the inverse zigzag scan and inverse DCT circuit 56B, corresponds to digital Y, Cr, and Cb signals in the group "a".

Similarly, the second data expander 44B-2 generates a "b"-group transform-resultant signal. The second data expander 44B-2 outputs the "b"-group transform-resultant signal to the fourth rearranging circuit 46B.

The fourth rearranging circuit 46B includes selectors which remove dummy data from the "a"-group output signal of the first data expander 44B-1 and the "b"-group output signal of the second data expander 44B-2. The fourth rearranging circuit 46B also includes frame memories for digital Y, Cr, and Cb signals respectively. For each of the digital Y, Cr, and Cb signals, signal blocks represented by the dummy-free "a"-group signal and the dummy-free "b"-group signal are sequentially stored into a related frame memory. Specifically, the signal blocks are written into memory storage segments in addresses corresponding to the original positions of the signal blocks with respect to a frame. Pieces of the digital Y signal are read out from the related memory in the normal line-by-line scanning order before being outputted from the fourth rearranging circuit 46B. Pieces of the digital Cr signal are read out from the related memory in the normal line-by-line scanning order before being outputted from the fourth rearranging circuit 46B. Pieces of the digital Cb signal are read out from the related memory in the normal line-by-line scanning order before being outputted from the fourth rearranging circuit 46B. In this way, the recovered digital Y, Cr, and Cb signals are outputted from the fourth rearranging circuit 46B. The operation of the fourth rearranging circuit 46B is inverse with respect to the operation of the first rearranging circuit 12B in FIG. 17.

Figure 22:
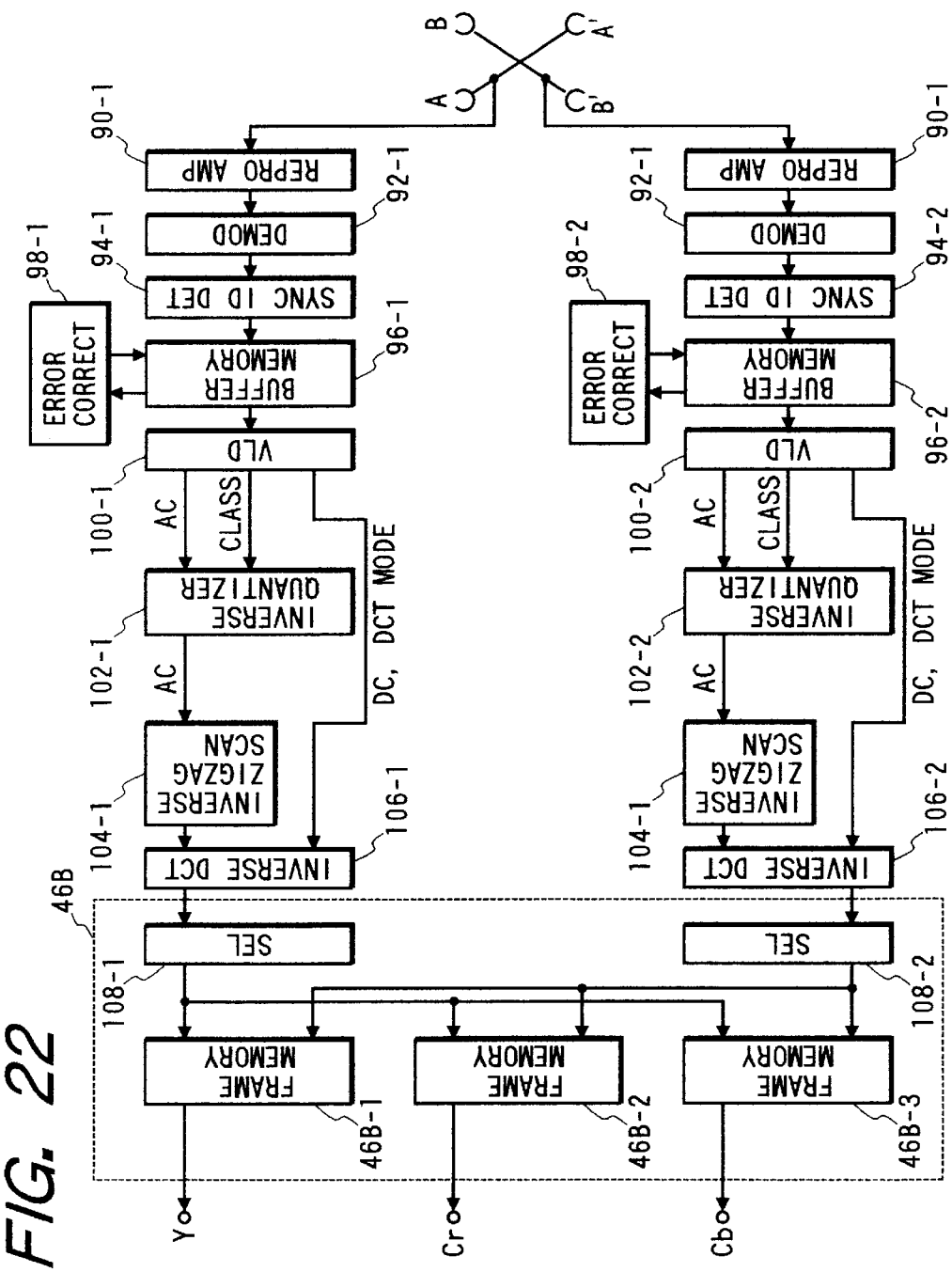
FIG. 22 is a detailed block diagram of the reproducing side of the digital VTR in FIG. 20.

FIG. 22 shows the details of the recording side of the digital VTR in FIG. 20. As shown in FIG. 22, the "+" azimuth heads A and A' are successively followed by a reproducing amplifier 90-1, a demodulation circuit 92-1, a sync and ID detection circuit 94-1, and a buffer memory 96-1. The "+" azimuth heads A and A' reproduce a signal from a magnetic tape which relates to the group "a". The reproduced signal is fed from the "+" azimuth heads A and A' to the demodulation circuit 92-1 via the reproducing amplifier 90-1. The reproduced signal is subjected to demodulation by the demodulation circuit 92-1. The demodulation circuit 92-1 corresponds to a first part of the demodulation and deformatter circuit 42B in FIG. 20. The demodulation-resultant signal is outputted from the demodulation circuit 92-1 to the sync and ID detection circuit 94-1. The demodulation-resultant signal is subjected to sync detection and ID detection by the sync and ID detection circuit 94-1. The sync and ID detection circuit 94-1 corresponds to a second part of the demodulation and deformatter circuit 42B in FIG. 20. The resultant output signal of the sync and ID detection circuit 94-1 which relates to the group "a" is written into the buffer memory 961. 1.

As shown in FIG. 22, an error correction circuit 98-1 is connected to the buffer memory 96-1. The error correction circuit 98-1 reads out the "a"-group signal from the buffer memory 96-1. The error correction circuit 98-1 detects errors in the "a"-group signal, and corrects the errors according to error checking and correcting information (an inner code and an outer code) contained in the "a"-group signal. The error correction circuit 98-1 stores the error-correction-resultant "a"-group signal back into the buffer memory 96-1. The error correction circuit 98-1 corresponds to a part of the error correction and interpolation circuit 48B in FIG. 21.

As shown in FIG. 22, the buffer memory 96-1 is followed by a VLD (variable length decoding) circuit 100-1. Pieces of the error-correction-resultant "a"-group signal are read out from the buffer memory 96-1 and are then fed to the VLD circuit 100-1 in a given order corresponding to the data-piece rearrangement executed by the third rearranging circuit 50B in FIG. 21. The buffer memory 96-1 corresponds to the third rearranging circuit 50B in FIG. 21.

The "a" group signal outputted from the buffer memory 96-1 to the VLD circuit 100-1 agrees with "a"-group variable-length-code data. The VLD circuit 100-1 decodes the "a"-group variable-length-code data into main data pieces, a DC-coefficient data piece, DCT mode information, and class information. The decoding-resultant main data pieces represent quantization-resultant AC coefficients. The VLD circuit 100-1 corresponds to the VLD circuit 52B in FIG. 21. The VLD circuit 100-1 is connected to an inverse quantizer 102-1 and an inverse DCT circuit 106-1. The VLD circuit 101-1 outputs the quantization-resultant AC-coefficient data pieces and the class information to the inverse quantizer 102-1. The VLD circuit 101-1 outputs the DC-coefficient data piece and the DCT mode information to the inverse DCT circuit 106-1.

The inverse quantizer 102-1 subjects the quantization-resultant AC-coefficient data pieces to inverse quantization in response to the class information, thereby recovering original AC-coefficient data pieces. The inverse quantizer 102-1 corresponds to the inverse quantizer 54B in FIG. 21. An inverse zigzag scan circuit 104-1 is connected between the inverse quantizer 102-1 and the inverse DCT circuit 106-1. The inverse quantizer 102-1 outputs the inverse-quantization-resultant signal to the inverse zigzag scan circuit 104-1.

For every 1-DCT-block, the inverse zigzag scan circuit 104-1 rearranges data pieces (the output signal of the inverse quantizer 102-1) of 63 AC coefficients in the original order or the normal order. The inverse zigzag scan circuit 104-1 corresponds to a first part of the inverse zigzag scan and inverse DCT circuit 56B in FIG. 21. The inverse zigzag scan circuit 104-1 outputs the rearrangement-resultant data pieces of 63 AC coefficients to the inverse DCT circuit 106-1.

For every 1-DCT-block, the inverse DCT circuit 106-1 subjects the rearrangement-resultant data pieces of 63 AC coefficients and the data piece of one DC coefficient to two-dimensional inverse discrete cosine transform responsive to the DCT mode information. Thereby, the inverse DCT circuit 106-1 recovers digital Y, Cr, and As shown in FIG. 22, an error correction circuit 98-2 is connected to the buffer memory 96-2. The buffer memory 96-2 is followed by a VLD (variable length decoding) circuit 100-2. The VLD circuit 100-2 is connected to an inverse quantizer 102-2 and an inverse DCT circuit 106-2. An inverse zigzag scan circuit 104-2 is connected between the inverse quantizer 102-2 and the inverse DCT circuit 106-2. The inverse DCT circuit 106-2 is followed by a selection circuit 108-2 within the fourth rearrangement circuit 46B.

The buffer memory 96-2, the error correction circuit 98-2, the VLD circuit 100-2, the inverse quantizer 102-2, the inverse zigzag scan circuit 104-2, and the inverse DCT circuit 106-2 are similar in structure and operation to the buffer memory 96-1, the error correction circuit 98-1, the VLD circuit 100-1, the inverse quantizer 102-1, the inverse zigzag scan circuit 104-1, and the inverse DCT circuit 106-1, respectively. The buffer memory 96-2, the error correction circuit 98-2, the VLD circuit 100-2, the inverse quantizer 102-2, the inverse zigzag scan circuit 104-2, and the inverse DCT circuit 106-2 compose the second data expander 44B-2 (see FIG. 20) which relates to the group "b". The inverse DCT circuit 106-2 outputs a "b"-group transform-resultant signal to the selection circuit 108-2 as an output signal of the second data expander 44B-2 (see FIG. 20).

As shown in FIG. 22, the fourth rearranging circuit 46B includes the selection circuits 108-1 and 108-2, and frame memories 46B-1, 46B-2, and 46B-3. The selection circuit 108-1 is connected to the frame memories 46B-1, 46B-2, and 46B-3. Also, Cb signals in the group "a". The inverse DCT circuit 106-1 corresponds to a second part of the inverse zigzag scan and inverse DCT circuit 58B in FIG. 21. The inverse DCT circuit 106-1 is followed by a selection circuit 108-1 within the fourth rearrangement circuit 46B. The inverse DCT circuit 106-1 outputs the "a"-group transform-resultant signal to the selection circuit 1081 as an output signal of the first data expander 44B-1 (see FIG. 20).

As shown in FIG. 22, the "−" azimuth heads B and B' are successively followed by a reproducing amplifier 90-2, a demodulation circuit 92-2, a sync and ID detection circuit 94-2, and a buffer memory 96-2. The "−" azimuth heads B and B' reproduce a signal from the magnetic tape which relates to the group "b". The reproduced signal is fed from the "−" azimuth heads B and B' to the demodulation circuit 92-2 via the reproducing amplifier 90-2. The reproduced signal is subjected to demodulation by the demodulation circuit 92-2. The demodulation circuit 92-2 corresponds to a third part of the demodulation and deformatter circuit 42B in FIG. 20. The demodulation-resultant signal is outputted from the demodulation circuit 92-2 to the sync and ID detection circuit 94-2. The demodulation-resultant signal is subjected to sync detection and ID detection by the sync and ID detection circuit 94-2. The sync and ID detection circuit 94-2 corresponds to a fourth part of the demodulation and deformatter circuit 42B in FIG. 20. The resultant output signal of the sync and ID detection circuit 94-2 which relates to the group "b" is written into the buffer memory 96-2. the selection circuit 108-2 is connected to the frame memories 46B-1, 46B-2, and 46B-3. The frame memories 46B-1, 46B-2, and 46B-3 are assigned to digital Y, Cr, and Cb signals respectively.

The selection circuit 108-1 receives the "a"-group output signal of the inverse DCT circuit 106-1 signal-block by signal-block (DCT-block by DCT-block). The selection circuit 108-1 discards or disregards dummy DCT-block data in the "a"-group signal, and passes only effective DCT-block data. In other words, the selection circuit 108-1 removes the dummy DCT-block data from the "a"-group signal. The selection circuit 108-1 separates the resultant "a"-group signal into "a"-group digital Y, Cr, and Cb signals which do not have any dummy data. The selection circuit 108-1 writes the "a"-group digital Y signal into the frame memory 46B-1. The selection circuit 108-1 writes the "a"-group digital Cr signal into the frame memory 46B-2. The selection circuit 108-1 writes the "a"-group digital Cb signal into the frame memory 46B-3. During the writing of the "a"-group digital Y, Cr, and Cb signals into the frame memories 46B-1, 46B-2, and 46B-3, signal blocks are written into memory storage segments in addresses corresponding to the original positions of the signal blocks with respect to a frame.

The selection circuit 108-2 receives the "b"-group output signal of the inverse DCT circuit 106-2 signal-block by signal-block (DCT-block by DCT-block). The selection circuit 108-2 discards or disregards dummy DCT-block data in the "b"-group signal, and passes only effective DCT-block data. In other words, the selection circuit 108-2 removes the dummy DCT-block data from the "b"-group signal. The selection circuit 108-2 separates the resultant "b"-group signal into "b"-group digital Y, Cr, and Cb signals which do not have any dummy data. The selection circuit 108-2 writes the "b"-group digital Y signal into the frame memory 46B-1. The selection circuit 108-2 writes the "b"-group digital Cr signal into the frame memory 46B-2. The selection circuit 108-2 writes the "b"-group digital Cb signal into the frame memory 46B-3. During the writing of the "b"-group digital Y, Cr, and Cb signals into the frame memories 46B-1, 46B-2, and 46B-3, signal blocks are written into memory storage segments in addresses corresponding to the original positions of the signal blocks with respect to a frame.

Pieces of the digital Y signal in the groups "a" and "b" are read out from the frame memory 46B-1 in the normal line-by-line scanning order before being outputted from the fourth rearranging circuit 46B. Pieces of the digital Cr signal in the groups "a" and "b" are read out from the frame memory 46B-2 in the normal line-byline scanning order before being outputted from the fourth rearranging circuit 46B. Pieces of the digital Cb signal in the groups "a" and "b" are read out from the frame memory 46B-3 in the normal line-by-line scanning order before being outputted from the fourth rearranging circuit 46B. In this way, the recovered digital Y, Cr, and Cb signals are outputted from the fourth rearranging circuit 46B.

The amount of color difference information of a "4:2:2" 1-frame picture is equal to twice the amount of color difference information of a "4:1:1" 1-frame picture or a "4:2:0" 1-frame picture.

The amount of luminance information of a "4:2:2" 1-frame picture is equal to that of a "4:1:1" 1-frame picture or a "4:2:0" 1-frame picture. Regarding a "4:2:2" 1-frame picture of the 525/60 system, the resolution provided by a digital Y signal corresponds to 720 by 480 pixels, and the resolution provided by digital Cr and Cb signals corresponds to 360 by 480 pixels. Regarding a "4:2:2" 1-frame picture of the 625/50 system, the resolution provided by a digital Y signal corresponds to 720 by 576 pixels, and the resolution provided by digital Cr and Cb signals corresponds to 360 by 576 pixels.

Figure 23:
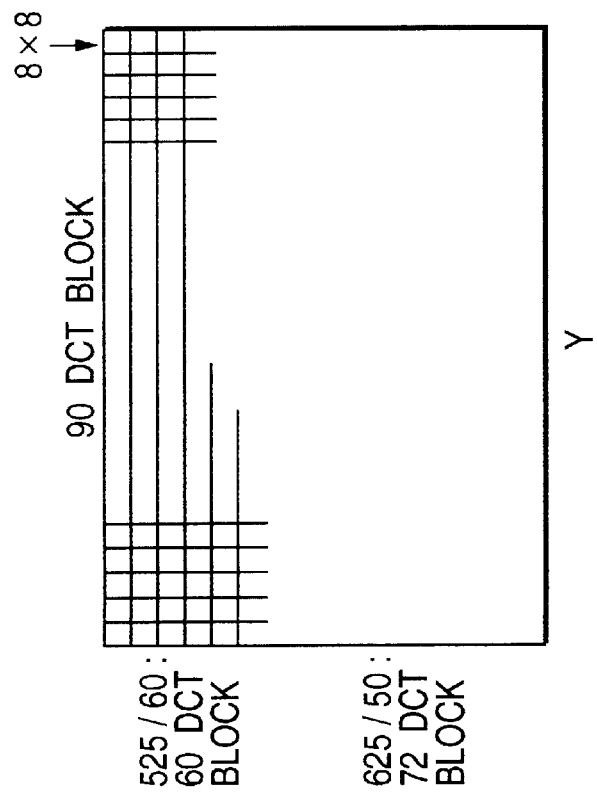
FIG. 23 is a diagram of Y-signal DCT blocks corresponding to a 1-frame picture in the first embodiment of this invention.
Figure 25:
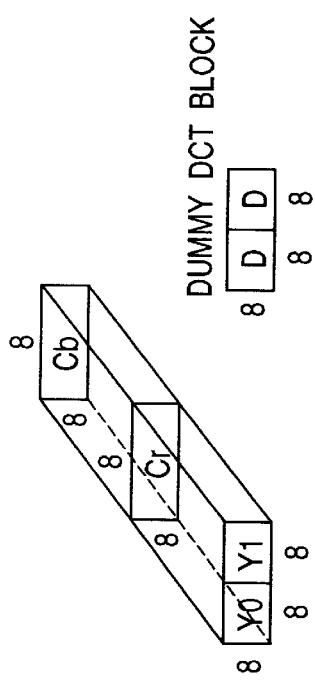
FIG. 25 is a diagram of a macro-block in the first embodiment of this invention.

As shown in FIG. 23, in the case of the 525/60 system, every "4:2:2" 1-frame picture related to a digital Y signal is composed of 90 DCT blocks (in the horizontal direction) by 60 DCT blocks (in the vertical direction). In the case of the 625/50 system, every "4:2:2" 1-frame picture related to a digital Y signal is composed of 90 DCT blocks (in the horizontal direction) by 72 DCT blocks (in the vertical direction).

Figure 24:
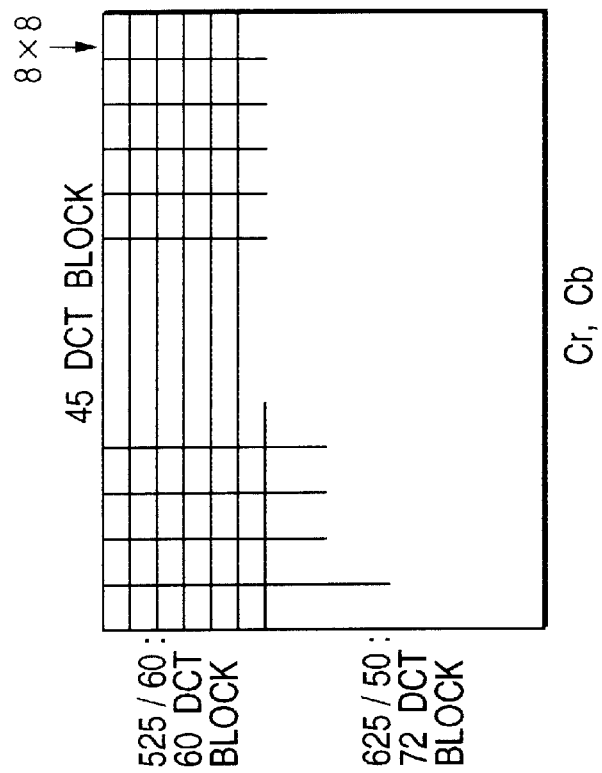
FIG. 24 is a diagram of Cr-signal DCT blocks or Cb-signal DCT blocks corresponding to a 1-frame picture in the first embodiment of this invention.

As shown in FIG. 24, in the case of the 525/60 system, every "4:2:2" 1-frame picture related to a Cr signal or a Cb signal is composed of 45 DCT blocks (in the horizontal direction) by 60 DCT blocks (in the vertical direction). In the case of the 625/50 system, every "4:2:2" 1-frame picture related to a Cr signal or a Cb signal signal is composed of 45 DCT blocks (in the horizontal direction) by 72 DCT blocks (in the vertical direction).

A "4:2:2" 1-frame picture of the 525/60 system and a "4:2:2" 1-frame picture of the 625/50 system are equal in the number of DCT blocks (that is, the number of pixels) along the horizontal direction. A "4:2:2" 1-frame picture of the 525/60 system and a "4:2:2" 1-frame picture of the 625/50 system are different in the number of DCT blocks (that is, the number of pixels) along the vertical direction. The common "4:2:2" sampling format is applied to both a video signal of the 525/60 system and a video signal of the 625/50 system. Accordingly, all DCT blocks composing one frame have equal shapes. In addition, all DCT blocks composing one frame are subjected to consistent signal processing.

As shown in 25, every macro-block is composed of two Y-signal DCT blocks, one Cr-signal DCT block, one Cb-signal DCT block, and two dummy DCT blocks. The two Y-signal DCT blocks adjoin each other along the horizontal direction of a frame. The positions of the Cr-signal DCT block and the Cb-signal DCT block relative to a frame coincide with the place where the two Y-signal DCT blocks are present.

Figure 26:
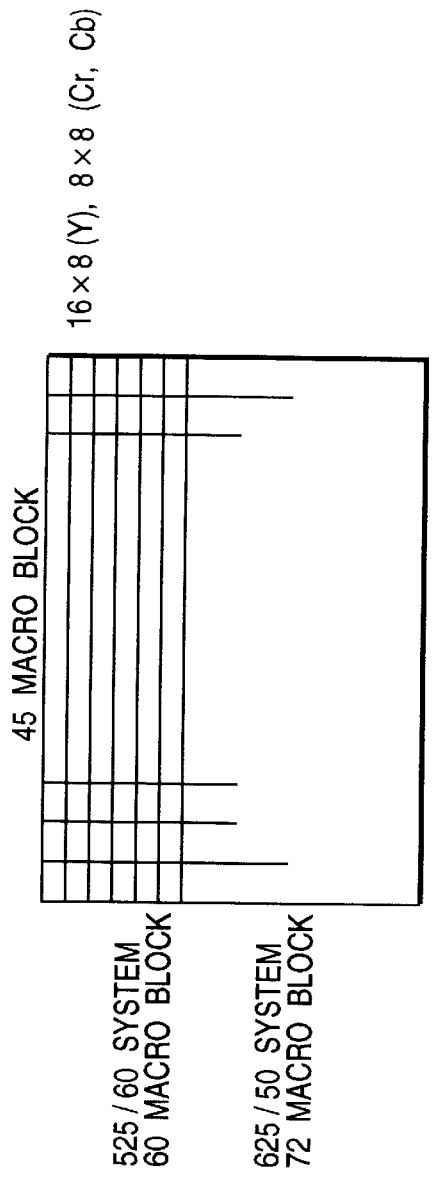
FIG. 26 is a diagram of macro-blocks corresponding to a 1-frame picture in the first embodiment of this invention.

As shown in FIG. 26, in the case of the 525/60 system, every "4:2:2" 1-frame picture is composed of 45 macro-blocks (in the horizontal direction) by 60 macro-blocks (in the vertical direction). In the case of the 625/50 system, every "4:2:2" 1-frame picture is composed of 45 macro-blocks (in the horizontal direction) by 72 macro-blocks (in the vertical direction).

Every macro-block corresponds to one data unit or one memory unit in the VLC circuit 30B (see FIG. 18). Each memory unit in the VLC circuit 30B has six DCT coefficient areas substantially corresponding to six DCT blocks (two Y-signal DCT blocks, one Cr-signal DCT block, one Cb-signal, and two dummy DCT blocks) composing one macro-block.

Every dummy DCT block is designed so that the amount of data resulting from quantization and variable-length encoding of the dummy DCT block will be equal to a value as small as possible. An example of a dummy DCT block has 63 AC coefficients of a same value (for example, "0") and a DC coefficient of a predetermined value. AC-coefficient data pieces of such a dummy DCT block are converted by the VLC circuit 30B (see FIG. 18) into one EOB code word. Here, "EOB" means "end of block".

The VLC circuit 30B (see FIG. 18) has five memory units. Each memory unit has six DC regions and six AC regions. Data of the variable length code is written into the five memory units as will be explained later. The writing of data into the five memory units has a sequence of processing PASS-1, processing PASS-2, and processing PASS-3.

The data write processing PASS-1 is as follows. Regarding each of the five memory units, DC-coefficient data pieces and other information pieces in a corresponding macro-block are stored into the six DC regions. In addition, AC-coefficient data pieces of the variable length code for six DCT blocks are sequentially stored into the six AC regions respectively. The storing sequence starts from the lowest order coefficient data piece toward the highest order coefficient data piece. A given code word representing an end of a block (EOB) is added to the end of a final AC-coefficient data piece of the variable length code for a DCT block. Overflow data pieces, which can not be stored into the six AC regions, are stored into an overflow memory in the VLC circuit 30B. When the writing of data into the six DCT coefficient areas of each memory unit is completed, typical memory conditions are such that some of the DCT coefficient areas have unoccupied portions and the others are fully occupied. In some cases, there are overflow data pieces which can not be stored into the DCT coefficient areas. These processes are carried out for each of the five memory units.

The data write processing PASS-2 is as follows. In the presence of overflow data pieces, a related memory unit is searched for unoccupied places in a sequence starting from the head area (the head DCT coefficient area). The overflow data pieces are sequentially stored into the unoccupied places in the memory unit regardless of the correspondence relation between the DCT blocks and the DCT coefficient areas. In some cases, as a result of these processes, there are second overflow data pieces which can not be stored into the unoccupied places in the memory unit. The second overflow data pieces are stored into the overflow memory or a second overflow memory in the VLC circuit 30B. When the above-indicated processes related to the unoccupied places in the memory unit is completed, typical memory conditions are such that some of the DCT coefficient areas have unoccupied portions and the others are fully occupied. In some cases, all the DCT coefficient areas in the memory unit are fully occupied. In these cases, there is a chance of the occurrence of second overflow data pieces. These processes are carried out for each of the five memory units.

The data write processing PASS-3 is as follows. In the presence of second overflow data pieces, the memory units are searched for unoccupied places in a sequence from the first memory unit to the last memory unit. The second overflow data pieces are sequentially stored into the unoccupied places in the memory unit or units regardless of the correspondence relation between the memory units and the macro-blocks, and also regardless of the correspondence relation between the DCT blocks and the DCT coefficient areas. As a result of these processes, all the second overflow data pieces are stored in the memory unit or units. In other words, all data pieces in a video segment are stored in the five memory units. These satisfactory conditions are ensured by the control of the quantization step sizes via the data amount estimation circuit 24B (see FIG. 18).

During the data write processing PASS-1 on each of the memory units within the VLC circuit 30B (see FIG. 18), data pieces for a first Y-signal DCT block, data pieces for a first dummy DCT block, data pieces for a second Y-signal DCT block, data pieces for a second dummy DCT block, data pieces for a Cr-signal DCT block, and data pieces for a Cb-signal DCT block are sequentially stored into corresponding regions within the memory unit. This sequence is expressed as "Y0, D, Y1, D, Cr, Cb" where Y0 denotes a first Y-signal DCT block, D denotes a dummy DCT block, Y1 denotes a second Y-signal DCT block, Cr denotes a Cr-signal DCT block, and Cb denotes a Cb-signal DCT block. The sequence "Y0, D, Y1, D, Cr, Cb" may be replaced by any one of the eleven other sequences including a sequence "Y0, Y1, D, D, Cr, Cb" and a sequence "D, D, Y0, Y1, Cr, Cb".

Figure 27:
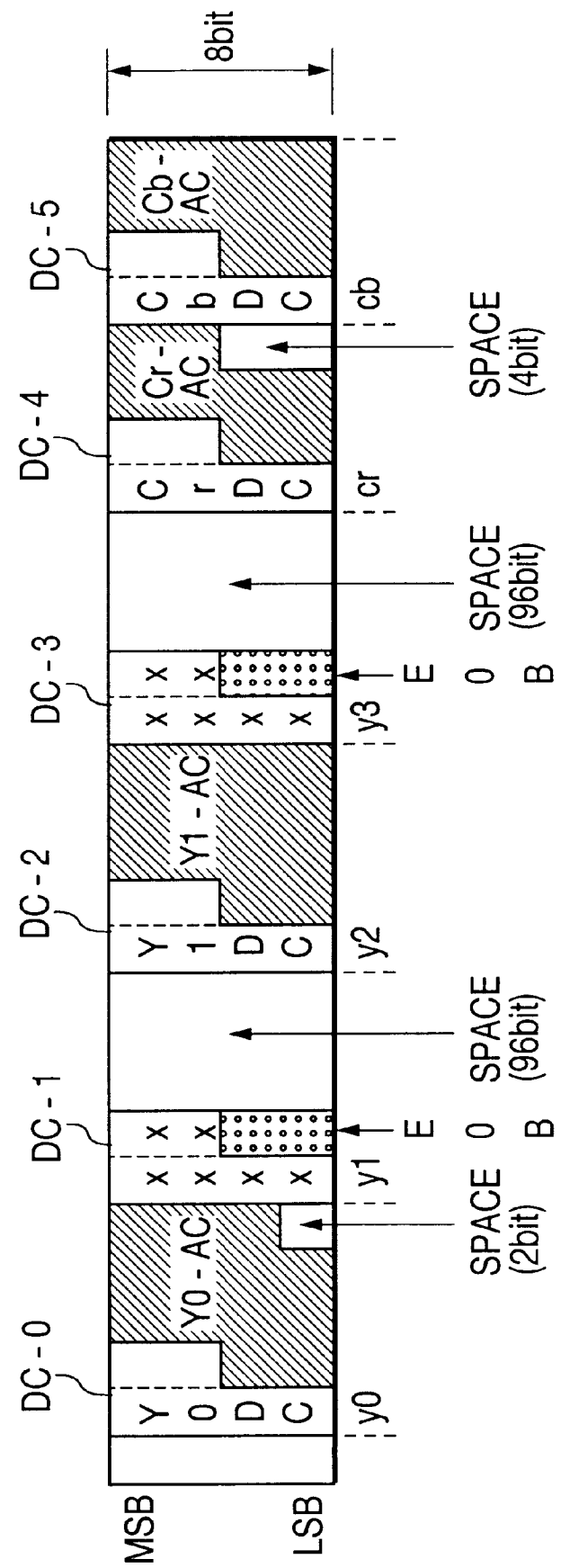
FIG. 27 is a diagram of an example of conditions of a memory unit in the first embodiment of this invention.

FIG. 27 shows an example of conditions of a memory unit which occur when the data write processing PASS-1 has been completed. In the example shown by FIG. 27, AC-coefficient data pieces Y0–AC for a first Y-signal DCT block have 98 bits, and all are stored in a corresponding region of the memory unit. An unoccupied zone having 2 bits occur in the corresponding region.

AC-coefficient data pieces D-AC for each of first and second dummy DCT blocks has 4 bits representing an EOB code word, and all are stored in a corresponding region of the memory unit. An unoccupied zone having 96 bits occur in the corresponding region. AC-coefficient data pieces Y1–AC for a second Y-signal DCT block has 105 bits, and 100 bits of them are stored in a corresponding region of the memory unit while 5 bits of them overflow. AC-coefficient data pieces Cr–AC for a Cr-signal DCT block have 64 bits, and all are stored in a corresponding region of the memory unit. An unoccupied zone having 4 bits occur in the corresponding region.

AC-coefficient data pieces Cb–AC for a Cb-signal DCT block has 80 bits, and 68 bits of them are stored in a corresponding region of the memory unit while 12 bits of them overflow.

During the data write processing PASS-2 and the data write processing PASS-3, the unoccupied zones in the memory unit are used to store the overflow data pieces.

The previously-indicated data-amount control is implemented video-segment by video-segment. Every video segment is composed of five macro-blocks. The data-amount control is designed so that data pieces corresponding to 10 Y-signal DCT blocks, 5 Cr-signal DCT blocks, and 5 Cb-signal DCT blocks can be stored in the five memory units in the VLC circuit 30B (see FIG. 18). During the data-amount control, the quantization step sizes used by the adaptive quantizer 28B (see FIG. 18) are adjusted macro-block by macro-block. The data compression factor in the embodiment of this invention is lower than that in the prior-art digital VTR of FIG. 1. The lower data compression factor provides a higher picture quality in connection with picture reproduction.

Each memory unit in the VLC circuit 30B (see FIG. 18) corresponds to one data unit. Every data unit corresponds to one sync block which is a minimum unit of a decoding process to recover original data. Accordingly, when signal pieces in a sync block are reproduced, original data pieces of a corresponding data unit can be recovered. Data pieces in every data unit have information by which approximately an original picture portion can be recovered from a corresponding macro-block. Thus, during search or fast playback, a reproduced picture is composed of unit segments whose minimum size corresponds to 16 (in the horizontal direction) by 8 (in the vertical direction) pixels.

Every super-block is composed of 9 (in the horizontal direction) by 3 (in the vertical direction) macro-blocks. Super-blocks in every frame are paired. Each pair has two vertically-neighboring super-blocks. This pair is defined as an extended super-block. The arrangement of extended super-blocks in every frame is similar to the arrangement of super-blocks in every frame according to the prior-art digital VTR in FIG. 1. Data pieces representing an upper half of every extended super-block and data pieces representing a lower half thereof are processed by two different data compressing stages corresponding to the first and second data compressors 14B-1 and 14B-2 (see FIG. 17) respectively. Data pieces representing an upper half of every extended super-block are assigned to the group "a" while data pieces representing a lower half thereof are assigned to the group "b". The common "4:2:2" sampling format is applied to both the 525/60 system and the 625/50 system. Accordingly, a common super-block structure can be used for both the 525/60 system and the 625/50 system.

As shown in FIG. 28, one extended super-block is composed of 54 macro-blocks, that is, 9 (in the horizontal direction) by 6 (in the vertical direction) macro-blocks, which are denoted by a1, a1, . . . , a26, b0, b1, . . . , and b26. The 9 (in the horizontal direction) by 3 (in the vertical direction) macro-blocks a0, a1, . . . , and a26 in the upper half of the extended super-block are assigned to the group "a". The 9 (in the horizontal direction) by 3 (in the vertical direction) macro-blocks b0, b1, . . . , and b26 in the lower half of the extended super-block are assigned to the group "b".

Extended super-blocks are arranged to form a frame as shown in FIG. 29. Every extended super-block is denoted by "Si,j" where "i" indicates a variable integer representative of an extended super-block vertical address with respect to a frame, and "j" indicates a variable integer representative of an extended super-block horizontal address with respect to the frame. In the case of the 525/60 system, i=0, 1, 2, 3, . . ., 9 while j=0, 1, 2, 3, 4. In the case of the 625/50 system, i=0, 1, 2, 3, . . . , 11 while j=0, 1, 2, 3, 4.

Video segments composing every frame which occur before compression are denoted by characters $V_{i,k}$. Video segments $V_{i,k}$ are defined as follows.

$$V_{i,k} = \{Va_{i,k}, Vb_{i,k}\}$$

where i=0, 1, 2, . . . , 9 (in the case of the 525/60 system); i=0, 1, 2, . . . , 11 (in the case of the 625/50 system); k=0, 1, 2, . . . , 26; $Va_{i,k}$ denotes video segments in the group "a"; and $Vb_{i,k}$ denotes video segments in the group "b".

Video segments $Va_{i,k}$ in the group "a" and video segments $Vb_{i,k}$ in the group "b" are expressed as follows.

$$Va_{i,k} = \{Ma_{(i+2) \bmod n, 2, k}; Ma_{(i+6) \bmod n, 1, k}; Ma_{(i+8) \bmod n, 3, k}; Ma_{(i+0) \bmod n, 0, k}; Ma_{(i+4) \bmod n, 4, k}\}$$

$$Vb_{i,k} = \{Mb_{(i+2) \bmod n, 2, k}; Mb_{(i+6) \bmod n, 1, k}; Mb_{(i+8) \bmod n, 3, k}; Mb_{(i+0) \bmod n, 0, k}; Mb_{(i+4) \bmod n, 4, k}\}$$

where n=12 (in the case of the 625/50 system); n=10 (in the case of the 525/60 system); $Ma_{p,j,k}$ denotes macro-blocks in the group "a"; and $Mb_{p,j,k}$ denotes macro-blocks in the group "b". In addition, p=q mod n, and "q mod n" means the remainder in division of a number "q" by a number "n". As previously explained, "i" indicates an extended super-block vertical address with respect to a frame. In the case of the 525/60 system, i=0, 1, 2, 3, . . . , 9. In the case of the 625/50 system, i=0, 1, 2, 3, . . . , 11. Also, "p" indicates an extended super-block vertical address with respect to a frame. In the case of the 525/60 system, p=0, 1, 2, 3, . . . , 9. In the case of the 625/50 system, p=0, 1, 2, 3, . . . , 11. As previously explained, "j" indicates an extended super-block horizontal address with respect to the frame, and j=0, 1, 2, 3, 4. Furthermore, "k" denotes a macro-block address in an extended super-block, and k=0, 1, 2, . . . , 26.

FIG. 30 shows shuffling orders in which data pieces related to the group "a" are read out from the frame memories in the first rearranging circuit 12B (see FIGS. 17 and 19). FIG. 31 shows shuffling orders in which data pieces related to the group "b" are read out from the frame memories in the first rearranging circuit 12B (see FIGS. 17 and 19).

The data related to the group "a" and the data related to the group "b" are compressed video-segment by video-segment. Video segments composing every frame which occur after compression (bit rate reduction) are denoted by characters $v_{i,k}$. Video segments $v_{i,k}$ are expressed as follows.

$$v_{i,k} = \{va_{i,k}, vb_{i,k}\}$$

where i=0, 1, 2, . . . , 9 (in the case of the 525/60 system); i=0, 1, 2, . . . , 11 (in the case of the 625/50 system); k=0, 1, 2, . . . , 26, $va_{i,k}$ denotes video segments in the group "a"; and $vb_{i,k}$ denotes video segments in the group "b".

Video segments $va_{i,k}$ in the group "a" and video segments $vb_{i,k}$ in the group "b" are expressed as follows.

$$va_{i,k} = \{Ua_{(i+2) \bmod n, 2, k}; Ua_{(i+6) \bmod n, 1, k}; Ua_{(i+8) \bmod n, 3, k}; Ua_{(i+0) \bmod n, 0, k}; Ua_{(i+4) \bmod n, 4, k}\}$$

$$vb_{i,k} = \{Ub_{(i+2) \bmod n, 2, k}; Ub_{(i+6) \bmod n, 1, k}; Ub_{(i+8) \bmod n, 3, k}; Ub_{(i+0) \bmod n, 0, k}; Ub_{(i+4) \bmod n, 4, k}\}$$

where n=12 (in the case of the 625/50 system); n=10 (in the case of the 525/60 system); $Ua_{p,j,k}$ denotes data units for containing compression-resultant data pieces in the group "a"; and $Ub_{p,j,k}$ denotes data units for containing compression-resultant data pieces in the group "b". In addition, "p" denotes a track order number and corresponds to an extended super-block vertical address "i" with respect to a frame. In the case of the 525/60 system, p=0, 1, 2, 3, . . . , 9. In the case of the 625/50 system, p=0, 1, 2, 3, . . . , 11. Furthermore, "j" corresponds to an extended super-block horizontal address with respect to the frame, and j=0, 1, 2, 3, 4. In addition, "k" corresponds to a macro-block address in an extended super-block, and k=0, 1, 2, . . . , 26.

Figure 32:
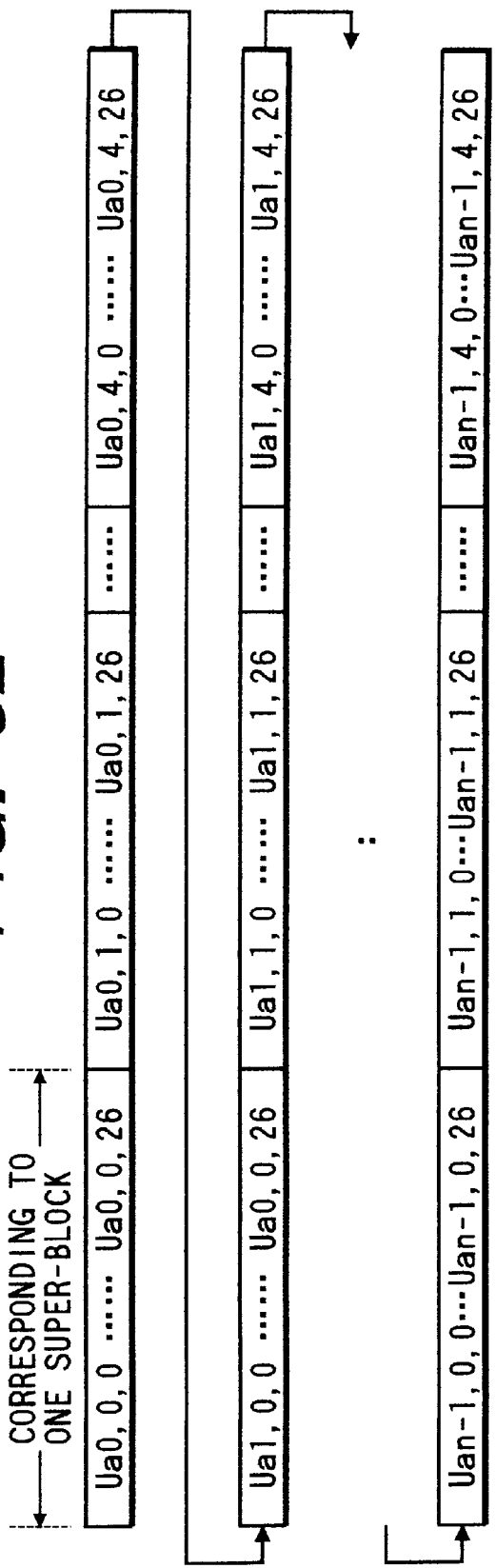
FIG. 32 is a diagram of a sequence of data units represented by an output signal of a second rearranging circuit in the first embodiment of this invention.

With reference to FIG. 18, video-segment data pieces in the group "a" are fed from the VLC circuit 30B to the second rearranging circuit 32B. The video-segment data pieces are rearranged by the second rearranging circuit 32B in the order of super blocks in a frame. Data units represented by the output signal of the second rearranging circuit 32B are arranged along a time base as shown in FIG. 32.

Figure 33:
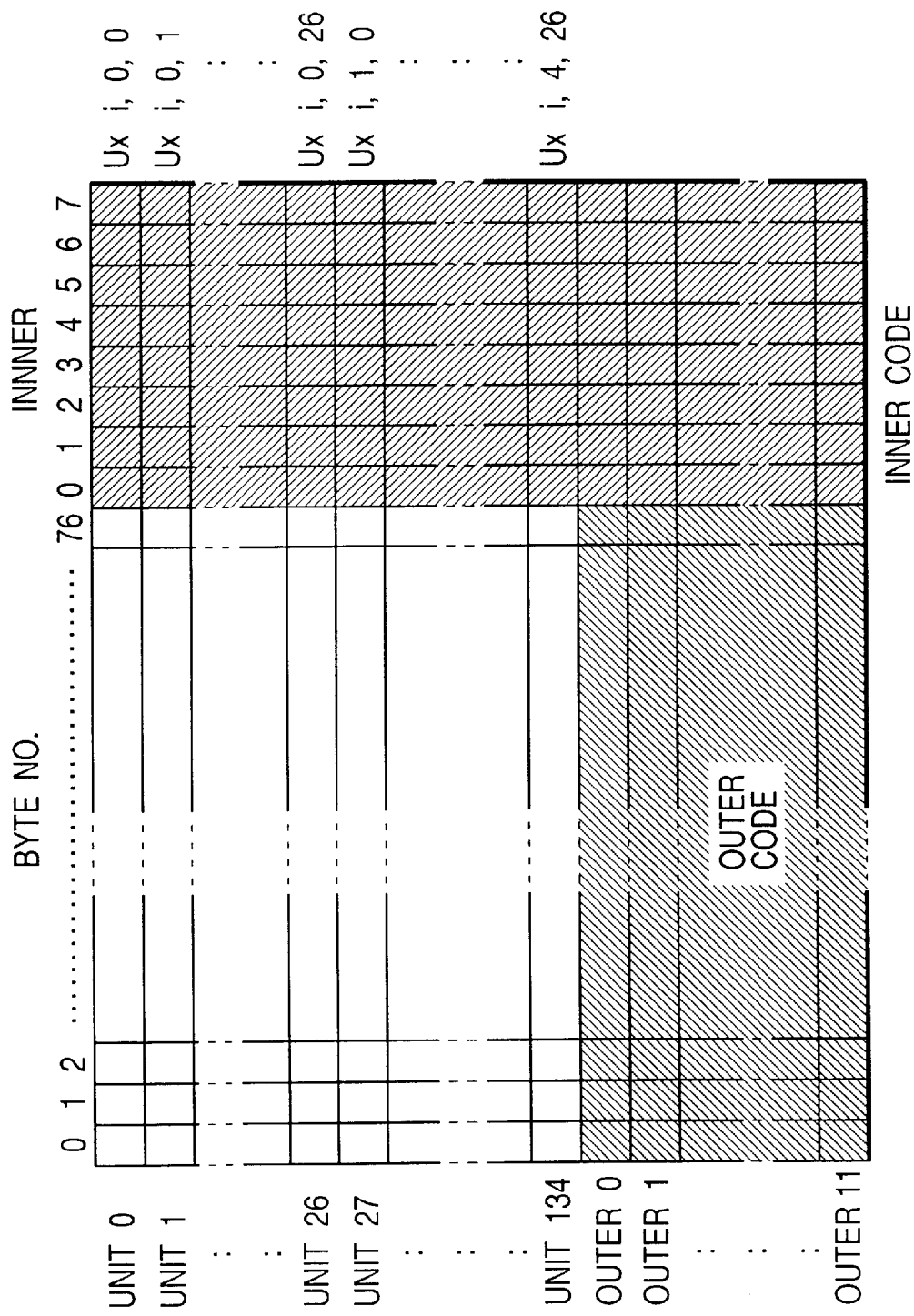
FIG. 33 is a diagram of data units, outer code words, and inner code words in the first embodiment of this invention.

The error correction code adding circuit 34B receives the output signal of the second rearranging circuit 32B, that is, the rearrangement-resultant signal. The error correction code adding circuit 34B adds an inner code (inner-parity information or inner error checking and correcting information) and an outer code (outer-parity information or outer error checking and correcting information) to the output signal of the second rearranging circuit 32B. Specifically, as shown in FIG. 33, outer code words are added to data segments with equal byte numbers which compose respective data units for every track. In addition, an inner code word is added for each of data units or outer code information pieces. During the generation of the outer code words, helper information unrelated to the present data units may be added.

In order to suitably place "a"-group information and "b"-group information on a magnetic tape, two video sectors "0" and "1" are prepared for one recording track on the magnetic tape. Video segments related to the group "a" are recorded on even-numbered tracks while video segments related to the group "b" are recorded on odd-numbered tracks.

Figure 34:
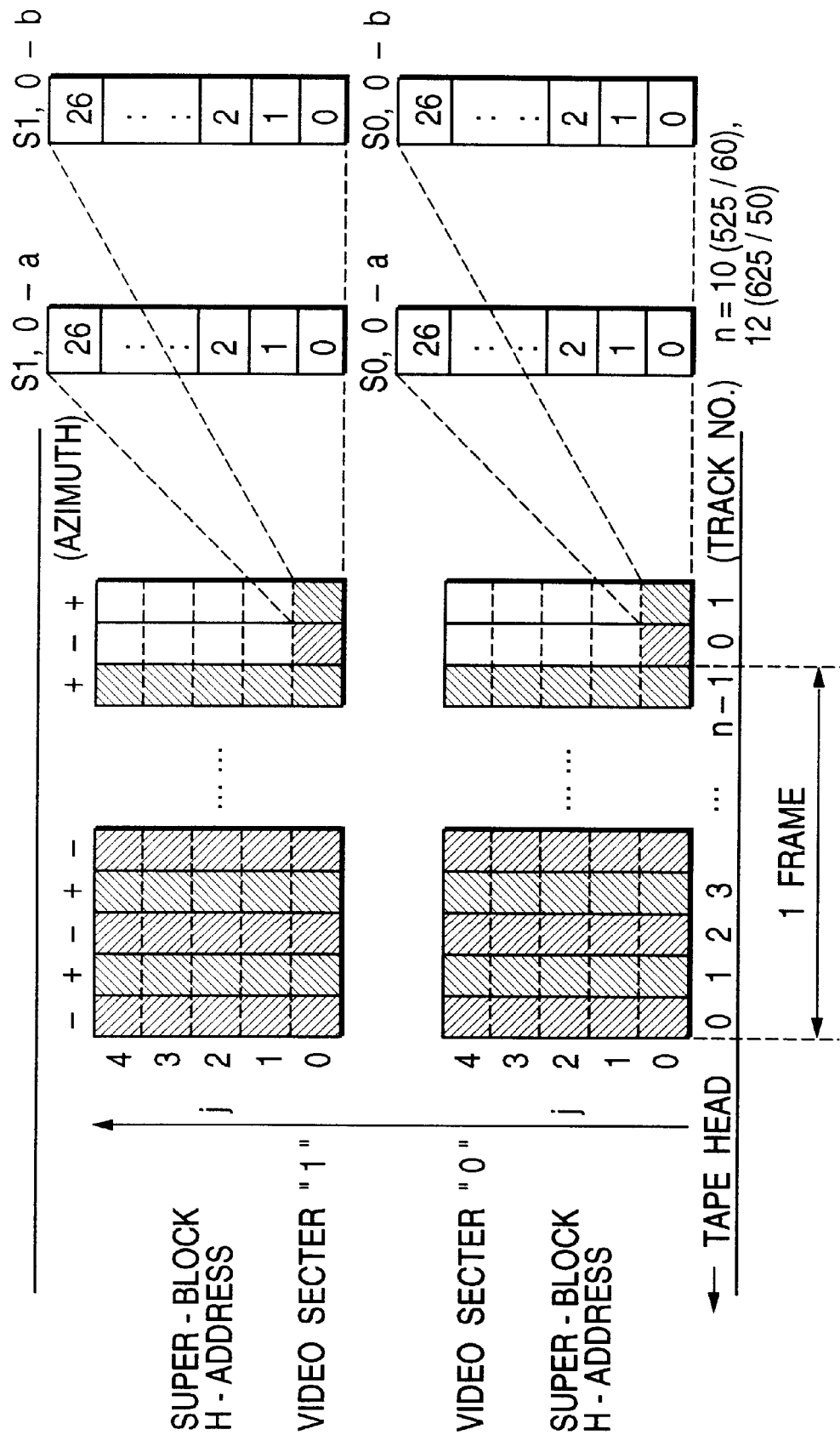
FIG. 34 is a diagram of a magnetic tape, recording tracks on the magnetic tape, and super-blocks represented by data pieces recorded on the tracks in the first embodiment of this invention.

FIG. 34 shows the relation between recording tracks and data units. In FIG. 34, the direction of movement of a magnetic tape is shown as a horizontal direction while the directions of movement of magnetic heads are shown as vertical directions. Two video segments "0" and "1" are longitudinally arranged in one recording track. Each video segment corresponds to a band-like horizontal zone in a frame. Accordingly, during search or fast playback, by setting the relative speed between the magnetic heads and the magnetic tape at a specified value, a reproduced picture can be updated while wipe advances in a direction slant with respect to the frame. It is easy to see a reproduced picture updated in such a way.

A portion of "a"-group information and a portion of "b"-group information form a pair corresponding to two neighboring tracks. The "a"-group information and the "b"-group information are recorded on and reproduced from the magnetic tape by the two pairs of magnetic heads A, A', B, and B' (see FIGS. 19 and 22). In each pair, the two magnetic heads are opposed to and spaced from each other by an angle of 180 degrees. Accordingly, a portion of the "a"-group information and a portion of the "b"-group information in a pair can be approximately simultaneously reproduced. Thus, in the case where the magnetic heads move across recording tracks along slant directions during search, a reproduced picture can be updated in unit corresponding to about a width of a super block (a vertical set of 6 macro blocks). A reproduced picture updated in such a way has a good quality.

As shown in FIG. 34, information is recorded on and reproduced from even-numbered tracks by the "−" azimuth heads while information is recorded on and reproduced from odd-numbered tracks by the "+" azimuth heads. This design may be replaced by the following modified design. According to the modified design, information is recorded on and reproduced from even-numbered tracks by the "+" azimuth heads while information is recorded on and reproduced from odd-numbered tracks by the azimuth heads.

The assignment of information pieces to recording tracks may be modified to provide the following relations. For first alternate frames, information pieces recorded on even-numbered tracks represent first frame segments while information pieces recorded on odd-numbered tracks represent second frame segments. For second alternate frames, information pieces recorded on even-numbered tracks represent the second frame segments while information pieces recorded on odd-numbered tracks represent the first frame segments. In this case, only one pair of diametrically-opposed magnetic heads may be used.

Data pieces in the group "a" may be assigned to video sectors "0" of recording tracks. In this case, data pieces in the group "b" are assigned to video sectors "1" of the recording tracks.

FIG. 35 shows the relation among sync blocks, data units, and recording tracks. As shown in FIG. 35, a data unit $Ua_{2m,j,k}$ in the group "a" is assigned to the (27j+k+21)-th sync block in the video sector "0" of the 2m-th track. A data unit $Ua_{2m+1,j,k}$ in the group "a" is assigned to the (27j+k+21)-th sync block in the video sector "1" of the 2m-th track. A data unit $Ub_{2m,j,k}$ in the group "b" is assigned to the (27j+k+21)-th sync block in the video sector "0" of the (2m+1)-th track. A data unit $Ub_{2m+1,j,k}$ in the group "b" is assigned to the (27j+k+21)-th sync block in the video sector "1" of the (2m+1)-th track. Here, "+21" results from the fact that 21 other sync blocks precede each video sector "0" or "1". In addition, m=0, 1, 2, 3, 4 in the case of the 525/60 system, and m=0, 1, 2, 3, 4, 5 in the case of the 625/50 system. Furthermore, j=0, 1, 2, 3, 4, and k=0, 1, 2, . . . , 26.

The digital VTR of the embodiment of this invention may be modified into a recording and reproducing apparatus of another type, for example, an optical recording and reproducing apparatus or a magneto-optical recording and reproducing apparatus.

Second Embodiment

A second embodiment of this invention is similar to the first embodiment thereof except for design changes explained later.

FIG. 36 shows a recording side of a digital VTR according to the second embodiment of this invention. As shown in FIG. 36, the recording side of the digital VTR includes a first rearranging circuit 12B, a data compressing portion 14B, and a formatter and record modulation circuit 16B. The first rearranging circuit 12B is followed by the data compressing portion 14B. The data compressing portion 14B is followed by the formatter and record modulation circuit 16B.

The data compressing portion 14B includes a first data compressor 14B-1 and a second data compressor 14B-2 arranged in parallel. The first and second data compressors 14B-1 and 14B-2 have equal structures. Accordingly, only the first data compressor 14B-1 will be explained in detail.

As shown in FIG. 37, the first data compressor 14B-1 includes a DCT and zigzag scan circuit 18B, a dummy DCT circuit 20B, a selection circuit 22B, a data amount estimation circuit 24B, a buffer memory 26B, an adaptive quantizer 28B, a VLC circuit 30B, a second rearranging circuit 32B, and an error correction code adding circuit 34B.

An input side of the DCT and zigzag scan circuit 18B is connected to an output side of the first rearranging circuit 12B in FIG. 36. Input sides of the selection circuit 22B are connected to output sides of the DCT and zigzag scan circuit 18B and the dummy DCT circuit 20B respectively. An input side of the buffer memory 26B is connected to an output side of the selection circuit 22B. An input side of the data amount estimation circuit 24B is connected to the output side of the selection circuit 22B. The buffer memory 26B is successively followed by the adaptive quantizer 28B, the VLC circuit 30B, the second rearranging circuit 32B, and the error correction code adding circuit 34B. An output side of the error correction code adding circuit 34B is connected to an input side of the formatter and record modulation circuit 16B in FIG. 36. The adaptive quantizer 28B is connected to an output side of the data amount estimation circuit 24B. The VLC circuit 30B is connected to the buffer memory 26B.

The recording side of the digital VTR of FIG. 36 is designed to handle digital Y, Cr, and Cb signals related to a sampling frequency ratio of "4:2:2" and also two-channel digital Y, Cr, and Cb signals related to a sampling frequency ratio of "4:1:1" or "4:2:0". In the case where digital Y, Cr, and Cb signals related to a sampling frequency ratio of "4:2:2" are handled, the selection circuit 22B alternately selects one of the output signal of the DCT and zigzag scan circuit 18B and the output signal of the dummy DCT circuit 20B to implement the addition of dummy data. In the case where two-channel digital Y, Cr, and Cb signals related to a sampling frequency ratio of "4:1:1" or "4:2:0" are handled, the selection circuit 22B continuously selects the output signal of the DCT and zigzag scan circuit 18B to prohibit the addition of dummy data.

FIG. 38 shows the details of the recording side of the digital VTR in FIG. 36. As shown in FIG. 38, the first rearranging circuit 12B includes frame memories 12B-1, 12B-2, and 12B-3 for digital Y, Cr, and Cb signals respectively. A switch 121 is connected to the frame memory 12B-1. A switch 122 is connected to the frame memory 12B-2. A switch 123 is connected to the frame memory 12B-3.

When digital Y, Cr, and Cb signals related to a sampling frequency ratio of "4:2:2" are inputted, the switches 121, 122, and 123 are changed to implement the following processes. The digital Y signal is directly written into the frame memory 12B-1, or is indirectly written into the frame memory 12B-1 via the switch 121. The digital Cr signal is directly written into the frame memory 12B-2, or is indirectly written into the frame memory 12B-2 via the switch 122. The digital Cb signal is directly written into the frame memory 12B-3, or is indirectly written into the frame memory 12B3 via the switch 123.

When two-channel digital Y, Cr, and Cb signals related to a sampling frequency ratio of "4:1:1" (or "4:2:0") are inputted, the switches 121, 122, and 123 are changed to implement the following processes. The digital Y signal in a first channel CH1 is directly written into the frame memory 12B-1. The digital Y signal in a second channel CH2 is written into the frame memory 12B-1 via the switch 121. The digital Cr signal in the first channel CH1 is directly written into the frame memory 12B-2. The digital Cr signal in the second channel CH2 is written into the frame memory 12B-2 via the switch 122. The digital Cb signal in the first channel CH1 is directly written into the frame memory 12B-3. The digital Cb signal in the second channel CH2 is written into the frame memory 12B-3 via the switch 123.

It is preferable that the first channel CH1 and the second channel CH2 are frame-synchronized with each other. In the absence of the frame synchronization between the first channel CH1 and the second channel CH2, it is preferable to provide a frame synchronizer at a stage preceding the first rearranging circuit 12B. Alternatively, the frame memories 12B-1, 12B-2, and 12B-3 may be used to form a frame synchronizer.

With reference to FIG. 38, two separate signals are read out from the frame memory 12B-1 as an "a"-group digital Y signal and a "b"-group digital Y signal respectively. Two separate signals are read out from the frame memory 12B-2 as an "a"-group digital Cr signal and a "b"-group digital Cr signal respectively. Two separate signals are read out from the frame memory 12B-3 as an "a"-group digital Cb signal and a "b"-group digital Cb signal respectively. The "a"-group digital Y, Cr, and Cb signals are transmitted from the frame memories 12B-1, 12B-2, and 12B-3 to a DCT circuit 62-1 via a switch circuit 60-1. On the other hand, the "b"-group digital Y, Cr, and Cb signals are transmitted from the frame memories 12B-1, 12B-2, and 12B-3 to a DCT circuit 62-2 via a switch circuit 60-2.

As shown in FIG. 38, a signal-mode-information generating circuit 110 is connected to sync and ID adding circuits 82-1 and 82-2. This circuit 110 generates information representing the sampling type of an input signal to the digital VTR. The sampling type is one among the "4:2:2" type, the "4:1:1" type, and the "4:2:0" type. The signal-mode-information generating circuit 82-2 outputs the generated signal mode information to the sync and ID adding circuits 82-1 and 82-2. The circuit 82-1 adds a sync signal, an ID number signal, and the signal mode information to the "a"-group output signal of an inner code generator 80-1. The circuit 82-2 adds a sync signal, an ID number signal, and the signal mode information to the "b"-group output signal of an inner code generator 80-2. It is preferable that recording areas of the signal mode information precede recording areas of video sectors on recording tracks.

FIG. 39 shows a reproducing side of the digital VTR according to the second embodiment of this invention. As shown in FIG. 39, the recording side of the digital VTR includes a demodulation and deformatter circuit 42B, a data expanding portion 44B, and a fourth rearranging circuit 46B. The demodulation and deformatter circuit 42B is successively followed by the data expanding portion 44B and the fourth rearranging circuit 46B.

The data expanding portion 44B includes a first data expander 44B-1 and a second data expander 44B-2. The first data expander 44B-1 processes data related to the group "a" while the second data expander 44B-2 processes data related to the group "b". The first and second data expanders 44B-1 and 44B-2 have equal structures.

Accordingly, only the first data expander 44B-1 will be explained in detail.

As shown in FIG. 40, the first data expander 44B-1 includes an error correction and interpolation circuit 48B, a third rearranging circuit 50B, a VLD (variable length decoding) circuit 52B, an inverse quantizer 54B, and an inverse zigzag scan and inverse DCT circuit 56B. An input side of the error correction and interpolation circuit 48B is connected to an output side of the demodulation and deformatter circuit 42B of FIG. 39. The error correction and interpolation circuit 48B is successively followed by the third rearranging circuit 50B, the VLD circuit 52B, the inverse quantizer 54B, and the inverse zigzag scan and inverse DCT circuit 56B. An output side of the inverse zigzag scan and inverse DCT circuit 56B is connected to an input side of the fourth rearranging circuit 46B of FIG. 39. The VLD circuit 52B is also directly connected to the inverse zigzag scan and inverse DCT circuit 56B.

Figure 41:
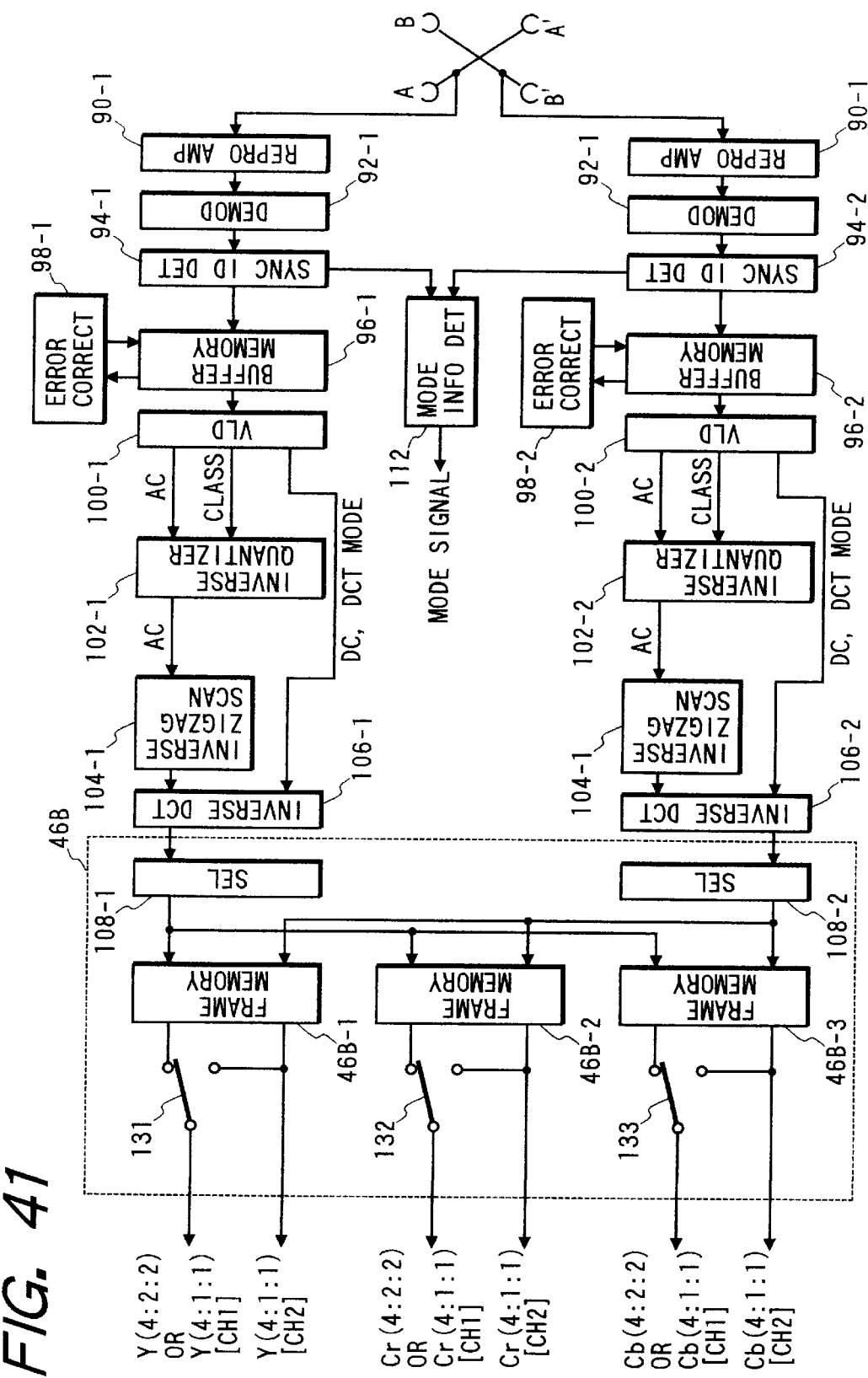
FIG. 41 is a detailed block diagram of the reproducing side of the digital VTR in FIG. 39.

FIG. 41 shows the details of the reproducing side of the digital VTR in FIG. 39. As shown in FIG. 41, a signal-mode-information detecting circuit 112 is connected to a sync and ID detection circuits 94-1 and 94-2. This circuit 112 detects signal mode information in reproduced data related to the group "a" and also signal mode information in reproduced data related to the group "b".

With reference to FIG. 41, the fourth rearranging circuit 46B includes frame memories 46B-1, 46B-2, and 46B-3 for digital Y, Cr, and Cb signals respectively. Here, "a"-group Y, Cr, and Cb signals are transmitted from a selection circuit 108-1 to the frame memories 46B-1, 46B-2, and 46B-3 respectively. On the other hand, "b"-group Y, Cr, and Cb signals are transmitted from a selection circuit 108-2 to the frame memories 46B-1, 46B-2, and 46B-3 respectively.

A switch 131 is connected to the frame memory 46B-1. A switch 132 is connected to the frame memory 46B-2. A switch 133 is connected to the frame memory 46B-3. The switches 131, 132, and 133 are controlled in response to the signal mode information detected by the signal-mode-information detecting circuit 112.

When the signal mode information detected by the signal-mode-information detecting circuit 112 represents "4:2:2", the switches 131, 132, and 133 are changed to implement the following processes. A digital Y signal is read out from the frame memory 46B-1, and is then transmitted via the switch 131 as an output Y signal. A digital Cr signal is read out from the frame memory 46B-2, and is then transmitted via the switch 132 as an output Cr signal. A digital Cb signal is read out from the frame memory 46B-3, and is then transmitted via the switch 133 as an output Cb signal.

When the signal mode information detected by the signal-mode-information detecting circuit 112 represents "4:1:1" (or "4:2:0"), the switches 131, 132, and 133 are changed to implement the following processes. A digital Y signal of the first channel CH1 is read out from the frame memory 46B-1, and is then transmitted via the switch 131 as an output Y signal of the first channel CH1. A digital Y signal of the second channel CH2 is read out from the frame memory 46B-1, and is then transmitted as an output Y signal of the second channel CH2. A digital Cr signal of the first channel CH1 is read out from the frame memory 46B-2, and is then transmitted via the switch 132 as an output Cr signal of the first channel CH1. A digital Cr signal of the second channel CH2 is read out from the frame memory 46B-2, and is then transmitted as an output Cr signal of the second channel CH2. A digital Cb signal of the first channel CH1 is read out from the frame memory 46B-3, and is then transmitted via the switch 133 as an output Cb signal of the first channel CH1. A digital Cb signal of the second channel CH2 is read out from the frame memory 46B-3, and is then transmitted as an output Cb signal of the second channel CH2.

Input video signals are divided into segments corresponding to DCT blocks each having 8 by 8 pixels. DCT blocks are grouped into macro-blocks. Every macro-block is composed of plural DCT blocks. Macro-blocks are grouped into super-blocks. Every super-block is composed of 27 macro-blocks. Super-blocks in every frame are paired. Each pair has two vertically-neighboring super-blocks. This pair is defined as an extended super-block.

Frame sizes are as follows. In the case of the 525/60 system with a sampling frequency ratio of "4:1:1", the frame size is chosen so that the number of samples (pixels) of a Y signal will be equal to 720 (in the horizontal direction) by 480 (in the vertical direction) while the number of samples of each of a Cr signal and a Cb signal will be equal to 180 (in the horizontal direction) by 480 (in the vertical direction). In the case of the 625/50 system with a sampling frequency ratio of "4:2:0", the frame size is chosen so that the number of samples (pixels) of a Y signal will be equal to 720 (in the horizontal direction) by 576 (the vertical direction) while the number of samples of each of a Cr signal and a Cb signal will be equal to 360 (the horizontal direction) by 288 (the vertical direction). In the case of the 525/60 system with a sampling frequency ratio of "4:2:2", the frame size is chosen so that the number of samples (pixels) of a Y signal will be equal to 720 (in the horizontal direction) by 480 (in the vertical direction) while the number of samples of each of a Cr signal and a Cb signal will be equal to 360 (in the horizontal direction) by 480 (in the vertical direction). In the case of the 625/50 system with a sampling frequency ratio of "4:2:2", the frame size is chosen so that the number of samples (pixels) of a Y signal will be equal to 720 (in the horizontal direction) by 576 (the vertical direction) while the number of samples of each of a Cr signal and a Cb signal will be equal to 360 (the horizontal direction) by 576 (the vertical direction).

In the case of the 525/60 system with a sampling frequency ratio of "4:1:1", extended super-blocks Si,j are arranged to form a frame of the first channel CH1 as shown in FIG. 42. In addition, extended super-blocks Si,j are arranged to form a frame of the second channel CH2 as shown in FIG. 43. Here, i=0, 2, 4, 6, 8 for the first channel CH1, and i=1, 3, 5, 7, 9 for the second channel CH2. On the other hand, j=0, 1, 2, 3, 4 for the first channel CH1 and the second channel CH2.

Figure 44:
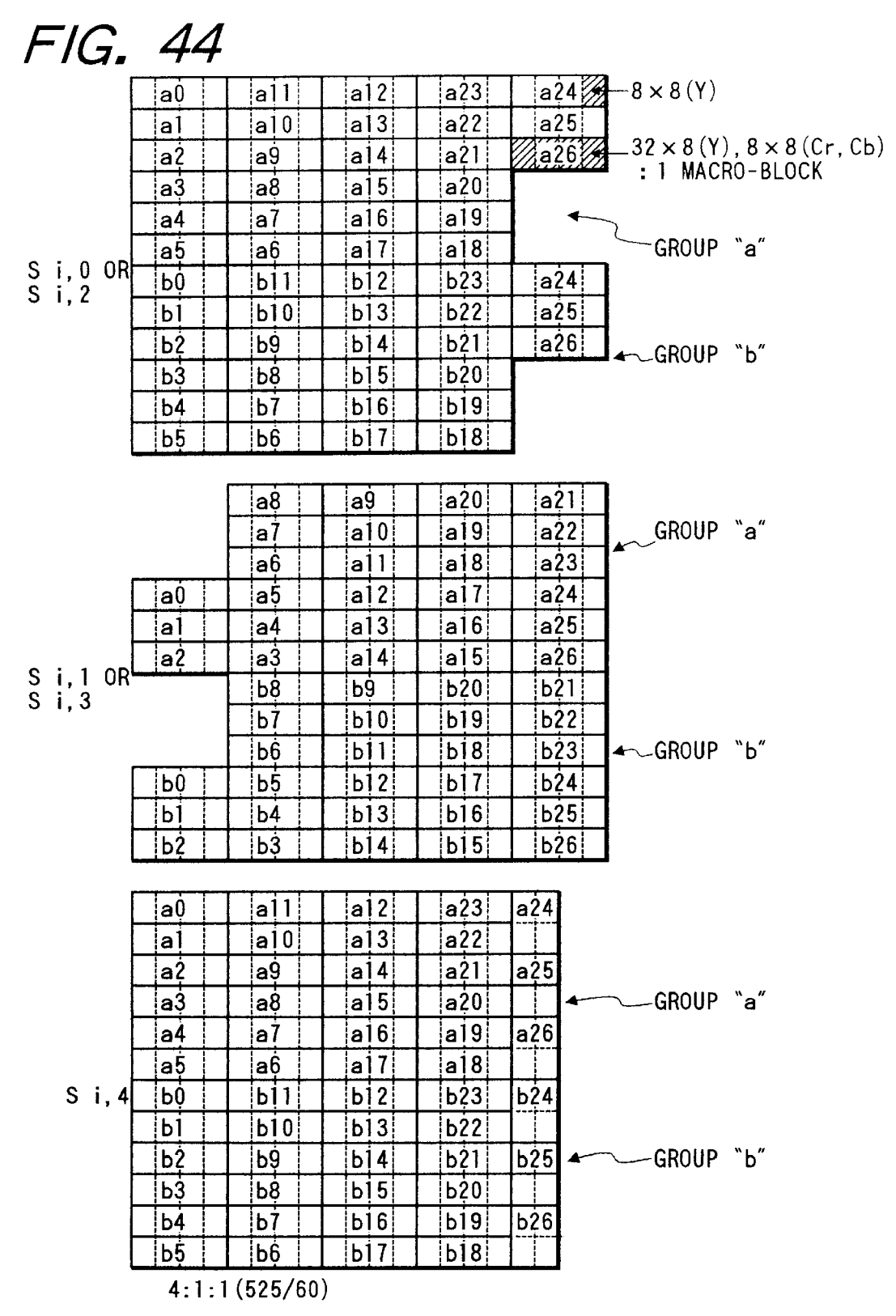

In the case of the 525/60 system with a sampling frequency ratio of "4:1:1", extended super-blocks in every frame are of three types (first, second, and third types) different from each other in configuration of 54 data units corresponding to 54 macro-blocks respectively. Here, every data unit also corresponds to a memory unit in a VLC circuit 30B. Extended super-blocks Si,0 and Si,2 are of the first type shown in an upper part of FIG. 44 where 27 macro-blocks (data units) in the group "a" are numbered as a0, a1, a2, a26, and 27 macro-blocks (data units) in the group "b" are numbered as b0, b1, b2, . . . , b26. Extended super-blocks Si,1 and Si,3 are of the second type shown in an intermediate part of FIG. 44. Extended super-blocks Si,4 are of the third type shown in a lower part of FIG. 44.

In the case of the 625/50 system with a sampling frequency ratio of "4:2:0", extended super-blocks Si,j are arranged to form a frame of the first channel CH1 as shown in FIG. 45. In addition, extended super-blocks Si,j are arranged to form a frame of the second channel CH2 as shown in FIG. 46. Here, i=0, 2, 4, 6, 8, 10 for the first channel CH1, and i=1, 3, 5, 7, 9, 11 for the second channel CH2. On the other hand, j=0, 1, 2, 3, 4 for the first channel CH1 and the second channel CH2.

Figures 47, 48:
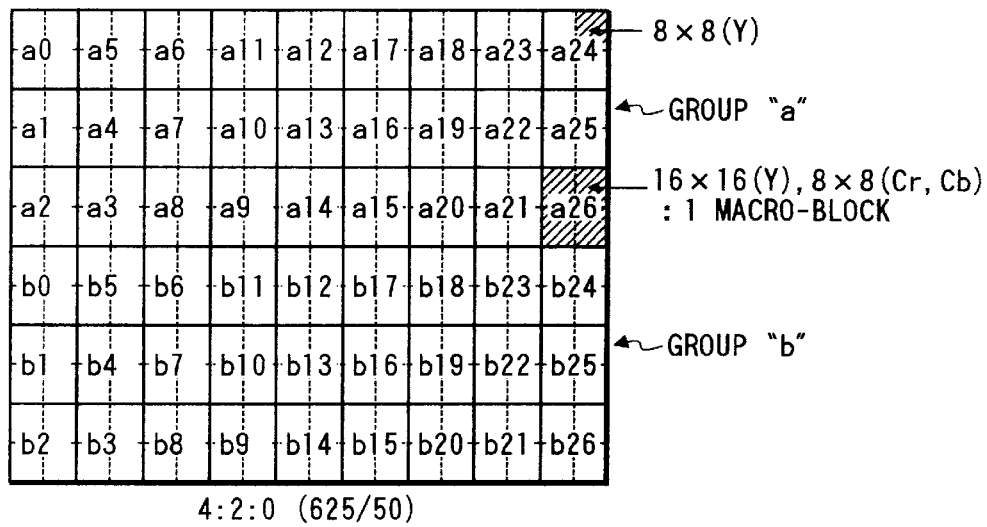
FIG. 47 is a diagram of extended super-blocks of a 625/50 system in the second embodiment of this invention.
FIG. 48 is a diagram of extended super-blocks corresponding to a 1-frame picture in the second embodiment of this invention.

In the case of the 625/50 system with a sampling frequency ratio of "4:2:0", extended super-blocks in every frame are equal in configuration of 54 data units corresponding to 54 macro-blocks respectively. As shown in FIG. 47, an extended super-block has an arrangement of 27 macro-blocks (data units) a0, a1, a2, . . . , a26 in the group "a", and also an arrangement of 27 macro-blocks (data units) b0, b1, b2, . . . , b26 in the group "b".

In the case of the 525/60 system with a sampling frequency ratio of "4:2:2", extended super-blocks are arranged to form a frame as shown in FIG. 48. In this case, i=0, 1, 2, 3, . . . , 9 while j=0, 1, 2, 3, 4. In the case of the 625/50 system with a sampling frequency ratio of "4:2:2", extended super-blocks are arranged to form a frame as shown in FIG. 48. In this case, i=0, 1, 2, 3, . . . , 11 while j=0, 1, 2, 3, 4.

Figure 49:
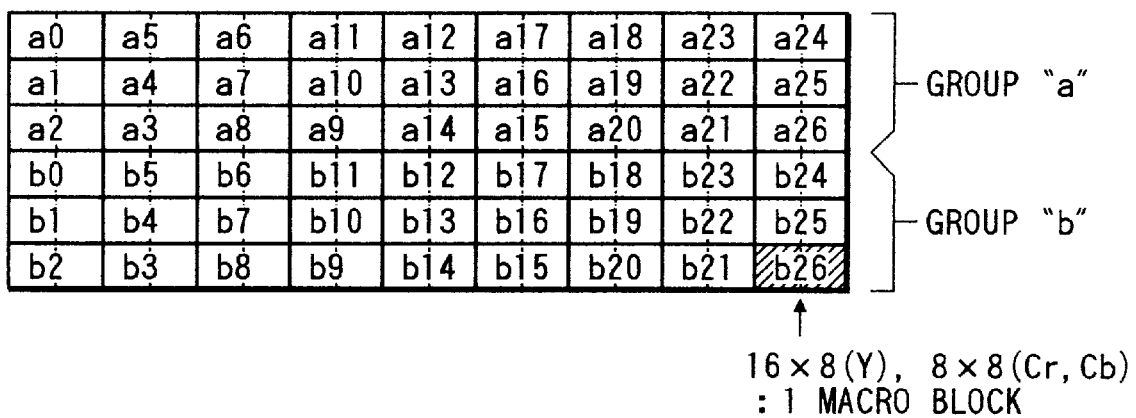
FIG. 49 is a diagram of an extended super-block composed of macro-blocks in the second embodiment of this invention.

In the case of the 625/50 system with a sampling frequency ratio of "4:2:0" and the 525/60 system with a sampling frequency ratio of "4:2:0", extended super-blocks in every frame are equal in configuration of 54 data units corresponding to 54 macro-blocks respectively. As shown in FIG. 49, an extended super-block has an arrangement of 27 macro-blocks (data units) a0, a1, a2, . . . , a26 in the group "a", and also an arrangement of 27 macro-blocks (data units) b0, b1, b2, . . . , b26 in the group "b".

Extended super-blocks $S_{i,j}$ are expressed as follows.

$$S_{i,j} = \{Ma_{i,j,k}; Mb_{i,j,k}\}$$

where $Ma_{i,j,k}$ denotes macro-blocks in the group "a", and $Mb_{i,j,k}$ denotes macro-blocks in the group "b". In the case of the 525/60 system with a sampling frequency ratio of "4:1:1", i=0, 2, 4, 6, 8 for the first channel CH1, and i=1, 3, 5, 7, 9 for the second channel CH2. In addition, j=0, 1, 2, 3, 4, and k=0, 1, 2, . . . , 26. In the case of the 625/50 system with a sampling frequency ratio of "4:2:0", i=0, 2, 4, 6, 8, 10 for the first channel CH1, and i=1, 3, 5, 7, 9, 11 for the second channel CH2. In addition, j=0, 1, 2, 3, 4, and k=0, 1, 2, . . . , 26. In the case of the 525/60 system with a sampling frequency ratio of "4:2:2", i=0, 1, 2, . . . , 9, and j=0, 1, 2, 3, 4, and k=0, 1, 2, . . . , 26. In the case of the 625/50 system with a sampling frequency ratio of "4:2:2", i=0, 1, 2, . . . , 11, and j=0, 1, 2, 3, 4, and k=0, 1, 2, . . . , 26.

Figure 50:
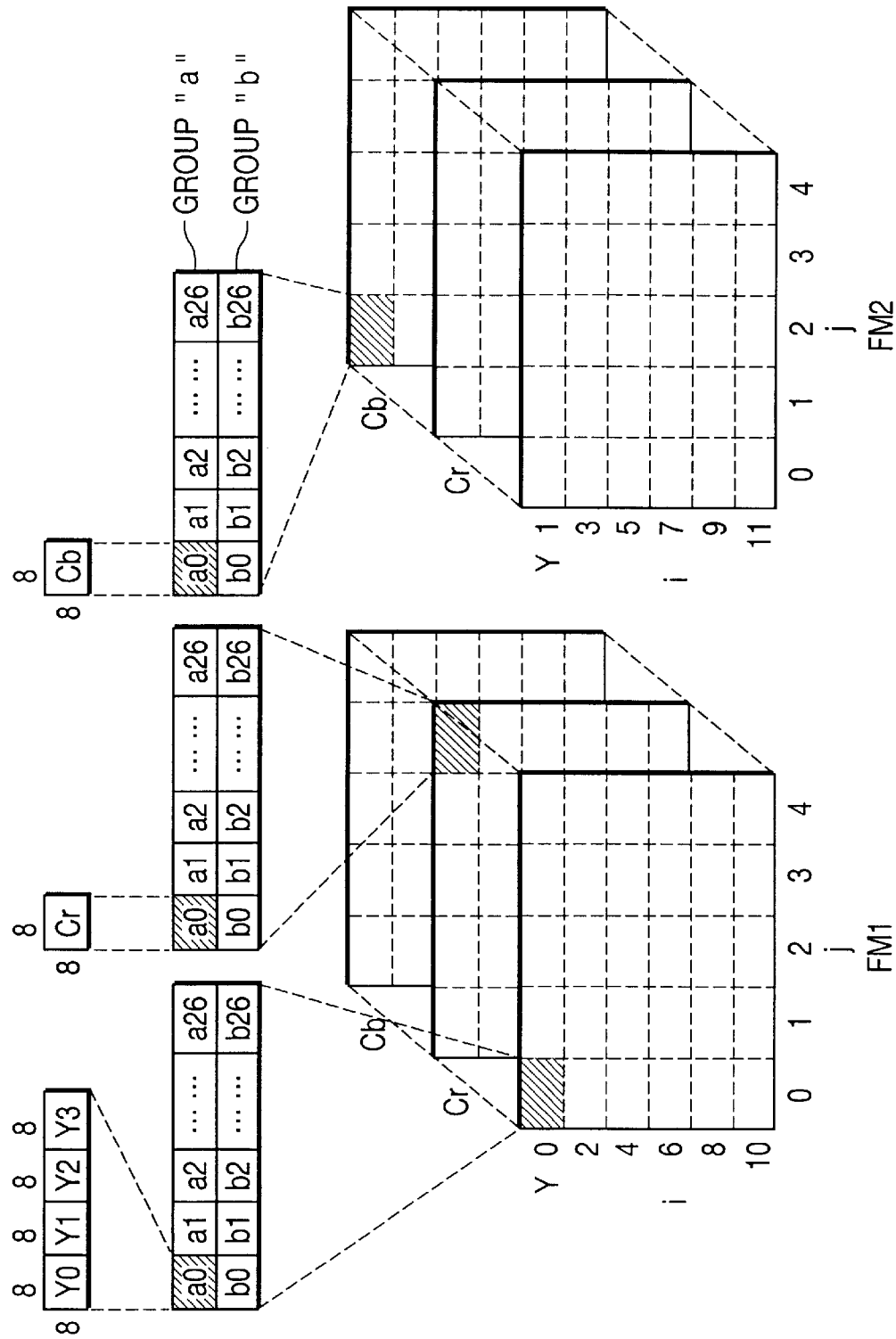
FIG. 50 is a diagram of frame memories, and data pieces stored in the frame memories in the second embodiment of this invention.

Input video signals are stored into the frame memories in the first rearranging circuit 12B (see FIG. 36) according to a related sampling format and a related extended super-block structure. As shown in FIG. 50, the frame memories in the first rearranging circuit 12B are separated into a first memory set FM1 and a second memory set FM2. Operation of the frame memories in the first set FM1 and operation of the frame memories in the second set FM2 are independent of each other. Thus, equal memory addresses in the first and second sets FM1 and FM2 can be simultaneously accessed.

When the input video signals relate to a sampling frequency ratio of "4:2:2", signal pieces corresponding to extended super-blocks having even-numbered vertical addresses are written into the frame memory set FM1 and signal pieces corresponding to extended super-blocks having odd-numbered vertical addresses are written into the frame memory set FM2.

In the case of two-channel input video signals of the 525/60 system with a sampling frequency ratio of "4:1:1", signal pieces of the first channel CH1 are written into the first memory set FM1 and signal pieces of the second channel CH2 are written into the second memory set FM2.

In the case of two-channel input video signals of the 625/50 system with a sampling frequency ratio of "4:2:0", signal pieces of the first channel CH1 are written into the first memory set FM1 and signal pieces of the second channel CH2 are written into the second memory set FM2.

In the case of two-channel input video signals, during the writing of signal pieces, it is preferable to simultaneously access the first memory set FM1 and the second memory set FM2. The first memory set FM1 and the second memory set FM2 may be accessed at different timings on a time division basis.

The signal pieces are read out from the frame memories in the first rearranging circuit 12B before being transmitted to the first and second data compressors 14B-1 and 14B-2 (see FIG. 36).

Video segments provide a unit for data-amount control. Video segments composing every frame which occur before compression are denoted by characters $V_{i,k}$. Video segments $V_{i,k}$ are defined as follows.

$$V_{i,k} = \{Va_{i,k}, Vb_{i,k}\}$$

where i=0, 1, 2, . . . , 9 (in the case of the 525/60 system with a sampling frequency ratio of "4:2:2"); i=0, 1, 2, . . . , 11 (in the case of the 625/50 system with a sampling frequency ratio of "4:2:2"); k=0, 1, 2, . . . , 26; $Va_{i,k}$ denotes video segments in the group "a"; and $Vb_{i,k}$ denotes video segments in the group "b". In the case of the 525/60 system with a sampling frequency ratio of "4:1:1", i=0, 2, 4, 6, 8 for the first channel CH1 and i=1, 3, 5, 7, 9 for the second channel CH2, and k=0, 1, 2, . . . , 26. In the case of the 625/50 system with a sampling frequency ratio of "4:2:0", i=0, 2, 4, 6, 8, 10 for the first channel CH1 and i=1, 3, 5, 7, 9, 11 for the second channel CH2, and k=0, 1, 2, . . . , 26.

Video segments $Va_{i,k}$ in the group "a" and video segments $Vb_{i,k}$ in the group "b" are expressed as follows.

$$Va_{i,k} = \{Ma_{(i+2) \bmod n, 2, k}; Ma_{(i+6) \bmod n, 1, k}; Ma_{(i+8) \bmod n, 3, k};$$
$$Ma_{(i+0) \bmod n, 0, k}; Ma_{(i+4) \bmod n, 4, k}\}$$

$$Vb_{i,k} = \{Mb_{(i+2) \bmod n, 2, k}; Mb_{(i+6) \bmod n, 1, k}; Mb_{(i+8) \bmod n, 3, k};$$
$$Mb_{(i+0) \bmod n, 0, k}; Mb_{(i+4) \bmod n, 4, k}\}$$

where n=12 (in the case of the 625/50 system); n=10 (in the case of the 525/60 system); $Ma_{p,j,k}$ denotes macro-blocks in the group "a"; and $Mb_{p,j,k}$ denotes macro-blocks in the group "b". In addition, p=q mod n, and "q mod n" means the remainder in division of a number "q" by a number "n". As previously explained, "i" indicates an extended super-block vertical address with respect to a frame. In the case of the 525/60 system, i=0, 1, 2, 3, . . . , 9. In the case of the 625/50 system, i=0, 1, 2, 3, . . . , 11. Also, "p" indicates an extended super-block vertical address with respect to a frame. In the case of the 525/60 system, p=0, 1, 2, 3, . . . , 9. In the case of the 625/50 system, p=0, 1, 2, 3, . . . , 11. As previously explained, "j" indicates an extended super-block horizontal address with respect to the frame, and j=0, 1, 2, 3, 4. Furthermore, "k" denotes a macro-block address in an extended super-block, and k=0, 1, 2, . . . , 26.

Figure 51:
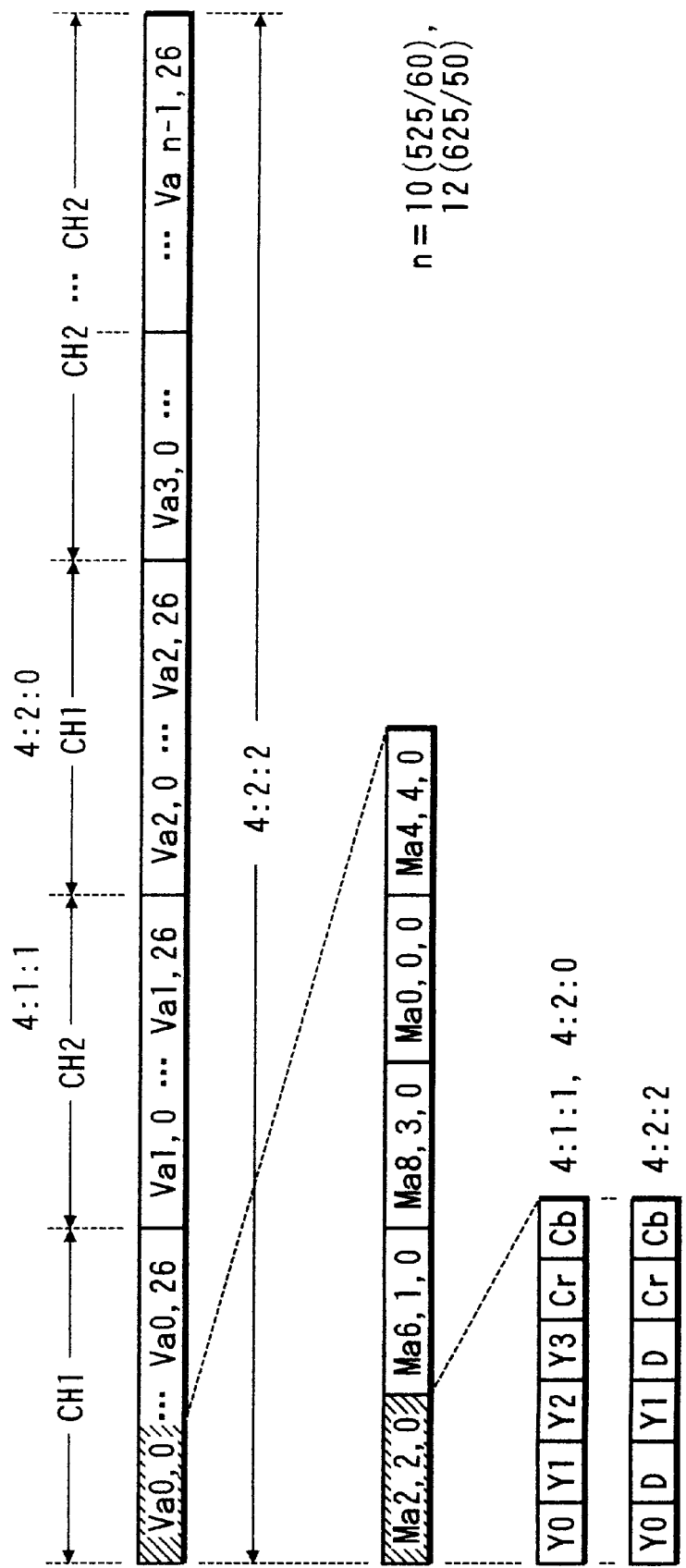
FIG. 51 is a diagram of DCT blocks, macro-blocks, first-channel video segments, and second-channel video segments in the second embodiment of this invention.

With reference back to FIG. 36, video-segment signal pieces in the group "a" and video-segment signal pieces in the group "b" are outputted from the first rearranging circuit 12B in parallel before being fed to the first data compressor 14B-1 and the second data compressor 14B-2 respectively. The "a"-group output signal of the first rearranging circuit 12B has a given shuffling order of video segments as shown in FIG. 51. The "b"-group output signal of the first rearranging circuit 12B has a similar shuffling order of video segments. In the case of two-channel signals, signal pieces of the first channel CH1 and signal pieces of the second channel CH2 are alternately read out from the first rearranging circuit 12B at different timings on a time division basis to provide a rearrangement-resultant "a"-group data sequence or a rearrangement-resultant "b"-group data sequence.

It should be noted that picture information of the first channel CH1 and picture information of the second channel CH2 may be assigned to the group "a" and the group "b" respectively. In this case, the picture information of the first channel CH1 and the picture information of the second channel CH2 are processed by the data compressors 14B-1 and 14B-2 respectively.

The data related to the group "a" and the data related to the group "b" are compressed video-segment by video-segment. Video segments composing every frame which occur after compression (bit rate reduction) are denoted by characters $v_{i,k}$. Video segments $v_{i,k}$ are expressed as follows.

$$v_{i,k} = \{va_{i,k}, vb_{i,k}\}$$

where i=0, 1, 2, . . . , 9 (in the case of the 525/60 system with a sampling frequency ratio of "4:2:2"); i=0, 1, 2, . . . , 11 (in the case of the 625/50 system with a sampling frequency ratio of "4:2:2"); k=0, 1, 2, . . . , 26; $va_{i,k}$ denotes video segments in the group "a"; and $vb_{i,k}$ denotes video segments in the group "b". In the case of the 525/60 system with a sampling frequency ratio of "4:1:1", i=0, 2, 4, 6, 8 for the first channel CH1 and i=1, 3, 5, 7, 9 for the second channel CH2, and k=0, 1, 2, . . . , 26. In the case of the 625/50 system with a sampling frequency ratio of "4:2:0", i=0, 2, 4, 6, 8, 10 for the first channel CH1 and i=1, 3, 5, 7, 9, 11 for the second channel CH2, and k=0, 1, 2, . . . , 26.

Video segments $va_{i,k}$ in the group "a" and video segments $vb_{i,k}$ in the group "b" are expressed as follows.

$$va_{i,k} = \{Ua_{(i+2) \bmod n, 2, k}; Ua_{(i+6) \bmod n, 1, k}; Ua_{(i+8) \bmod n, 3, k};$$
$$Ua_{(i+0) \bmod n, 0, k}; Ua_{(i+4) \bmod n, 4, k}\}$$

$$vb_{i,k} = \{Ub_{(i+2) \bmod n, 2, k}; Ub_{(i+6) \bmod n, 1, k}; Ub_{(i+8) \bmod n, 3, k};$$
$$Ub_{(i+0) \bmod n, 0, k}; Ub_{(i+4) \bmod n, 4, k}\}$$

where n=12 (in the case of the 625/50 system); n=10 (in the case of the 525/60 system); $Ua_{p,j,k}$ denotes data units for containing compression-resultant data pieces in the group "a"; and $Ub_{p,j,k}$ denotes data units for containing compression-resultant data pieces in the group "b". In addition, "p" denotes a track order number and corresponds to an extended super-block vertical address "i" with respect to a frame. In the case of the 525/60 system, p=0, 1, 2, 3, . . . , 9. In the case of the 625/50 system, p=0, 1, 2, 3, . . . , 11. Furthermore, "j" corresponds to an extended super-block horizontal address with respect to the frame, and j=0, 1, 2, 3, 4. In addition, "k" corresponds to a macro-block address in an extended super-block, and k=0, 1, 2, . . . , 26.

Figure 52:
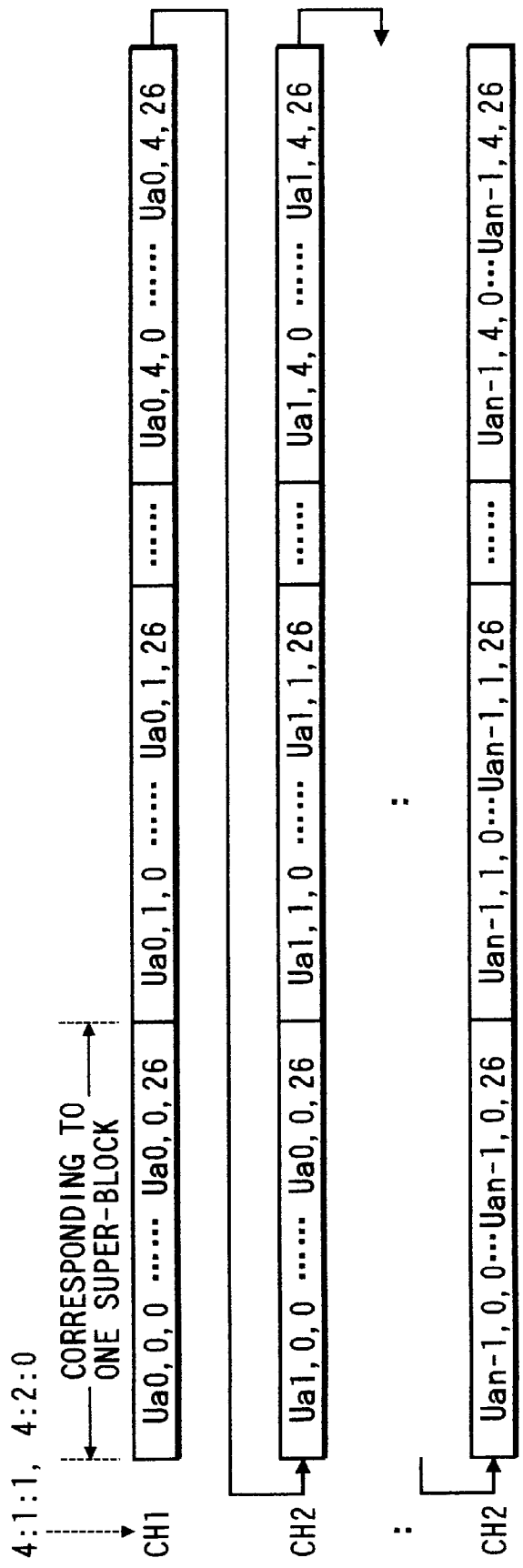
FIG. 52 is a diagram of a sequence of data units represented by an output signal of a second rearranging circuit in the second embodiment of this invention.

With reference back to FIG. 37, video-segment data pieces in the group "a" are fed from the VLC circuit 30B to the second rearranging circuit 32B. The video-segment data pieces are rearranged by the second rearranging circuit 32B in the order of super blocks in a frame. Data units represented by the output signal of the second rearranging circuit 32B are arranged along a time base as shown in FIG. 52.

The error correction code adding circuit 34B receives the output signal of the second rearranging circuit 32B, that is, the rearrangement-resultant signal. The error correction code adding circuit 34B adds an inner code (inner-parity information or inner error checking and correcting information) and an outer code (outer-parity information or outer error checking and correcting information) to the output signal of the second rearranging circuit 32B.

Specifically, outer code words are added to data segments with equal byte numbers which compose respective data units for every track. In addition, an inner code word is added for each of data units or outer code information pieces. During the generation of the outer code words, helper information unrelated to the present data units may be added.

In order to suitably place "a"-group information and "b"-group information on a magnetic tape, two video sectors "0" and "1" are prepared for one recording track on the magnetic tape. Video segments related to the group "a" are recorded on even-numbered tracks while video segments related to the group "b" are recorded on odd-numbered tracks.

When input video signals relate to a sampling frequency ratio of "4:2:2", signal pieces corresponding to extended super-blocks having even-numbered vertical addresses are written into video sectors "0" of recording tracks and signal pieces corresponding to extended super-blocks having odd-numbered vertical addresses are written into video sectors "1" of the recording tracks.

In the case of two-channel input video signals relating to a sampling frequency ratio of "4:1:1" or "4:2:0", signal pieces of the first channel CH1 are written into video sectors "0" of recording tracks and signal pieces of the second channel CH2 are written into video sectors "1" of recording tracks. It should be noted that only one of a first-channel signal and a second-channel signal may be recorded.

Figure 53:
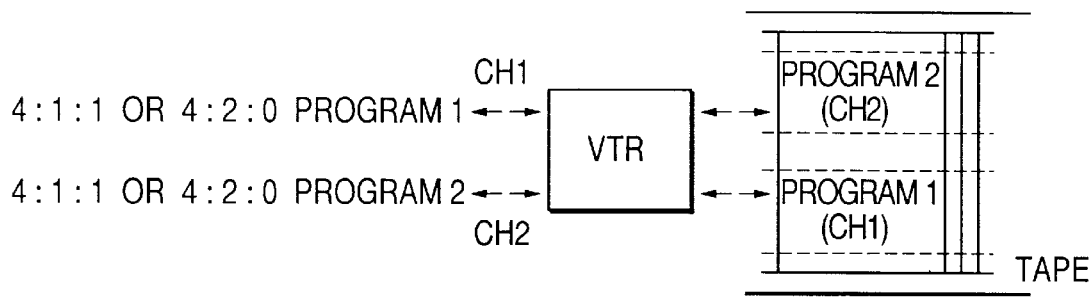
FIG. 53 is a diagram of the digital VTR, a magnetic tape, programs recorded on the magnetic tape and represented by data pieces having a sampling frequency ratio of "4:1:1" or "4:2:0" in the second embodiment of this invention.

FIG. 53 shows conditions where information of a program "1" and information of a program "2" corresponding to the first and second channels CH1 and CH2 are recorded on two half areas of a magnetic tape respectively. In this case, the information of the program "1" and the information of the program "2" relate to a sampling frequency ratio of "4:1:1" or "4:2:0". The first half area of the magnetic tape on which the information of the program "1" is recorded has video sectors "0" of recording tracks. The second half area of the magnetic tape on which the information of the program "2" is recorded has video sectors "1" of the recording tracks.

Figure 54:
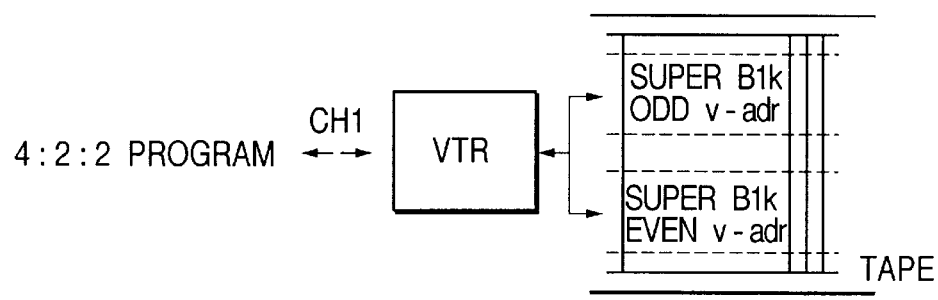
FIG. 54 is a diagram of the digital VTR, a magnetic tape, and a program recorded on the magnetic tape and represented by data pieces having a sampling frequency ratio of "4:2:2" in the second embodiment of this invention.

FIG. 54 shows conditions where information of a program "1" which relates to a sampling frequency ratio of "4:2:2" is recorded on a magnetic tape on a division basis. Specifically, the information of the program "1" is divided into a first group of information pieces corresponding to extended super-blocks having even-numbered vertical addresses and a second group of information pieces corresponding to extended super-blocks having odd-numbered vertical addresses. The first group of the information pieces are written into video sectors "0" of recording tracks while the second group of the information pieces are written into video sectors "1" of the recording tracks.

Figure 55:
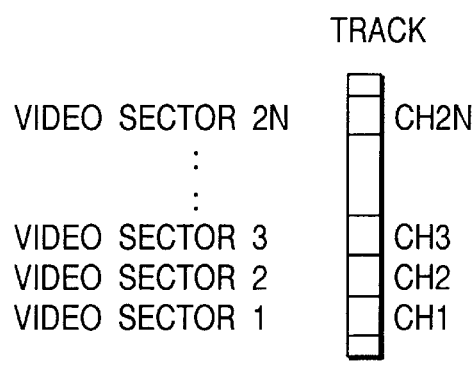
FIG. 55 is a diagram of a recording track divided into 2N segments corresponding to 2N video sectors in a modification of the second embodiment of this invention.

The embodiment of this invention may be modified as follows. According to a modification of the embodiment of this invention, a data compressing portion has 2n data compressors while a data expanding portion has 2n data expanders, where "n" denotes a given natural number greater than "1". This modification can record and reproduce n-channel video signals related to a sampling frequency ratio of "4:2:2". Also, the modification can record and reproduce 2n-channel video signals related to a sampling frequency ratio of "4:1:1" or "4:2:0". In this case, the 2n-channel video signals are recorded on divided areas of a magnetic tape as shown in FIG. 55.

Third Embodiment

A third embodiment of this invention is similar to the first embodiment thereof except for design changes explained later.

Figure 56:
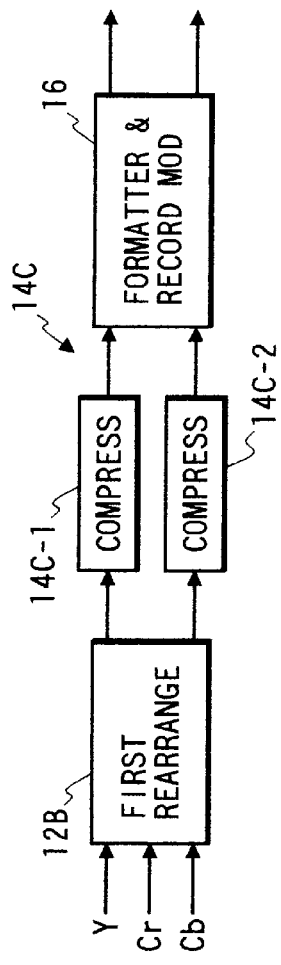
FIG. 56 is a block diagram of a recording side of a digital VTR according to a third embodiment of this invention.

FIG. 56 shows a recording side of a digital VTR according to the third embodiment of this invention. As shown in FIG. 56, the recording side of the digital VTR includes a first rearranging circuit 12B, a data compressing portion 14C, and a formatter and record modulation circuit 16B. The first rearranging circuit 12B is followed by the data compressing portion 14C. The data compressing portion 14C is followed by the formatter and record modulation circuit 16B.

The data compressing portion 14C includes a first data compressor 14C-1 and a second data compressor 14C-2 arranged in parallel. The first data compressor 14C-1 processes information pieces in a group "a" while the second data compressor 14C-2 processes information pieces in a group "b". The first and second data compressors 14C-1 and 14C-2 have equal structures. Accordingly, only the first data compressor 14C-1 will be explained in detail.

Figure 57:
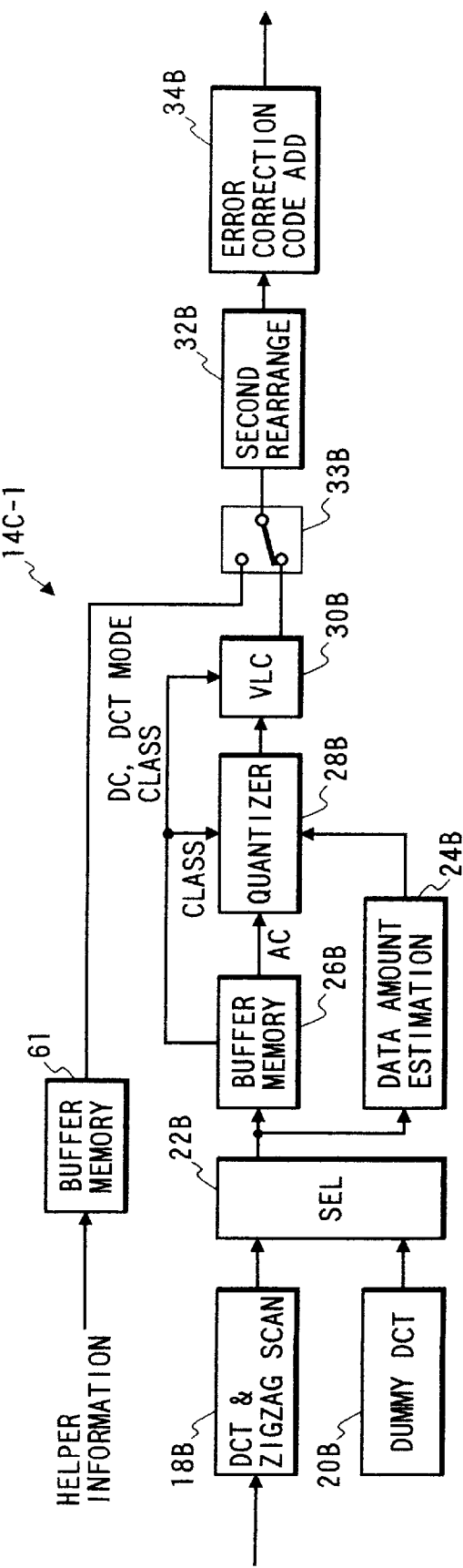
FIG. 57 is a block diagram of a data compressor in FIG. 56.

As shown in FIG. 57, the first data compressor 14C-1 includes a DCT and zigzag scan circuit 18B, a dummy DCT circuit 20B, a selection circuit 22B, a data amount estimation circuit 24B, a buffer memory 26B, an adaptive quantizer 28B, a VLC circuit 30B, a second rearranging circuit 32B, a switch 33B, an error correction code adding circuit 34B, and a buffer memory 61.

An input side of the DCT and zigzag scan circuit 18B is connected to an output side of the first rearranging circuit 12B in FIG. 56. Input sides of the selection circuit 22B are connected to output sides of the DCT and zigzag scan circuit 18B and the dummy DCT circuit 20B respectively. An input side of the buffer memory 26B is connected to an output side of the selection circuit 22B. An input side of the data amount estimation circuit 24B is connected to the output side of the selection circuit 22B. The buffer memory 26B is successively followed by the adaptive quantizer 28B, the VLC circuit 30B, the switch 33B, the second rearranging circuit 32B, and the error correction code adding circuit 34B. An output side of the error correction code adding circuit 34B is connected to an input side of the formatter and record modulation circuit 16B in FIG. 56. The adaptive quantizer 28B is connected to an output side of the data amount estimation circuit 24B. The VLC circuit 30B is connected to the buffer memory 26B. The buffer memory 61 is connected to the switch 33B.

Figure 58:
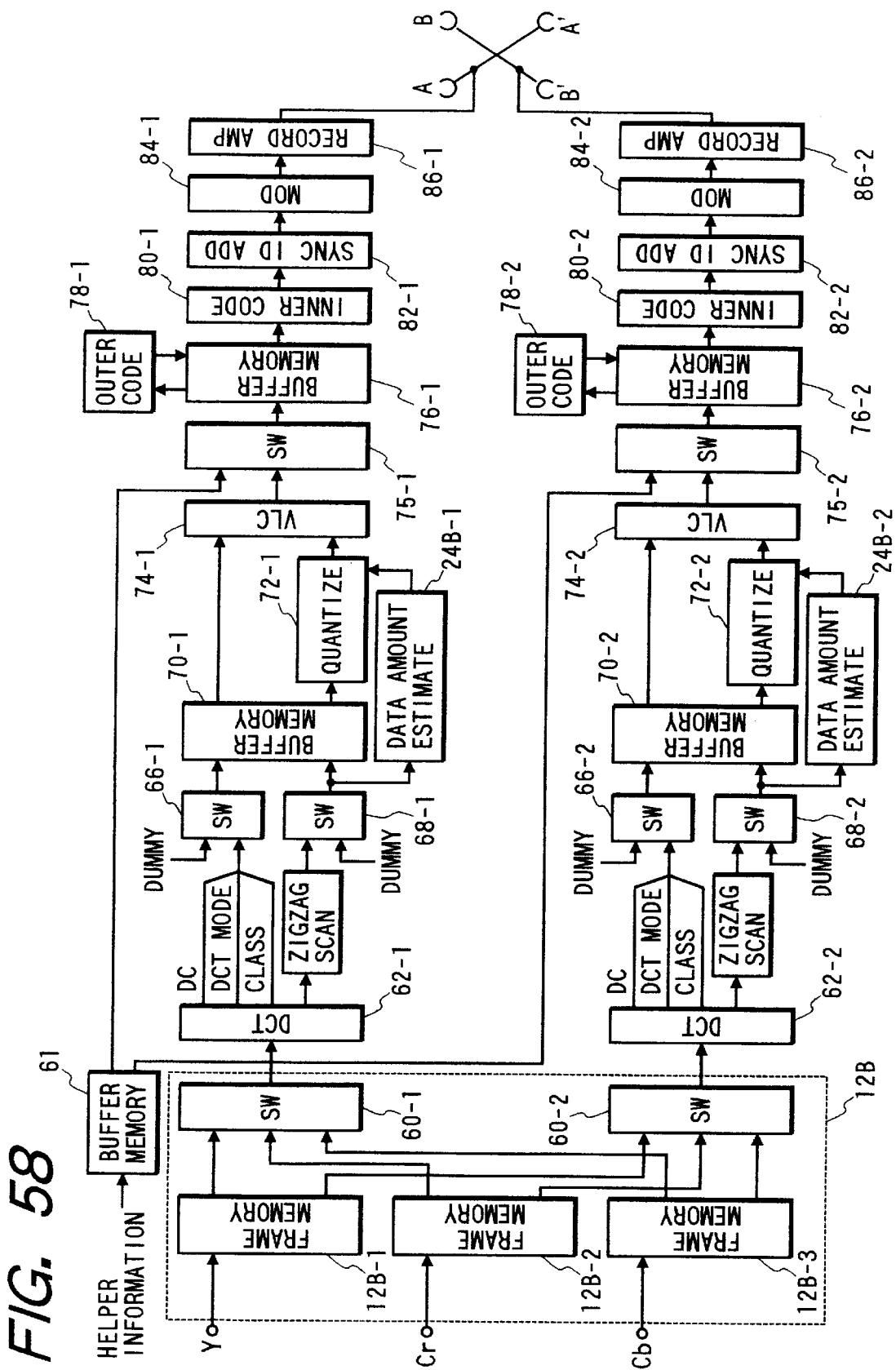
FIG. 58 is a detailed block diagram of the recording side of the digital VTR in FIG. 56.

FIG. 58 shows the details of the recording side of the digital VTR in FIG. 56. As shown in FIG. 58, the buffer memory 61 is connected to switches 75-1 and 75-2. The switch 75-1 is connected between a VLC circuit 74-1 and a buffer memory 76-1. The switch 75-1 corresponds to the switch 33B in FIG. 57. The switch 75-2 is connected between a VLC circuit 74-2 and a buffer memory 76-2.

With reference to FIG. 27, DC regions DC-1 and DC-3 in each memory unit of the VLC circuit 30B are loaded with data unrelated to picture information. As will be explained later, helper information is stored in the DC regions DC-1 and DC-3 in the memory unit.

With reference back to FIG. 57, video-segment data pieces of a variable length code are outputted from the VLC circuit 30B to the switch 33B. The buffer memory 61 is loaded with helper information. The helper information is outputted from the buffer memory 61 to the switch 33B. One of the output signal of the VLC circuit 30B and the output signal of the buffer memory 61 is selected by the switch 33B, and the selected signal is transmitted from the switch 33B to the second rearranging circuit 32B. The switch 33B serves to add the helper information to the sequence of the video-segment data pieces at places corresponding to the DC regions DC-1 and DC-3 for dummy DCT blocks.

Figure 59:
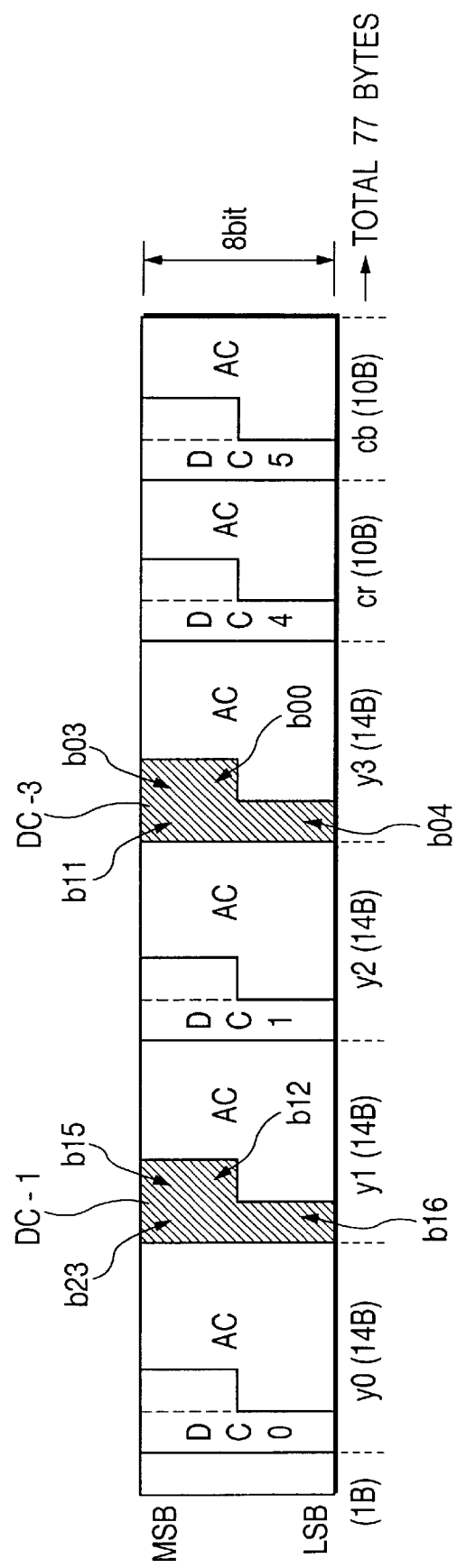
FIG. 59 is a diagram of a data unit (a memory unit) in the third embodiment of this invention.

Specifically, during a period for which the output signal of the VLC circuit 30B corresponds to the DC regions DC-1 and DC-3 for dummy DCT blocks, the switch 33B selects the helper information. During other periods, the switch 33B selects the output signal of the VLC circuit 30B. As shown in FIG. 59, the helper information is assigned to 24 bits being a set of 12 bits b00, b01, . . . , and b11 in the DC region DC-3 and 12 bits b12, b13, . . . , and b23 in the DC region DC-1.

It should be noted that the switch 33B may be placed in another position such as a position between the dummy DCT circuit 20B and the selection circuit 22B, a position between the selection circuit 22B and the buffer memory 26B, a position between the buffer memory 26B and the adaptive quantizer 28B, or a position between the adaptive quantizer 28B and the VLC circuit 30B.

FIG. 60 shows a reproducing side of the digital VTR according to the third embodiment of this invention. As shown in FIG. 60, the recording side of the digital VTR includes a demodulation and deformatter circuit 42B, a data expanding portion 44C, and a fourth rearranging circuit 46B. The demodulation and deformatter circuit 42B is successively followed by the data expanding portion 44C and the fourth rearranging circuit 46B.

The data expanding portion 44C includes a first data expander 44C-1 and a second data expander 44C-2. The first expander 44C-1 processes information pieces in the group "a" while the second expander 44C-2 processes information pieces in the group "b". The first and second data expanders 44C-1 and 44C-2 have equal structures. Accordingly, only the first data expander 44C-1 will be explained in detail.

As shown in FIG. 61, the first data expander 44C-1 includes an error correction and interpolation circuit 48B, a third rearranging circuit 50B, a VLD (variable length decoding) circuit 52B, an inverse quantizer 54B, an inverse zigzag scan and inverse DCT circuit 56B, and a buffer memory 99. An input side of the error correction and interpolation circuit 48B is connected to an output side of the demodulation and deformatter circuit 42B of FIG. 60. The error correction and interpolation circuit 48B is successively followed by the third rearranging circuit 50B, the VLD circuit 52B, the inverse quantizer 54B, and the inverse zigzag scan and inverse DCT circuit 56B. An output side of the inverse zigzag scan and inverse DCT circuit 56B is connected to an input side of the fourth rearranging circuit 46B of FIG. 60. The VLD circuit 52B is also directly connected to the inverse zigzag scan and inverse DCT circuit 56B. The buffer memory 99 is connected to an output side of the third rearranging circuit 50B.

Figure 62:
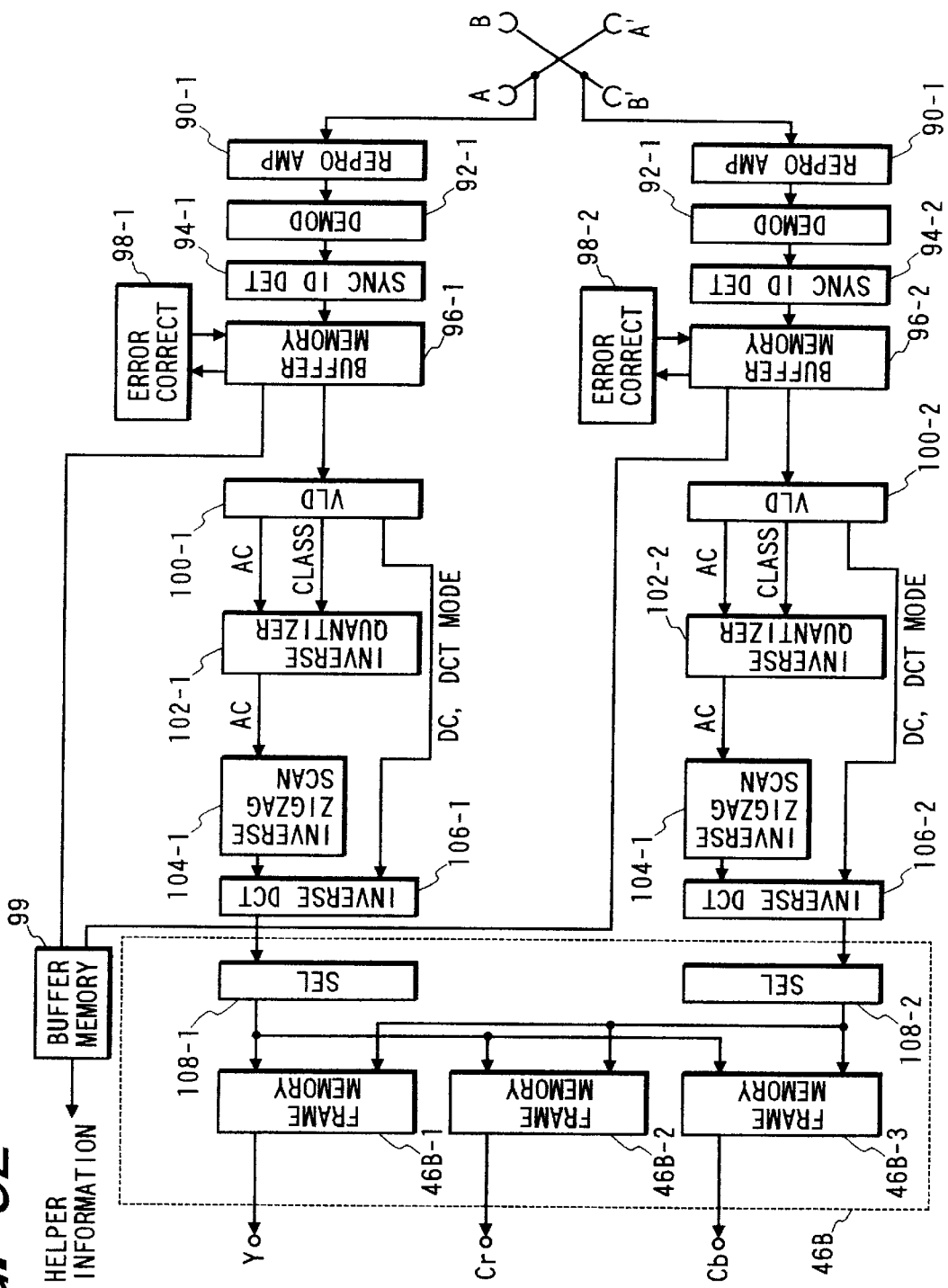
FIG. 62 is a detailed block diagram of the reproducing side of the digital VTR in FIG. 60.

FIG. 62 shows the details of the recording side of the digital VTR in FIG. 60. As shown in FIG. 62, the buffer memory 99 is connected to buffer memories 96-1 and 96-2.

With reference back to FIG. 61, an output signal of the third rearranging circuit 50B is fed to the VLD circuit 52B and also the buffer memory 99. During periods corresponding to the DC regions DC-1 and DC-2, the output signal of the third rearranging circuit 50B is written into the buffer memory 99. Thus, helper information is extracted from the output signal of the third rearranging circuit 50B, and is stored into the buffer memory 99. In this way, the helper information is recovered. The helper information is read out from the buffer memory 99 when being used.

Fourth Embodiment

A fourth embodiment of this invention is similar to the third embodiment thereof except for design changes explained later.

According to the fourth embodiment of this invention, helper information contains interpolation information which can be used during search. The interpolation information provides enhanced qualities of reproduced pictures during search.

Data units are paired. In each pair, a first data unit contains interpolation information for a second data unit while the second data unit contains interpolation information for the first data unit. Two data units in each pair are placed in positions on a same recording track which are spaced from each other by a given distance.

In the case where magnetic heads move across recording tracks along slant directions during search, macro-block data in un-traced data units are at least partially recovered from interpolation information in traced data units. Thus, it is possible to provide enhanced qualities of reproduced pictures during search.

For example, regarding every recording track, sync blocks in a video sector "0" and a video sector "1" which have equal position numbers are paired. In this case, there are pairs each having a data unit $Ux_{2m,j,k}$ and a data unit $U_{2m+1,j,k}$ where "x" denotes "a" or "b"; m=0, 1, 2, 3, 4 for a 525/60 system; m=0, 1, 2, 3, 4, 5 for a 625/50 system; j=0, 1, 2, 3, 4; and k=0, 1, 2, . . . , 26. Since dat units $Ux_{i,j,k}$ correspond to macro-blocks $Mx_{i,j,k}$ respectively, there are pairs each having a macro-block $Mx_{2m,j,k}$ and a macro-block $M_{2m+1,j,k}$.

Helper information for a macro-block $Mx_{2m+1,j,k}$ is recorded on a helper-information recording area related to a data unit $Ux_{2m,j,k}$. Helper information for a macro-block $Mx_{2m,j,k}$ is recorded on a helper-information recording area related to a data unit $Ux_{2m+1,j,k}$.

Helper information for macro-blocks $Mx_{i,j,k}$ is generated as follows. Picture information contained in every macro-block $Mx_{i,j,k}$ corresponds to two Y-signal DCT blocks (Y0, Y1), one Cr-signal DCT block (Cr), and one Cb-signal DCT block (Cb). A helper-information recording area related to one data unit $Ux_{i,j,k}$ has 24 bits b00, b01, . . . , b22, and b23. The helper information is composed of compressed DC-coefficient data pieces. Four 9-bit data pieces representing DC coefficients in two Y-signal DCT blocks, one Cr-signal DCT block, and one Cb-signal DCT block are quantized or compressed into four 6-bit data pieces which are assigned to the 24 bits for the helper information. Specifically, a 6-bit data piece representing a DC coefficient in a first Y-signal DCT block (Y0) is assigned to the helper information bits b18, b19, b20, b21, b22, and b23. A 6-bit data piece representing a DC coefficient in a second Y-signal DCT block (Y1) is assigned to the helper information bits b12, b13, b14, b15, b16, and b17. A 6-bit data piece representing a DC coefficient in a Cr-signal DCT block is assigned to the helper information bits b06, b07, b08, b09, b10, and b11. A 6-bit data piece representing a DC coefficient in a Cb-signal DCT block is assigned to the helper information bits b00, b01, b02, b03, b04, and b05.

FIG. 63 shows a recording side of a digital VTR according to the fourth embodiment of this invention. As shown in FIG. 63, the recording side of the digital VTR includes a first rearranging circuit 12B, a data compressing portion 14D, and a formatter and record modulation circuit 16B. The first rearranging circuit 12B is followed by the data compressing portion 14D. The data compressing portion 14D is followed by the formatter and record modulation circuit 16B.

The data compressing portion 14D includes a first data compressor 14D-1 and a second data compressor 14D-2 arranged in parallel. The first data compressor 14D-1 processes information pieces in a group "a" while the second data compressor 14D-2 processes information pieces in a group "b". The first and second data compressors 14D-1 and 14D-2 have similar structures.

Figure 64:
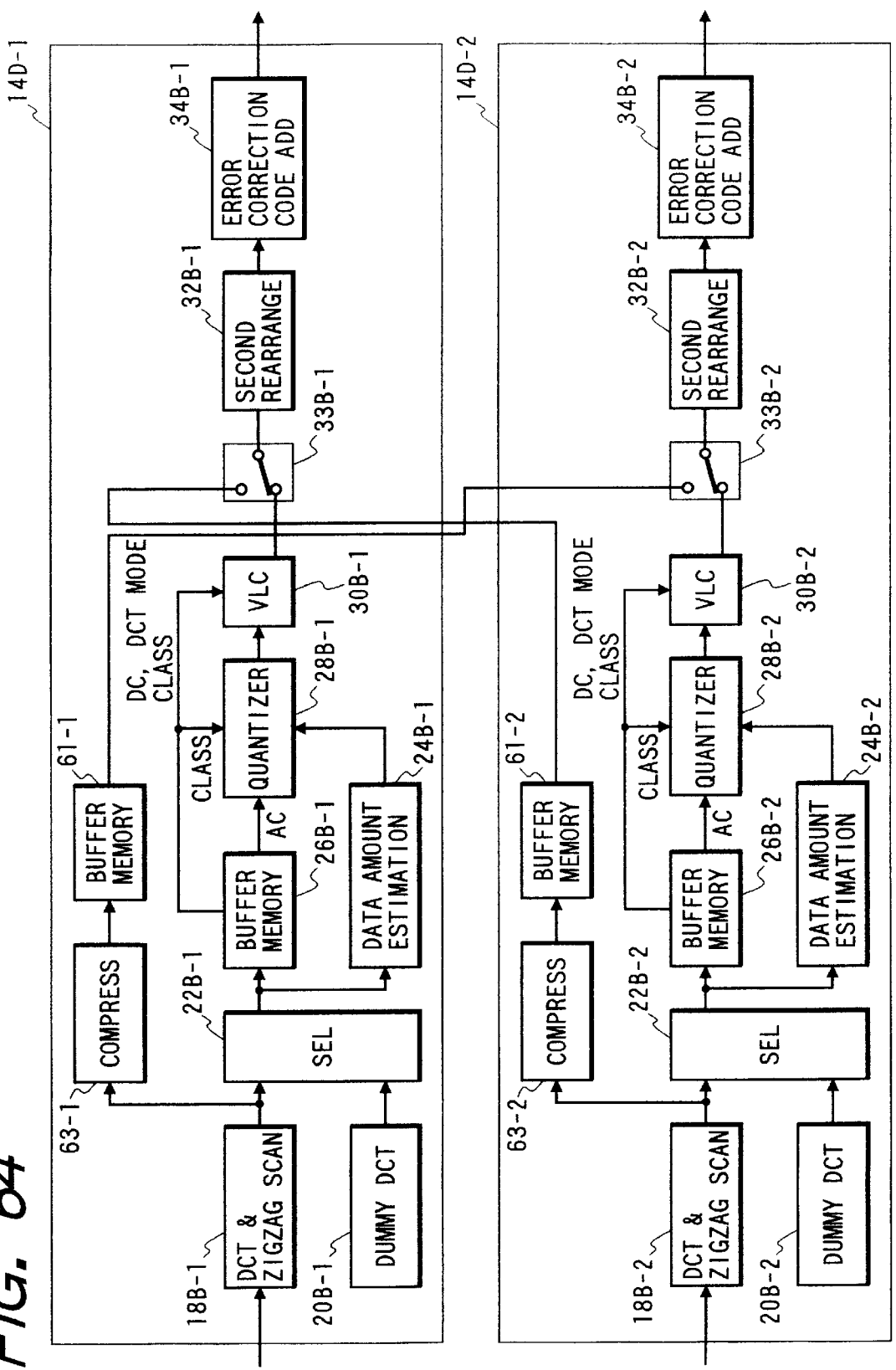
FIG. 64 is a block diagram of data compressors in FIG. 63.

As shown in FIG. 64, the first data compressor 14D-1 includes a DCT and zigzag scan circuit 18B-1, a dummy DCT circuit 20B-1, a selection circuit 22B-1, a data amount estimation circuit 24B-1, a buffer memory 26B-1, an adaptive quantizer 28B-1, a VLC circuit 30B-1, a second rearranging circuit 32B-1, a switch 33B-1, an error correction code adding circuit 34B-1, a buffer memory 61-1, and a compression circuit 63-1.

An input side of the DCT and zigzag scan circuit 18B-1 is connected to an output side of the first rearranging circuit 12B in FIG. 63. Input sides of the selection circuit 22B-1 are connected to output sides of the DCT and zigzag scan circuit 18B-1 and the dummy DCT circuit 20B-1 respectively. An input side of the buffer memory 26B-1 is connected to an output side of the selection circuit 22B-1. An input side of the data amount estimation circuit 24B-1 is connected to the output side of the selection circuit 22B-1. The buffer memory 26B-1 is successively followed by the adaptive quantizer 28B-1, the VLC circuit 30B-1, the switch 33B-1, the second rearranging circuit 32B-1, and the error correction code adding circuit 34B-1. An output side of the error correction code adding circuit 34B-1 is connected to an input side of the formatter and record modulation circuit 16B in FIG. 63. The adaptive quantizer 28B-1 is connected to an output side of the data amount estimation circuit 24B-1. The VLC circuit 30B-1 is connected to the buffer memory 26B-1. An input side of the compression circuit 63-1 is connected to the output side of the DCT and zigzag scan circuit 18B-1. An output side of the compression circuit 63-1 is connected to the buffer memory 61-1.

As shown in FIG. 64, the second data compressor 14D-2 includes a DCT and zigzag scan circuit 18B-2, a dummy DCT circuit 20B-2, a selection circuit 22B-2, a data amount estimation circuit 24B-2, a buffer memory 26B-2, an adaptive quantizer 28B-2, a VLC circuit 30B-2, a second rearranging circuit 32B-2, a switch 33B-2, an error correction code adding circuit 34B-2, a buffer memory 612, and a compression circuit 63-2.

An input side of the DCT and zigzag scan circuit 18B-2 is connected to an output side of the first rearranging circuit 12B in FIG. 63. Input sides of the selection circuit 22B-2 are connected to output sides of the DCT and zigzag scan circuit 18B-2 and the dummy DCT circuit 20B-2 respectively. An input side of the buffer memory 26B-2 is connected to an output side of the selection circuit 22B-2. An input side of the data amount estimation circuit 24B-2 is connected to the output side of the selection circuit 22B-2. The buffer memory 26B-2 is successively followed by the adaptive quantizer 28B-2, the VLC circuit 30B-2, the switch 33B-2, the second rearranging circuit 32B-2, and the error correction code adding circuit 34B-2. An output side of the error correction code adding circuit 34B-2 is connected to an input side of the formatter and record modulation circuit 16B in FIG. 63. The adaptive quantizer 28B-2 is connected to an output side of the data amount estimation circuit 24B-2. The VLC circuit 30B-2 is connected to the buffer memory 26B-2. An input side of the compression circuit 63-2 is connected to the output side of the DCT and zigzag scan circuit 18B-2. An output side of the compression circuit 63-2 is connected to the buffer memory 61-2. The buffer memory 61-2 is connected to the switch 33B-1 in the first data compressor 14D-1. On the other hand, the buffer memory 61-1 in the first data compressor 14D-1 is connected to the switch 33B-2 in the second data compressor 14D-2.

For every macro-block (every data unit), four 9-bit data pieces outputted from the DCT and zigzag scan circuit 18B-1 which represent DC coefficients in two Y-signal DCT blocks, one Cr-signal DCT block, and one Cb-signal DCT block are compressed by the compression circuit 63-1 into four 6-bit data pieces which are stored into the buffer memory 61-1 as first helper information. The first helper information is outputted from the buffer memory 61-1 to the switch 33B-2.

For every macro-block (every data unit), four 9-bit data pieces outputted from the DCT and zigzag scan circuit 18B-2 which represent DC coefficients in two Y-signal DCT blocks, one Cr-signal DCT block, and one Cb-signal DCT block are compressed by the compression circuit 63-2 into four 6-bit data pieces which are stored into the buffer memory 61-2 as second helper information. The second helper information is outputted from the buffer memory 61-2 to the switch 33B-1.

The switch 33B-1 adds the second helper information to a sequence of video-segment data pieces, outputted from the VLC circuit 30B-1, at places corresponding to the DC regions DC-1 and DC-3 for dummy DCT blocks. The switch 33B-2 adds the first helper information to a sequence of video-segment data pieces, outputted from the VLC circuit 30B-2, at places corresponding to the DC regions DC-1 and DC-3 for dummy DCT blocks.

Figure 65:
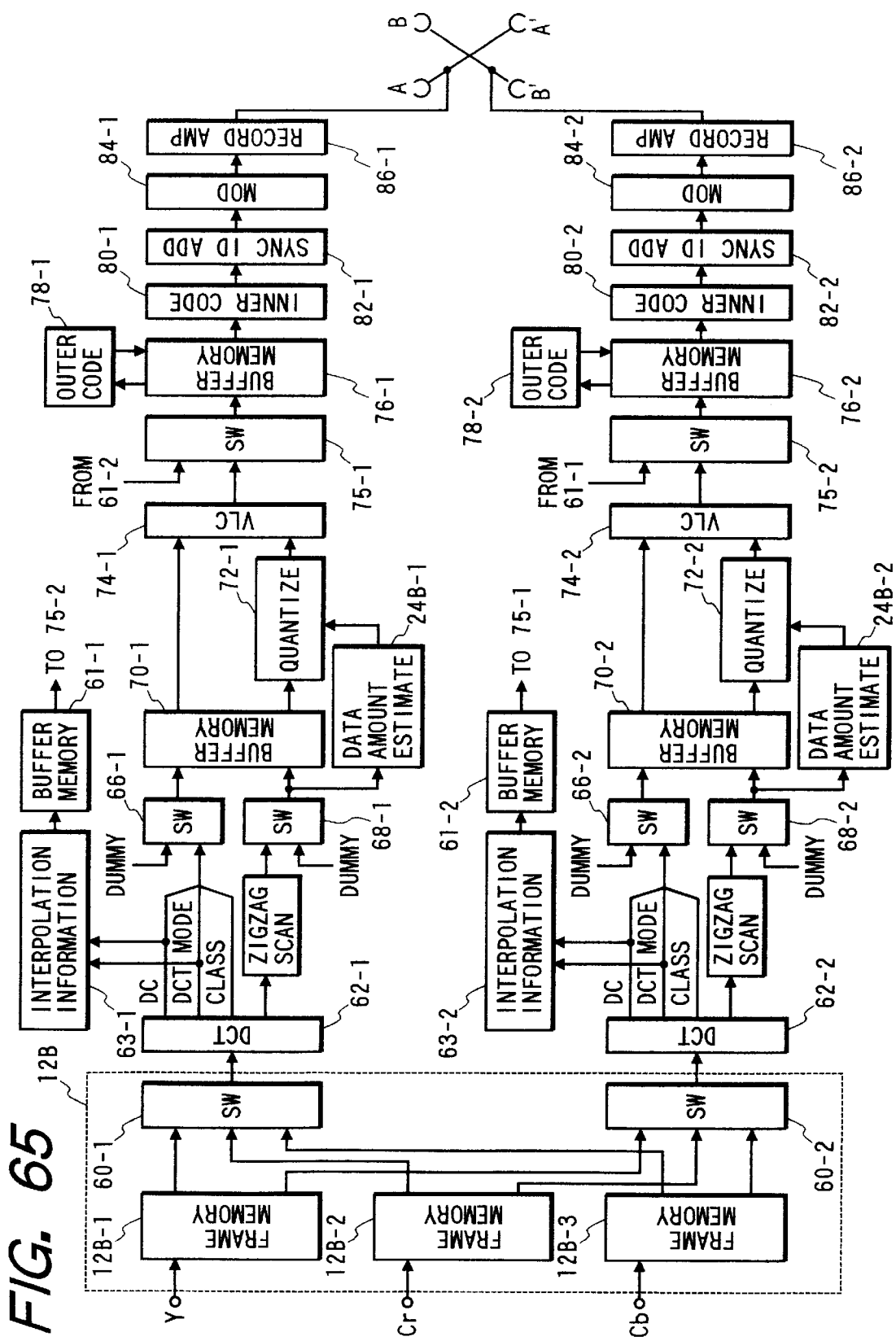
FIG. 65 is a detailed block diagram of the recording side of the digital VTR in FIG. 63.

FIG. 65 shows the details of the recording side of the digital VTR in FIG. 63. As shown in FIG. 65, the buffer memory 61-1 is connected to switches 75-1 and 75-2. The switch 75-1 is connected between a VLC circuit 74-1 and a buffer memory 76-1. The switch 75-1 corresponds to the switch 33B-1 in FIG. 64. The switch 75-2 is connected between a VLC circuit 74-2 and a buffer memory 76-2. The switch 75-2 corresponds to the switch 33B-2 in FIG. 64. An interpolation-information generating circuit 63-1 is connected between a DCT circuit 62-1 and the buffer memory 61-1. The interpolation-information generating circuit 63-1 corresponds to the compression circuit 63-1 in FIG. 64. An interpolation-information generating circuit 63-2 is connected between a DCT circuit 62-2 and the buffer memory 61-2. The interpolation-information generating circuit 63-2 corresponds to the compression circuit 63-2 in FIG. 64.

FIG. 66 shows a reproducing side of the digital VTR according to the fourth embodiment of this invention. As shown in FIG. 66, the recording side of the digital VTR includes a demodulation and deformatter circuit 42B, a data expanding portion 44D, and a fourth rearranging circuit 46B. The demodulation and deformatter circuit 42B is successively followed by the data expanding portion 44D and the fourth rearranging circuit 46B.

The data expanding portion 44D includes a first data expander 44D-1 and a second data expander 44D-2. The first expander 44D-1 processes information pieces in the group "a" while the second expander 44D-2 processes information pieces in the group "b". The first and second data expanders 44D-1 and 44D-2 have similar structures.

Figure 67:
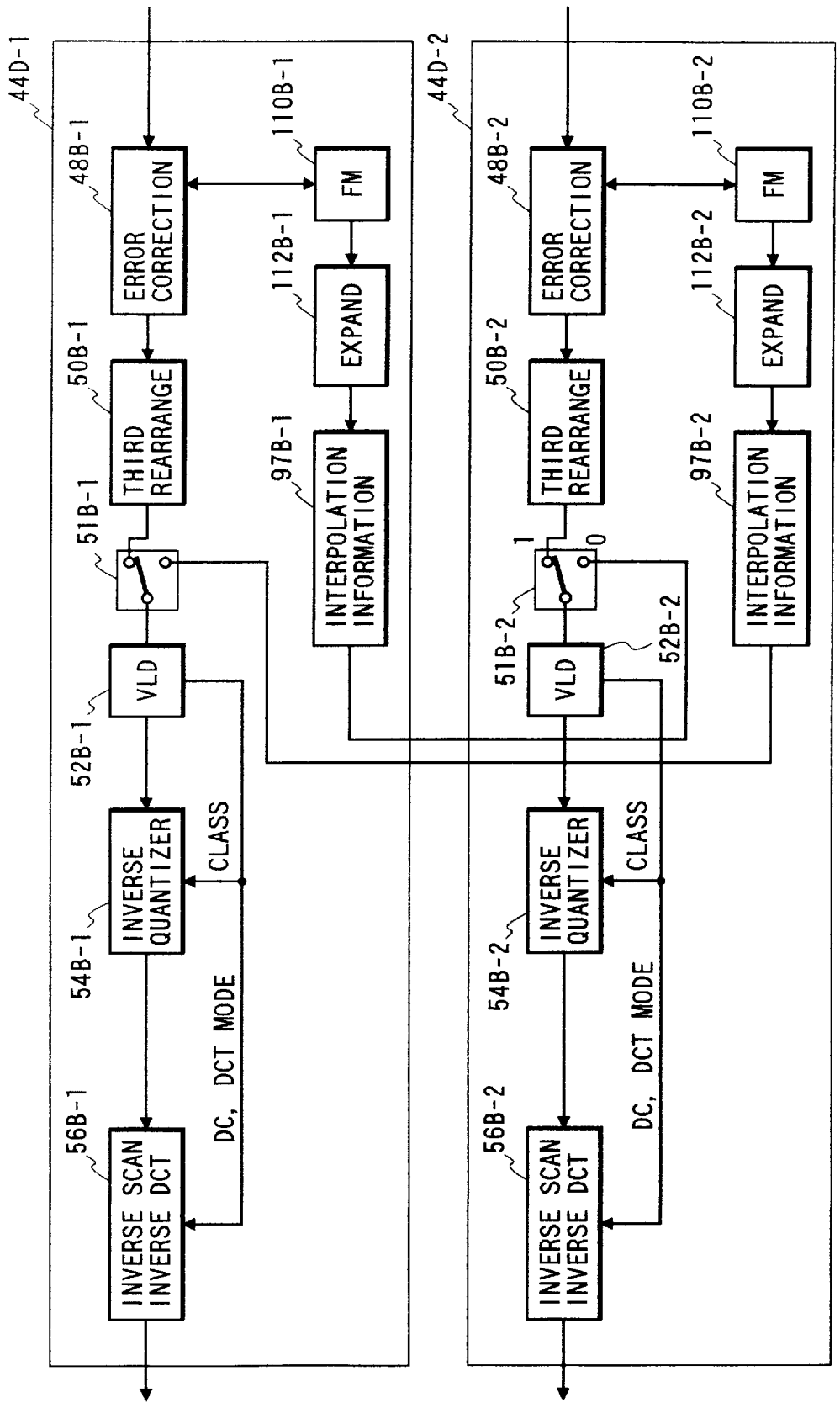
FIG. 67 is a block diagram of data expanders in FIG. 66.

As shown in FIG. 67, the first data expander 44D-1 includes an error correction and interpolation circuit 48B-1, a third rearranging circuit 50B-1, a switch 51B-1, a VLD (variable length decoding) circuit 52B-1, an inverse quantizer 54B-1, an inverse zigzag scan and inverse DCT circuit 56B-1, an interpolation-information generating circuit 97B-1, a frame memory 110B-1, and an expansion circuit 112B-1. An input side of the error correction and interpolation circuit 48B-1 is connected to an output side of the demodulation and deformatter circuit 42B of FIG. 66. The error correction and interpolation circuit 48B-1 is successively followed by the third rearranging circuit 50B-1, the switch 51B-1, the VLD circuit 52B-1, the inverse quantizer 54B-1, and the inverse zigzag scan and inverse DCT circuit 56B-1. An output side of the inverse zigzag scan and inverse DCT circuit 56B-1 is connected to an input side of the fourth rearranging circuit 46B of FIG. 66. The VLD circuit 52B-1 is also directly connected to the inverse zigzag scan and inverse DCT circuit 56B-1. The frame memory 110B-1 is connected to the error correction and interpolation circuit 48B-1. The expansion circuit 112B-1 is connected to the frame memory 110B-1. The interpolation-information generating circuit 97B-1 is connected to the expansion circuit 112B-1.

As shown in FIG. 67, the second data expander 44D-2 includes an error correction and interpolation circuit 48B-2, a third rearranging circuit 50B-2, a switch 51B-2, a VLD (variable length decoding) circuit 52B-2, an inverse quantizer 54B-2, an inverse zigzag scan and inverse DCT circuit 56B-2, an interpolation-information generating circuit 97B-2, a frame memory 110B-2, and an expansion circuit 112B-2. An input side of the error correction and interpolation circuit 48B-2 is connected to an output side of the demodulation and deformatter circuit 42B of FIG. 66. The error correction and interpolation circuit 48B-2 is successively followed by the third rearranging circuit 50B-2, the switch 51B-2, the VLD circuit 52B-2, the inverse quantizer 54B-2, and the inverse zigzag scan and inverse DCT circuit 56B-2. An output side of the inverse zigzag scan and inverse DCT circuit 56B-2 is connected to an input side of the fourth rearranging circuit 46B of FIG. 66. The VLD circuit 52B-2 is also directly connected to the inverse zigzag scan and inverse DCT circuit 56B-2. The frame memory 110B-2 is connected to the error correction and interpolation circuit 48B-2. The expansion circuit 112B-2 is connected to the frame memory 110B-2. The interpolation-information generating circuit 97B-2 is connected to the expansion circuit 112B-2.

The interpolation-information generating circuit 97B-1 in the first data expander 44D-1 is connected to the switch 51B-2 in the second data expander 44D-2. The switch 51B-2 selects one of an output signal of the third rearranging circuit 50B-2 and an output signal of the interpolation-information generating circuit 97B-1. The switch 51B-2 transmits the selected signal to the VLD circuit 52B-2. The interpolation-information generating circuit 97B-2 in the second data expander 44D-2 is connected to the switch 51B-1 in the first data expander 44D-1. The switch 51B-1 selects one of an output signal of the third rearranging circuit 50B-1 and an output signal of the interpolation-information generating circuit 97B-2. The switch 51B-1 transmits the selected signal to the VLD circuit 52B-1.

During normal playback, the switch 51B-1 continues to select the output signal of the third rearranging circuit 50B-1 so that the output signal of the interpolation-information generating circuit 97B-2 remains unused. In addition, the switch 51B-2 continues to select the output signal of the third rearranging circuit 50B-2 so that the output signal of the interpolation-information generating circuit 97B-1 remains unused.

During search, one of a first interpolation technique and a second interpolation technique can be selected. According to the first interpolation technique, interpolation on un-traced recorded information pieces related to a current frame is implemented on the basis of corresponding traced information pieces related to the immediately preceding frame. In this case, the switches 51B-1 and 51B-2 continue to select the output signals of the third rearranging circuits 50B-1 and 50B-2. According to the second interpolation technique, interpolation on un-traced recorded information pieces related to a current frame is implemented on the basis of interpolation information (helper information) contained in traced information pieces related to the current frame. In this case, the switches 51B-1 and 51B-2 are periodically changed to alternately select the output signals of the third rearranging circuits 50B-1 and 50B-2 and the output signals of the interpolation-information generating circuits 97B-1 and 97B-2.

It is preferable to use the first interpolation technique during low-speed search. On the other hand, it is preferable to use the second interpolation technique during high-speed search.

The second interpolation technique will be further explained hereinafter. The frame memory 110B-1 used by the error correction and interpolation circuit 48B-1 is loaded with reproduced "a"-group information containing interpolation information. For every data unit, the expansion circuit 112B-1 reads out the interpolation information, and expands the interpolation information to recover "b"-group DCT-coefficient data pieces. For every data unit, the expansion circuit 112B-1 outputs the recovered "b"-group DCT-coefficient data pieces to the interpolation-information generating circuit 97B-1. The interpolation-information generating circuit 97B-1 generates interpolation-resultant data pieces, corresponding to one data unit, in response to the recovered "b"-group DCT-coefficient data pieces. The interpolation-information generating circuit 97B-1 outputs the interpolation-resultant data pieces to the switch 51B-2. During every given period for which the output signal of the third rearranging circuit 50B-2 corresponds to a data unit which should be subjected to interpolation, the switch 51B-2 selects the output signal of the interpolation-information generating circuit 97B-1 to replace the present data unit by an interpolation-resultant data unit.

On the other hand, the frame memory 110B-2 used by the error correction and interpolation circuit 48B-2 is loaded with reproduced "b"-group information containing interpolation information. For every data unit, the expansion circuit 112B-2 reads out the interpolation information, and expands the interpolation information to recover "a"-group DCT-coefficient data pieces. For every data unit, the expansion circuit 112B-2 outputs the recovered "a"-group DCT-coefficient data pieces to the interpolation-information generating circuit 97B-2. The interpolation-information generating circuit 97B-2 generates interpolation-resultant data pieces, corresponding to one data unit, in response to the recovered "a"-group DCT-coefficient data pieces. The interpolation-information generating circuit 97B-2 outputs the interpolation-resultant data pieces to the switch 51B-1. During every given period for which the output signal of the third rearranging circuit 50B-1 corresponds to a data unit which should be subjected to interpolation, the switch 51B-1 selects the output signal of the interpolation-information generating circuit 97B-2 to replace the present data unit by an interpolation-resultant data unit.

Figure 68:
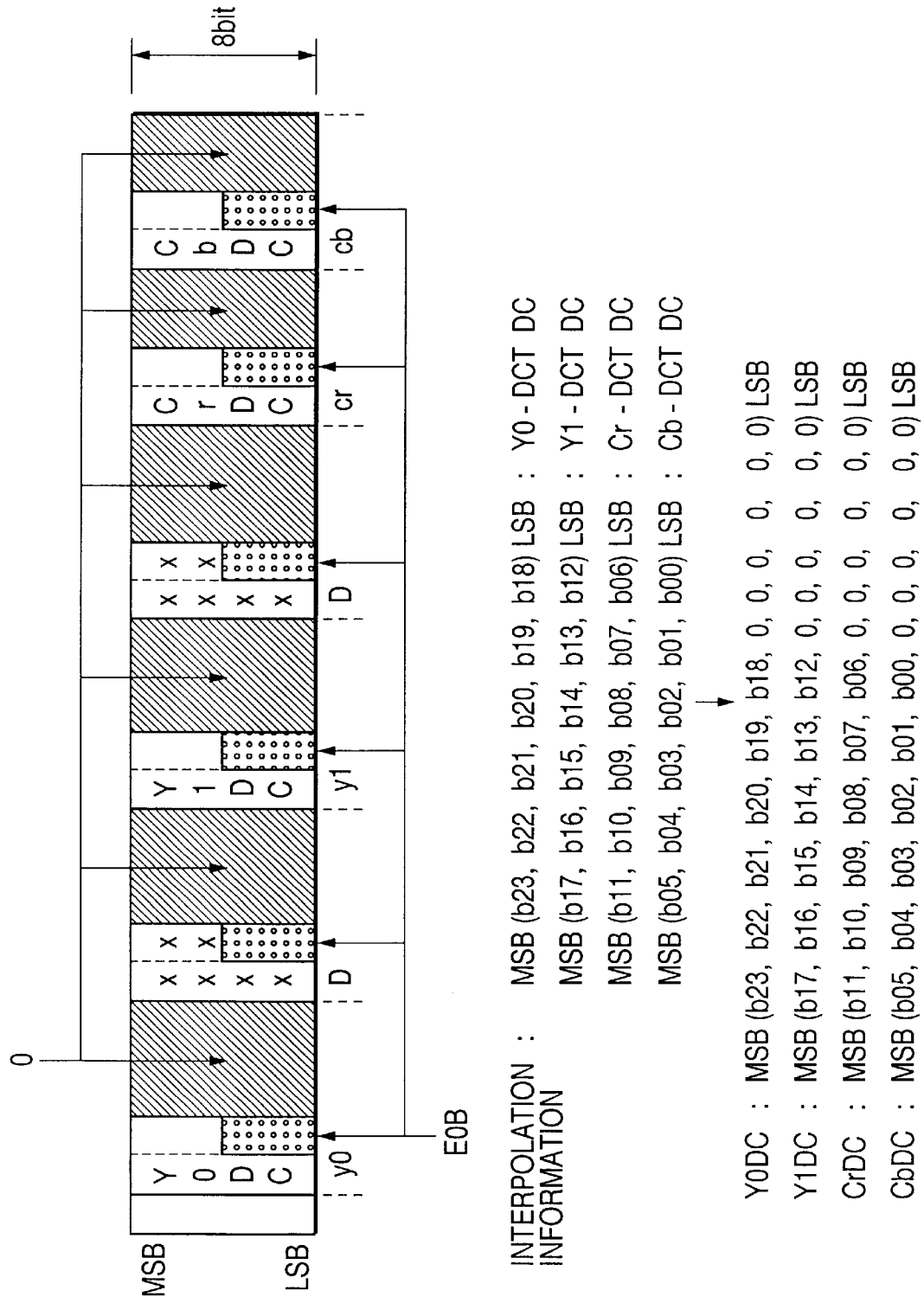
FIG. 68 is a diagram of a data unit generated by an interpolation-information generating circuit in the fourth embodiment of this invention.

The interpolation-information generating circuit 97B-1 adds EOB code words at given data places, and fills unoccupied data places with "0". Similarly, the interpolation-information generating circuit 97B-2 adds EOB code words at given data places, and fills unoccupied data places with "0". FIG. 68 shows the contents of a data unit generated by the interpolation-information generating circuit 97B-1 or 97B-2 in response to interpolation information.

Figure 69:
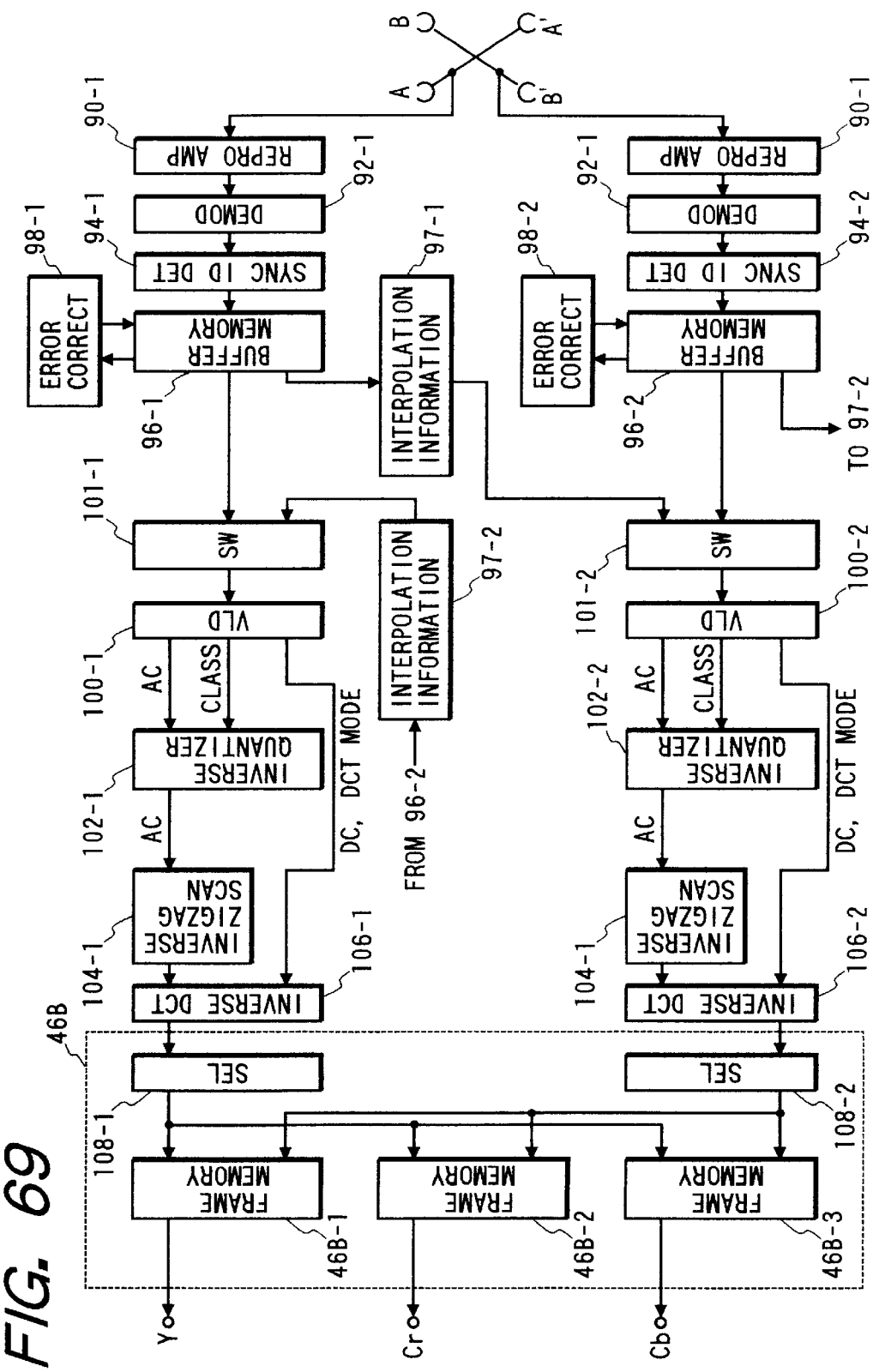
FIG. 69 is a detailed block diagram of the reproducing side of the digital VTR in FIG. 66.

FIG. 69 shows the details of the reproducing side of the digital VTR in FIG. 66. As shown in FIG. 69, a switch circuit 101-1 is connected between a buffer memory 96-1 and a VLD circuit 100-1. A switch circuit 101-2 is connected between a buffer memory 96-2 and a VLD circuit 100-2. An interpolation-information generating circuit 97-1 is connected between the buffer memory 96-1 and the switch circuit 101-2. An interpolation-information generating circuit 97-2 is connected between the buffer memory 96-2 and the switch circuit 101-1.

The buffer memory 96-1 corresponds to the frame memory 110B-1 in FIG. 67. The buffer memory 96-2 corresponds to the frame memory 110B-2 in FIG. 67. The interpolation-information generating circuit 97-1 corresponds to the expansion circuit 112B-1 and the interpolation-information generating circuit 97B-1 in FIG. 67. The interpolation-information generating circuit 97-2 corresponds to the expansion circuit 112B-2 and the interpolation-information generating circuit 97B-2 in FIG. 67. The switch circuit 101-1 corresponds to the switch 51B-1 in FIG. 67. The switch circuit 101-2 corresponds to the switch 51B-2 in FIG. 67.

Figure 70:
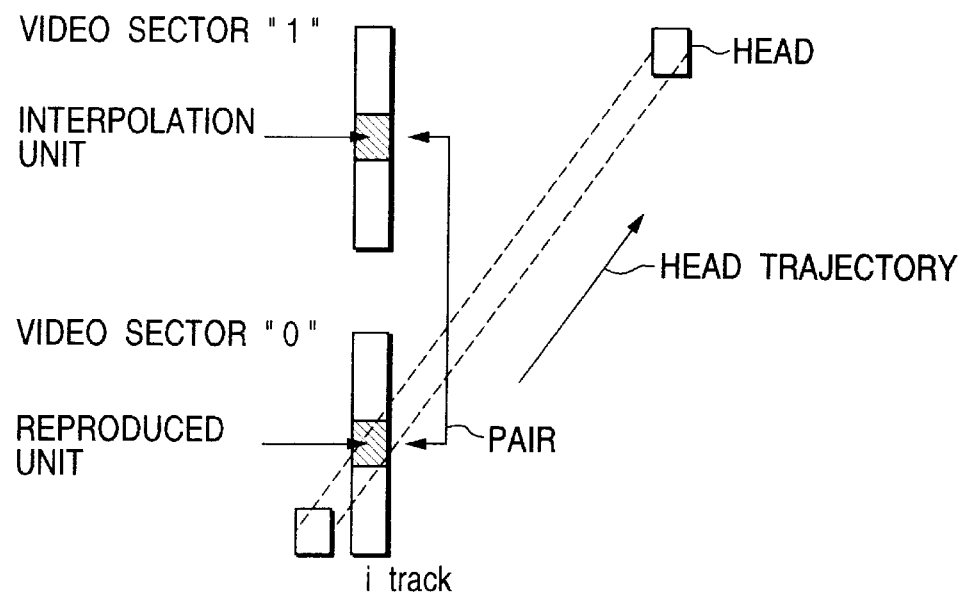
FIG. 70 is a diagram of a recording track, and data units subjected to interpolation in the fourth embodiment of this invention.

FIG. 70 shows the relation between data units forming a pair. Under conditions shown by FIG. 70, six data units are successfully reproduced. It should be noted that FIG. 70 shows only one recording track. Since reproduction is implemented by pair heads, six units in a neighboring track are also reproduced. Accordingly, twelve data units are reproduced, and twelve data units corresponding to the respective former data units can be subjected to interpolation.

Figure 71:
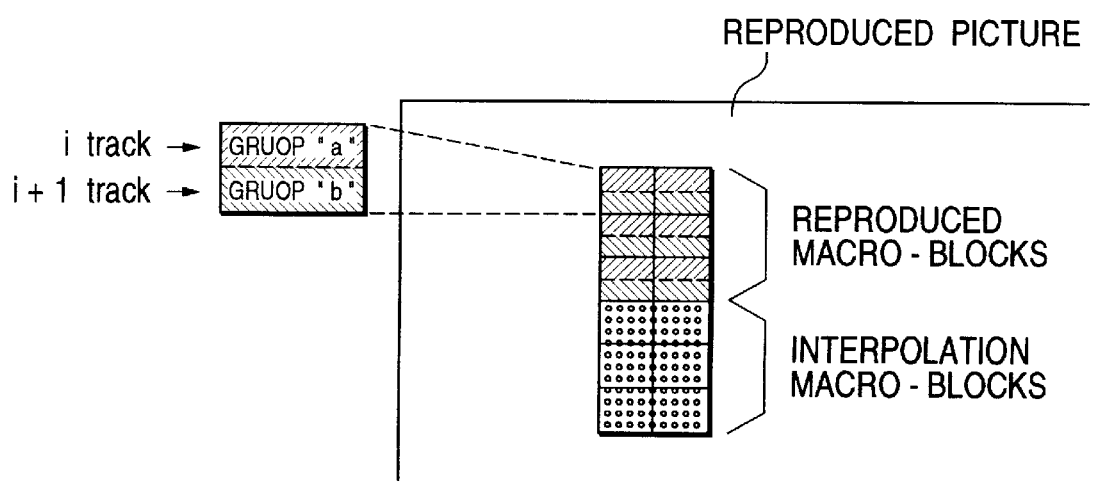
FIG. 71 is a diagram of a reproduced picture, and segments of the picture which correspond to reproduced macro-blocks and interpolation-resultant macro-blocks in the fourth embodiment of this invention.

FIG. 71 shows the relation between actually-reproduced macro-blocks and interpolation-resultant macro-blocks which occurs under the conditions shown by FIG. 70. During search, magnetic heads move across recording tracks in slant directions, and data pieces corresponding to several sync blocks (that is, several data units) are reproduced for each recording track. As previously explained, each pair has a sync block (a data unit) in a video sector "0" and a sync block (a data unit) in a video sector "1" in a same recording track, and the sync block in the video sector "0" contains interpolation information for the sync block in the video sector "1" while the sync block in the video sector "1" contains interpolation information for the sync block in the video sector "0". Accordingly, during search, data pieces in the un-traced video sector can be recovered from interpolation information contained in data pieces in the traced video sector. Data pieces in a video sector "0" and data pieces in a video sector "1" in a same recording track correspond to two neighboring horizontally-extending band-like zones in a frame. Thus, as understood from FIG. 71, it is possible to provide enhanced qualities of reproduced pictures during search.

Fifth Embodiment

A fifth embodiment of this invention is similar to the third embodiment thereof except for design changes explained later.

According to the fifth embodiment of this invention, helper information contains interpolation information which can be used during search. The interpolation information provides enhanced qualities of reproduced pictures during search.

Data units are paired. In each pair, a first data unit contains interpolation information for a second data unit while the second data unit contains interpolation information for the first data unit.

Two data units in each pair are placed in positions on a same recording track which are spaced from each other by a given distance.

In the case where magnetic heads move across recording tracks along slant directions during search, macro-block data in un-traced data units are at least partially recovered from interpolation information in traced data units. Thus, it is possible to provide enhanced qualities of reproduced pictures during search.

For example, regarding every recording track, sync blocks in a video sector "0" and a video sector "1" which have equal position numbers are paired. In this case, there are pairs each having a data unit $Ux_{2m,j,k}$ and a data unit $U2_{m+1,j,k}$ where "x" denotes "a" or "b"; m=0, 1, 2, 3, 4 for a 525/60 system; m=0, 1, 2, 3, 4, 5 for a 625/50 system; j=0, 1, 2, 3, 4; and k=0, 1, 2, ..., 26. Since dat units $Ux_{i,j,k}$ correspond to macro-blocks $Mx_{i,j,k}$ respectively, there are pairs each having a macro-block $Mx_{2m,j,k}$ and a macro-block $M_{2m+1,j,k}$.

Helper information for a macro-block $Mx_{2m+1,j,k}$ is recorded on a helper-information recording area related to a data unit $Ux_{2m,j,k}$. Helper information for a macro-block $Mx_{2m,j,k}$ is recorded on a helper-information recording area related to a data unit $Ux_{2m+1,j,k}$.

Helper information for macro-blocks $Mx_{i,j,k}$ is generated as follows. Picture information contained in every macro-block $Mx_{i,j,k}$ corresponds to two Y-signal DCT blocks (Y0, Y1), one Cr-signal DCT block (Cr), and one Cb-signal DCT block (Cb). A helper-information recording area related to one data unit $Ux_{i,j,k}$ has 24 bits b00, b01, ..., $b_{22}$, and $b_{23}$. The helper information is composed of compressed DC-coefficient data pieces, compressed AC-coefficient data pieces, and DCT-mode data pieces. Two 9-bit data pieces representing DC coefficients in two Y-signal DCT blocks are quantized or compressed into two 4-bit data pieces, respectively. Two 9-bit data pieces representing DC coefficients in a Cr-signal DCT block and a Cb-signal DCT block are quantized or compressed into two 3-bit data pieces, respectively. Two data pieces representing first AC coefficients in two Y-signal DCT blocks are quantized or compressed into two 4-bit data pieces, respectively. It should be noted that the first AC coefficients occupy starting places in zigzag scan orders. In addition, two 1-bit DCT-mode data pieces are prepared.

Specifically, a 4-bit data piece representing a DC coefficient in a first Y-signal DCT block (Y0) is assigned to the helper information bits b20, b21, b22, and b23. A 4-bit data piece representing a first AC coefficient in the first Y-signal DCT block (Y0) is assigned to the helper information bits b16, b17, b18, and b19. A 3-bit data piece representing a DC coefficient in a Cr-signal DCT block is assigned to the helper information bits b13, b14, and b15. A 1-bit data piece representing a DCT mode of the first Y-signal DCT block (Y0) is assigned to the helper information bit b12. A 4-bit data piece representing a DC coefficient in a second Y-signal DCT block (Y1) is assigned to the helper information bits b08, b09, b10, and b11. A 4-bit data piece representing a first AC coefficient in the second Y-signal DCT block (Y1) is assigned to the helper information bits b04, b05, b06, and b07. A 3-bit data piece representing a DC coefficient in a Cb-signal DCT block is assigned to the helper information bits b01, b02, and b03. A 1-bit data piece representing a DCT mode of the second Y-signal DCT block (Y1) is assigned to the helper information bit b00.

FIG. 72 shows a recording side of a digital VTR according to the fifth embodiment of this invention. As shown in FIG. 72, the recording side of the digital VTR includes a first rearranging circuit 12B, a data compressing portion 14E, and a formatter and record modulation circuit 16B. The first rearranging circuit 12B is followed by the data compressing portion 14E. The data compressing portion 14E is followed by the formatter and record modulation circuit 16B.

The data compressing portion 14E includes a first data compressor 14E-1 and a second data compressor 14E-2 arranged in parallel. The first data compressor 14E-1 processes information pieces in a group "a" while the second data compressor 14E-2 processes information pieces in a group "b". The first and second data compressors 14E-1 and 14E-2 have similar structures.

Figure 73:
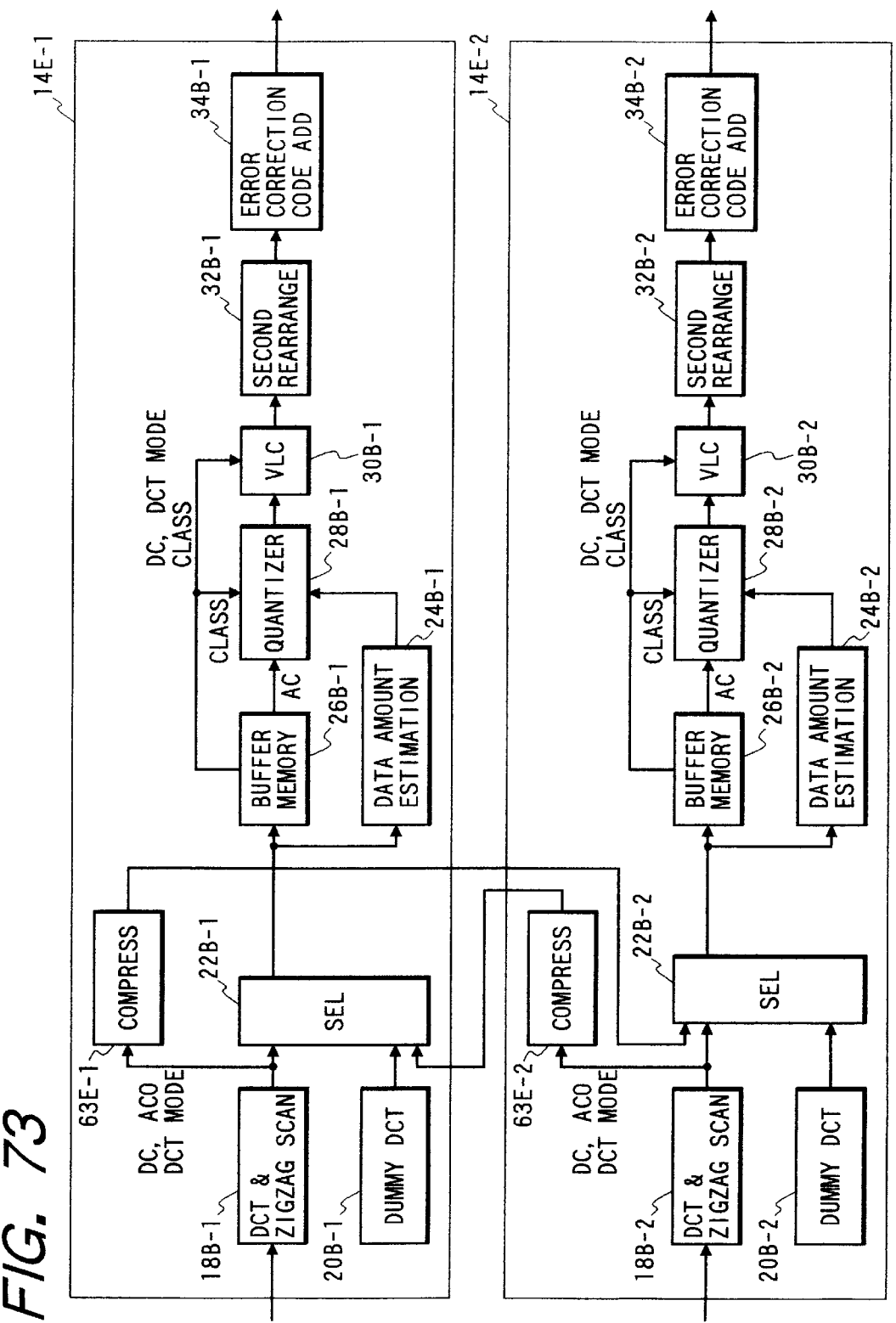
FIG. 73 is a block diagram of data compressors in FIG. 72.

As shown in FIG. 73, the first data compressor 14E-1 includes a DCT and zigzag scan circuit 18B-1, a dummy DCT circuit 20B-1, a selection circuit 22B-1, a data amount estimation circuit 24B-1, a buffer memory 26B-1, an adaptive quantizer 28B-1, a VLC circuit 30B-1, a second rearranging circuit 32B-1, an error correction code adding circuit 34B-1, and a compression circuit 63E-1.

An input side of the DCT and zigzag scan circuit 18B-1 is connected to an output side of the first rearranging circuit 12B in FIG. 72. Input sides of the selection circuit 22B-1 are connected to output sides of the DCT and zigzag scan circuit 18B-1 and the dummy DCT circuit 20B-1 respectively. An input side of the buffer memory 26B-1 is connected to an output side of the selection circuit 22B-1. An input side of the data amount estimation circuit 24B-1 is connected to the output side of the selection circuit 22B-1. The buffer memory 26B-1 is successively followed by the adaptive quantizer 28B-1, the VLC circuit 30B-1, the second rearranging circuit 32B-1, and the error correction code adding circuit 34B-1. An output side of the error correction code adding circuit 34B-1 is connected to an input side of the formatter and record modulation circuit 16B in FIG. 72. The adaptive quantizer 28B-1 is connected to an output side of the data amount estimation circuit 24B-1. The VLC circuit 30B-1 is connected to the buffer memory 26B-1. An input side of the compression circuit 63E-1 is connected to the output side of the DCT and zigzag scan circuit 18B-1.

As shown in FIG. 73, the second data compressor 14E-2 includes a DCT and zigzag scan circuit 18B-2, a dummy DCT circuit 20B-2, a selection circuit 22B-2, a data amount estimation circuit 24B-2, a buffer memory 26B-2, an adaptive quantizer 28B-2, a VLC circuit 30B-2, a second rearranging circuit 32B-2, an error correction code adding circuit 34B-2, and a compression circuit 63E-2.

An input side of the DCT and zigzag scan circuit 18B-2 is connected to an output side of the first rearranging circuit 12B in FIG. 72. Input sides of the selection circuit 22B-2 are connected to output sides of the DCT and zigzag scan circuit 18B-2 and the dummy DCT circuit 20B-2 respectively. An input side of the buffer memory 26B-2 is connected to an output side of the selection circuit 22B-2. An input side of the data amount estimation circuit 24B-2 is connected to the output side of the selection circuit 22B-2. The buffer memory 26B-2 is successively followed by the adaptive quantizer 28B-2, the VLC circuit 30B-2, the second rearranging circuit 32B-2, and the error correction code adding circuit 34B-2. An output side of the error correction code adding circuit 34B-2 is connected to an input side of the formatter and record modulation circuit 16B in FIG. 72. The adaptive quantizer 28B-2 is connected to an output side of the data amount estimation circuit 24B-2. The VLC circuit 30B-2 is connected to the buffer memory 26B-2. An input side of the compression circuit 63E-2 is connected to the output side of the DCT and zigzag scan circuit 18B-2. An output side of the compression circuit 63E-2 is connected to the selection circuit 22B-1 in the first data compressor 14E-1. On the other hand, an output side of the compression circuit 63E-1 in the first data compressor 14E-1 is connected to the selection circuit 22B-2 in the second data compressor 14E-2.

For every macro-block (every data unit), two 9-bit data pieces outputted from the DCT and zigzag scan circuit 18B-1 which represent DC coefficients in two Y-signal DCT blocks are compressed by the compression circuit 63E-1 into two 4-bit data pieces, respectively. In addition, two data pieces outputted from the DCT and zigzag scan circuit 18B-1 which represent first AC coefficients in the two Y-signal DCT blocks are compressed by the compression circuit 63E-1 into two 4-bit data pieces, respectively. Furthermore, two 9-bit data pieces outputted from the DCT and zigzag scan circuit 18B-1 which represent DC coefficients in a Cr-signal DCT block and a Cb-signal DCT block are compressed by the compression circuit 63E-1 into two 3-bit data pieces, respectively. Two 1-bit DCT-mode data pieces are generated in connection with the two Y-signal DCT blocks. The compression-resultant data pieces and the DCT-mode data pieces are outputted from the compression circuit 63E-1 to the selection circuit 22B-2 as first helper information.

For every macro-block (every data unit), two 9-bit data pieces outputted from the DCT and zigzag scan circuit 18B-2 which represent DC coefficients in two Y-signal DCT blocks are compressed by the compression circuit 63E-2 into two 4-bit data pieces, respectively. In addition, two data pieces outputted from the DCT and zigzag scan circuit 18B-2 which represent first AC coefficients in the two Y-signal DCT blocks are compressed by the compression circuit 63E-2 into two 4-bit data pieces, respectively.

Furthermore, two 9-bit data pieces outputted from the DCT and zigzag scan circuit 18B-2 which represent DC coefficients in a Cr-signal DCT block and a Cb-signal DCT block are compressed by the compression circuit 63E-2 into two 3-bit data pieces, respectively. Two 1-bit DCT-mode data pieces are generated in connection with the two Y-signal DCT blocks. The compression-resultant data pieces and the DCT-mode data pieces are outputted from the compression circuit 63E-2 to the selection circuit 22B-1 as second helper information.

The selection circuit 22B-1 combines or multiplexes the output signal of the DCT and zigzag scan circuit 18B-1, the output signal of the dummy DCT circuit 20B-1, and the second helper information. The places of the second helper information with respect to the resultant output signal of the selection circuit 22B-1 correspond to the DC regions DC-1 and DC-3 for dummy DCT blocks. On the other hand, the selection circuit 22B-2 combines or multiplexes the output signal of the DCT and zigzag scan circuit 18B, the output signal of the dummy DCT circuit 20B-2, and the first helper information. The places of the first helper information with respect to the resultant output signal of the selection circuit 22B-2 correspond to the DC regions DC-1 and DC-3 for dummy DCT blocks.

FIG. 74 shows the details of the recording side of the digital VTR in FIG. 72. As shown in FIG. 74, an interpolation-information generating circuit 65-1 is connected between a DCT circuit 62-1 and a buffer memory 61-1. The buffer memory 61-1 is connected to a switch circuit 66-2. The DCT circuit 62-1 corresponds to a part of the DCT and zigzag scan circuit 18B-1 in FIG. 73. The interpolation-information generating circuit 65-1 and the buffer memory 61-1 correspond to the compression circuit 63E-1 in FIG. 73. The switch circuit 66-2 corresponds to the selection circuit 22B-2 in FIG. 73.

As shown in FIG. 74, an interpolation-information generating circuit 65-2 is connected between a DCT circuit 62-2 and a buffer memory 61-2. The buffer memory 61-2 is connected to a switch circuit 66-1. The DCT circuit 62-2 corresponds to a part of the DCT and zigzag scan circuit 18B-2 in FIG. 73. The interpolation-information generating circuit 65-2 and the buffer memory 61-2 correspond to the compression circuit 63E-2 in FIG. 73. The switch circuit 66-1 corresponds to the selection circuit 22B-1 in FIG. 73.

FIG. 75 shows a reproducing side of the digital VTR according to the fifth embodiment of this invention. As shown in FIG. 75, the recording side of the digital VTR includes a demodulation and deformatter circuit 42B, a data expanding portion 44E, and a fourth rearranging circuit 46B. The demodulation and deformatter circuit 42B is successively followed by the data expanding portion 44E and the fourth rearranging circuit 46B.

The data expanding portion 44E includes a first data expander 44E-1 and a second data expander 44E-2. The first expander 44E-1 processes information pieces in the group "a" while the second expander 44E-2 processes information pieces in the group "b". The first and second data expanders 44E-1 and 44E-2 have similar structures.

Figure 76:
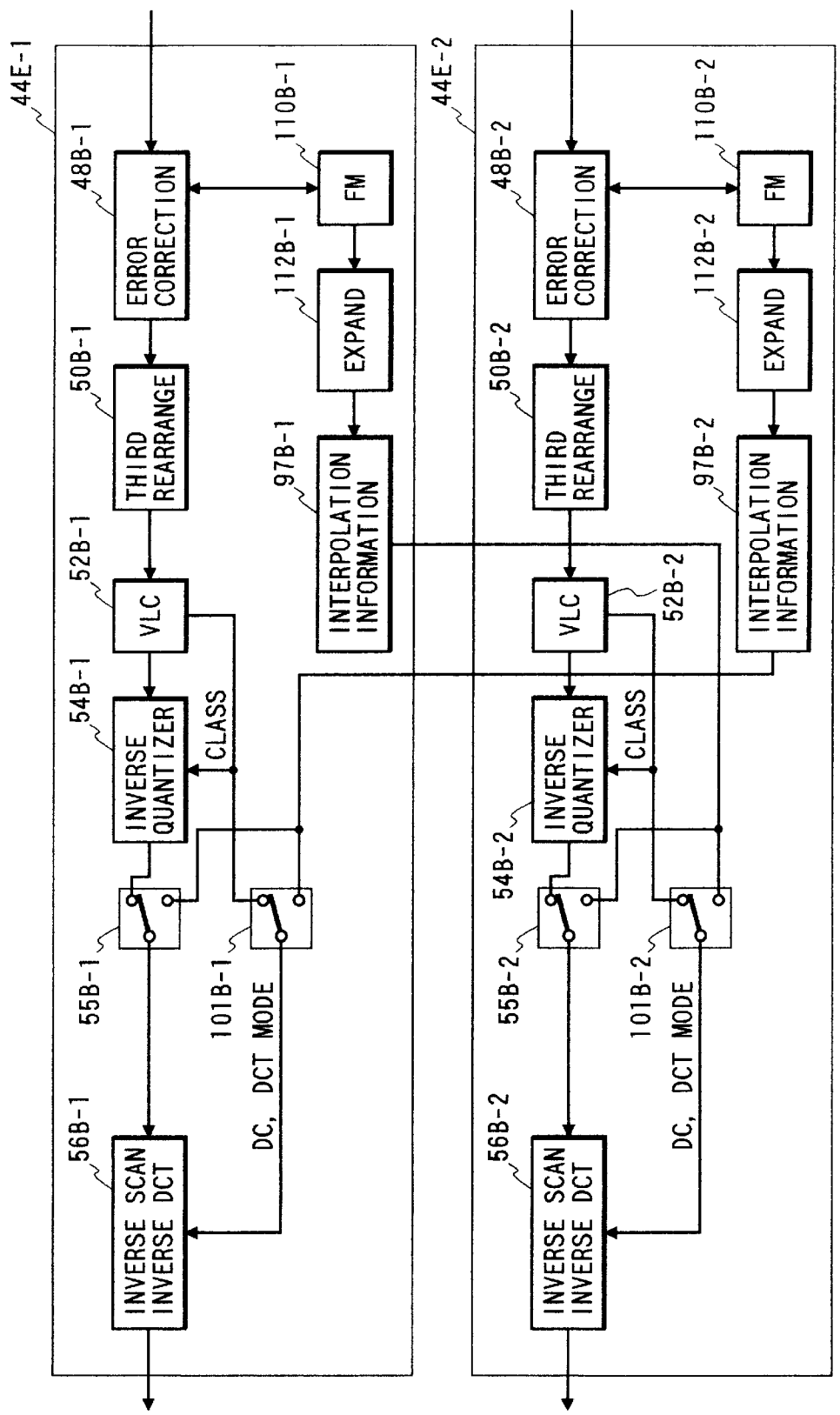
FIG. 76 is a block diagram of data expanders in FIG. 75.

As shown in FIG. 76, the first data expander 44E-1 includes an error correction and interpolation circuit 48B-1, a third rearranging circuit 50B-1, a VLD (variable length decoding) circuit 52B-1, an inverse quantizer 54B-1, a switch 55B-1, an inverse zigzag scan and inverse DCT circuit 56B-1, an interpolation-information generating circuit 97B-1, a switch 101B-1, a frame memory 110B-1, and an expansion circuit 112B-1. An input side of the error correction and interpolation circuit 48B-1 is connected to an output side of the demodulation and deformatter circuit 42B of FIG. 75. The error correction and interpolation circuit 48B-1 is successively followed by the third rearranging circuit 50B-1, the VLD circuit 52B-1, the inverse quantizer 54B-1, the switch 55B-1, and the inverse zigzag scan and inverse DCT circuit 56B-1. An output side of the inverse zigzag scan and inverse DCT circuit 56B-1 is connected to an input side of the fourth rearranging circuit 46B of FIG. 75. The VLD circuit 52B-1 is connected to the switch 101B-1. The switch 101B-1 is connected to the inverse zigzag scan and inverse DCT circuit 56B-1. The frame memory 110B-1 is connected to the error correction and interpolation circuit 48B-1. The expansion circuit 112B-1 is connected to the frame memory 110B-1. The interpolation-information generating circuit 97B-1 is connected to the expansion circuit 112B-1.

As shown in FIG. 76, the second data expander 44E-2 includes an error correction and interpolation circuit 48B-2, a third rearranging circuit 50B-2, a VLD (variable length decoding) circuit 52B-2, an inverse quantizer 54B-2, a switch 55B-1, an inverse zigzag scan and inverse DCT circuit 56B-2, an interpolation-information generating circuit 97B-2, a switch 101B-1, a frame memory 110B-2, and an expansion circuit 112B-2. An input side of the error correction and interpolation circuit 48B-2 is connected to an output side of the demodulation and deformatter circuit 42B of FIG. 75. The error correction and interpolation circuit 48B-2 is successively followed by the third rearranging circuit 50B-2, the VLD circuit 52B-2, the inverse quantizer 54B-2, the switch 55B-1, and the inverse zigzag scan and inverse DCT circuit 56B-2. An output side of the inverse zigzag scan and inverse DCT circuit 56B-2 is connected to an input side of the fourth rearranging circuit 46B of FIG. 75. The VLD circuit 52B-2 is connected to the switch 10B-2. The switch 101B-2 is connected to the inverse zigzag scan and inverse DCT circuit 56B-2. The frame memory 110B-2 is connected to the error correction and interpolation circuit 48B-2. The expansion circuit 112B-2 is connected to the frame memory 110B-2. The interpolation-information generating circuit 97B-2 is connected to the expansion circuit 112B-2.

The interpolation-information generating circuit 97B-1 in the first data expander 44E-1 is connected to the switches 55B-2 and 101B-2 in the second data expander 44E-2. The switch 55B-2 selects one of an output signal of the inverse quantizer 54B-2 and an output signal of the interpolation-information generating circuit 97B-1. The switch 55B-2 transmits the selected signal to the inverse zigzag scan and inverse DCT circuit 56B-2. The switch 101B-2 selects one of a output signal of the VLD circuit 52B-2 and the output signal of the interpolation-information generating circuit 97B-1. The switch 101B-2 transmits the selected signal to the inverse zigzag scan and inverse DCT circuit 56B-2.

The interpolation-information generating circuit 97B-2 in the second data expander 44E-2 is connected to the switches 55B-1 and 101B-1 in the first data expander 44E-1. The switch 55B-1 selects one of an output signal of the inverse quantizer 54B-1 and an output signal of the interpolation-information generating circuit 97B-2. The switch 55B-1 transmits the selected signal to the inverse zigzag scan and inverse DCT circuit 56B-1. The switch 101B-1 selects one of a output signal of the VLD circuit 52B-1 and the output signal of the interpolation-information generating circuit 97B-2. The switch 101B-1 transmits the selected signal to the inverse zigzag scan and inverse DCT circuit 56B-1.

During normal playback, the switch 55B-1 continues to select the output signal of the inverse quantizer 54B-1 while the switch 101B-1 continues to select the output signal of the VLD circuit 52B1. Accordingly, the output signal of the interpolation-information generating circuit 97B-2 remains unused. During normal playback, the switch 55B-2 continues to select the output signal of the inverse quantizer 54B-2 while the switch 101B-2 continues to select the output signal of the VLD circuit 52B-2. Accordingly, the output signal of the interpolation-information generating circuit 97B-1 remains unused.

During search, one of a first interpolation technique and a second interpolation technique can be selected. According to the first interpolation technique, interpolation on un-traced recorded information pieces related to a current frame is implemented on the basis of corresponding traced information pieces related to the immediately preceding frame. In this case, the switches 55B-1 and 55B-2 continue to select the output signals of the inverse quantizers 54B-1 and 54B-2. In addition, the switches 101B-1 and 101B-2 continue to select the output signals of the VLD circuits 52B-1 and 52B-2.

According to the second interpolation technique, interpolation on un-traced recorded information pieces related to a current frame is implemented on the basis of interpolation information (helper information) contained in traced information pieces related to the current frame. In this case, the switches 5BB-1 and 55B-2 are periodically changed to alternately select the output signals of the inverse quantizers 54B-1 and 54B-2 and the output signals of the interpolation-information generating circuits 97B-1 and 97B-2. In addition, the switches 101B-1 and 101B-2 are periodically changed to alternately select the output signals of the VLD circuits 52B-1 and 52B-2 and the output signals of the interpolation-information generating circuits 97B-1 and 97B-2.

It is preferable to use the first interpolation technique during low-speed search. On the other hand, it is preferable to use the second interpolation technique during high-speed search.

The second interpolation technique will be further explained hereinafter. The frame memory 110B-1 used by the error correction and interpolation circuit 48B-1 is loaded with reproduced "a"-group information containing interpolation information. For every data unit, the expansion circuit 112B-1 reads out the interpolation information, and expands the interpolation information to recover "b"-group DCT-coefficient data pieces. For every data unit, the expansion circuit 112B-1 outputs the recovered "b"-group DCT-coefficient data pieces to the interpolation-information generating circuit 97B-1. The interpolation-information generating circuit 97B-1 generates interpolation-resultant data pieces, corresponding to one data unit, in response to the recovered "b"-group DCT-coefficient data pieces. The interpolation-information generating circuit 97B-1 outputs the interpolation-resultant data pieces to the switches 55B-2 and 101B2. During every period for which the output signals of the VLD circuit 52B-2 and the inverse quantizer 54B-2 correspond to a data unit which should be subjected to interpolation, the switches 55B-2 and 101B-2 select the output signal of the interpolation-information generating circuit 97B-1 to replace the present data unit by an interpolation-resultant data unit. In this case, interpolation20 resultant AC-coefficient data pieces are transmitted via the switch 55B-2 to the inverse-zigzag scan and inverse DCT circuit 56B-2. Interpolation-resultant DC-coefficient data pieces are transmitted via the switch 11B-2 to the inverse-zigzag scan and inverse DCT circuit 56B-2.

On the other hand, the frame memory 110B-2 used by the error correction and interpolation circuit 48B-2 is loaded with reproduced "b"-group information containing interpolation information. For every data unit, the expansion circuit 112B-2 reads out the interpolation information, and expands the interpolation information to recover "a"-group DCT-coefficient data pieces. For every data unit, the expansion circuit 112B-2 outputs the recovered "a"-group DCT-coefficient data pieces to the interpolation-information generating circuit 97B-2. The interpolation-information generating circuit 97B-2 generates interpolation-resultant data pieces, corresponding to one data unit, in response to the recovered "a"-group DCT-coefficient data pieces. The interpolation-information generating circuit 97B-2 outputs the interpolation-resultant data pieces to the switches 55B-1 and 101B-1. During every given period for which the output signals of the VLD circuit 52B-1 and the inverse quantizer 54B-1 correspond to a data unit which should be subjected to interpolation, the switches 55B-1 and 101B-1 select the output signal of the interpolation-information generating circuit 97B-2 to replace the present data unit by an interpolation-resultant data unit. In this case, interpolation-resultant AC-coefficient data pieces are transmitted via the switch 55B-1 to the inverse-zigzag scan and inverse DCT circuit 56B-1. Interpolation-resultant DC-coefficient data pieces are transmitted via the switch 101B-1 to the inverse-zigzag scan and inverse DCT circuit 56B-1.

In the case where data pieces representing first AC coefficients of Y-signal DCT blocks are not changed into a variable-length-code words, the position of a data unit to be subjected to interpolation is variable. The switches 55B-1 and 101B-1, and the switches 55B-2 and 101B-2 are changed at such timings as to compensate for such a positional variation.

Figure 77:
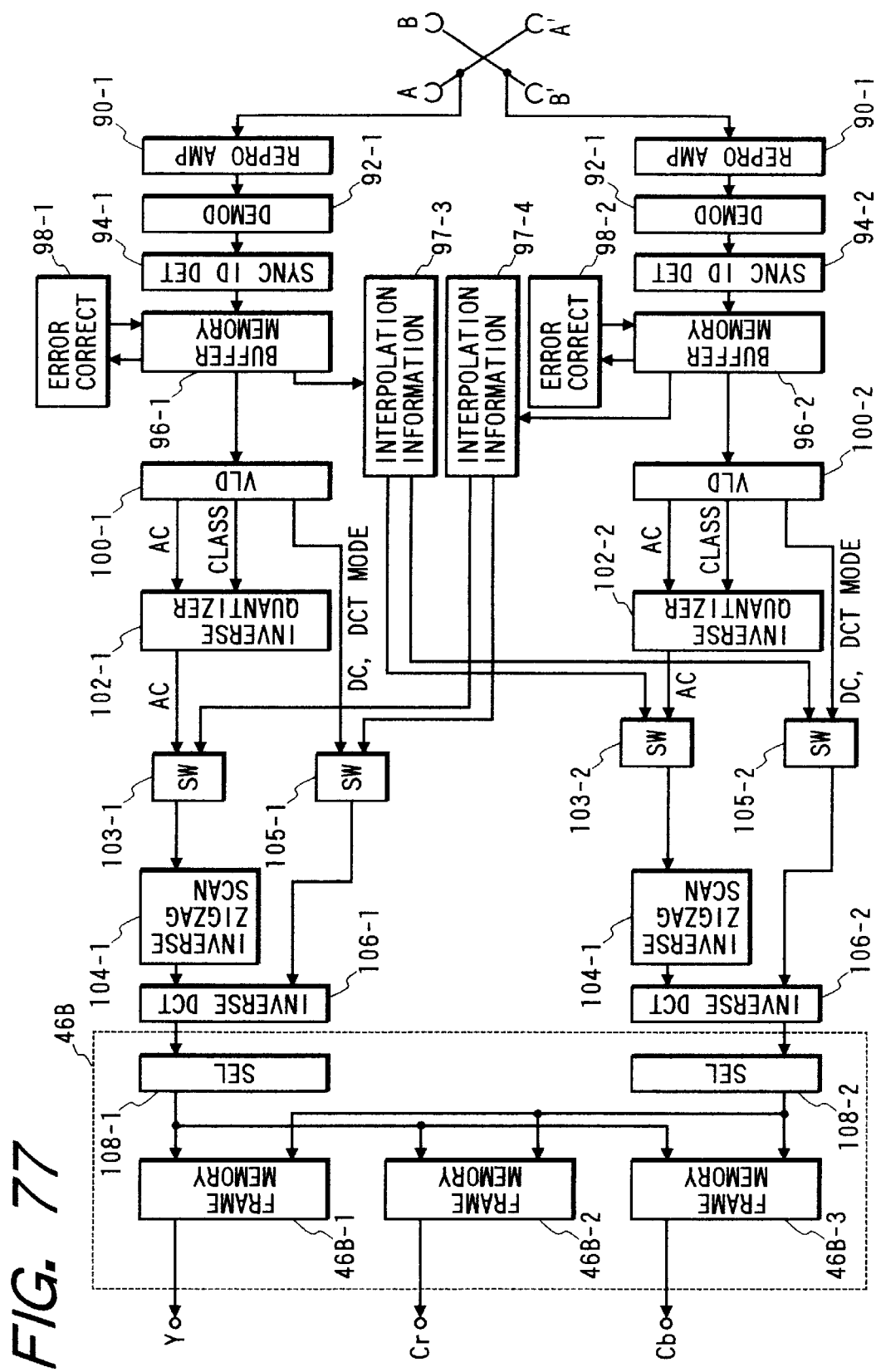
FIG. 77 is a detailed block diagram of the reproducing side of the digital VTR in FIG. 75.

FIG. 77 shows the details of the reproducing side of the digital VTR in FIG. 75. As shown in FIG. 77, a switch 103-1 is connected between an inverse quantizer 102-1 and an inverse zigzag scan circuit 104-1. A switch 105-1 is connected between a VLD circuit 100-1 and an inverse DCT circuit 106-1. An interpolation-information generating circuit 97-4 is connected to the switches 103-1, 105-1, and a buffer memory 96-2. A switch 103-2 is connected between an inverse quantizer 102-2 and an inverse zigzag scan circuit 104-2. A switch 105-2 is connected between a VLD circuit 100-2 and an inverse DCT circuit 106-2. An interpolation-information generating circuit 97-3 is connected to the switches 103-2, 105-2, and a buffer memory 96-1.

The buffer memory 96-1 corresponds to the frame memory 110B-1 in FIG. 76. The buffer memory 96-2 corresponds to the frame memory 10B-2 in FIG. 76. The interpolation-information generating circuit 97-3 corresponds to the expansion circuit 112B-1 and the interpolation-information generating circuit 97B-1 in FIG. 76. The interpolation-information generating circuit 97-4 corresponds to the expansion circuit 112B-2 and the interpolation-information generating circuit 97B-2 in FIG. 76. The switch 103-1 corresponds to the switch 55B-1 in FIG. 76. The switch 105-1 corresponds to the switch 101B-1 in FIG. 76. The switch 103-2 corresponds to the switch 55B-2 in FIG. 76. The switch 105-2 corresponds to the switch 101B-2 in FIG. 76.

Sixth Embodiment

A sixth embodiment of this invention is similar to the fifth embodiment thereof except for design changes explained later.

Helper information for macro-blocks $Mx_{i,j,k}$ is generated as follows. Picture information contained in every macro-block $Mx_{i,j,k}$ corresponds to two Y-signal DCT blocks (Y0, Y1), one Cr-signal DCT block (Cr), and one Cb-signal DCT block (Cb). A helper-information recording area related to one data unit $Ux_{i,j,k}$ has 24 bits b00, b01, , b22, and b23. The helper information is composed of compressed DC-coefficient data pieces, compressed AC-coefficient data pieces, and DCT-mode data pieces. Two 9-bit data pieces representing DC coefficients in two Y-signal DCT blocks are quantized or compressed into two 4-bit data pieces, respectively. Two data pieces representing first AC coefficients in two Y-signal DCT blocks are quantized or compressed into two 4-bit data pieces, respectively. It should be noted that the first AC coefficients occupy starting places in zigzag scan orders. In addition, two data pieces representing second AC coefficients in two Y-signal DCT blocks are quantized or compressed into two 3-bit data pieces, respectively. Furthermore, two 1-bit DCT-mode data pieces are prepared.

Specifically, a 4-bit data piece representing a DC coefficient in a first Y-signal DCT block (Y0) is assigned to the helper information bits b20, b21, b22, and b23. A 4-bit data piece representing a first AC coefficient in the first Y-signal DCT block (Y0) is assigned to the helper information bits b16, b17, b18, and b19. A 3-bit data piece representing a second AC coefficient in the first Y-signal DCT block (Y0) is assigned to the helper information bits b13, b14, and b15. A 1-bit data piece representing a DCT mode of the first Y-signal DCT block (Y0) is assigned to the helper information bit b12. A 4-bit data piece representing a DC coefficient in a second Y-signal DCT block (Y1) is assigned to the helper information bits b08, b09, b10, and b11. A 4-bit data piece representing a first AC coefficient in the second Y-signal DCT block (Y1) is assigned to the helper information bits b04, b05, b06, and b07. A 3-bit data piece representing a second AC coefficient in the second Y-signal DCT block (Y1) is assigned to the helper information bits b01, b02, and b03. A 1-bit data piece representing a DCT mode of the second Y-signal DCT block (Y1) is assigned to the helper information bit b00.

What is claimed is:

1. A method of compressing picture information, comprising the steps of:
    dividing input picture information into first and second division-resultant signals, the input picture information relating to a ratio of "4:2:2" among sampling frequencies for a Y signal, a Cr signal, and a Cb signal;
    generating Y-signal DCT blocks, Cr-signal DCT blocks, and Cb-signal DCT blocks from the first division-resultant signal;
    generating Y-signal DCT blocks, Cr-signal DCT blocks, and Cb-signal DCT blocks from the second division-resultant signal;
    generating dummy DCT blocks distinguishable from the Y-signal DCT blocks related to the first and second division-resultant signals;
    grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal;
    grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;
    compressing the first modification-resultant signal into a first compression-resultant signal by DCT and variable length encoding while maintaining a data amount of the first compression-resultant signal per "n" macro-blocks at a fixed amount, where "n" denotes a given natural number; and
    compressing the second modification-resultant signal into a second compression-resultant signal by DCT and variable length encoding while maintaining a data amount of the second compression-resultant signal per "n" macro-blocks at a fixed amount.

2. A method according to claim 1, wherein each of the dummy DCT blocks has AC-coefficient data pieces all being "0".

3. A method according to claim 1, further comprising the steps of:
    providing super-blocks each having 9 macro-blocks in a horizontal direction of a frame by 3 macro-blocks in a vertical direction of the frame;
    providing extended super-blocks each having two super-blocks arranged along the vertical direction of the frame;
    assigning the first division-resultant signal to picture data corresponding to upper super-blocks in the extended super-blocks; and
    assigning the second division-resultant signal to picture data corresponding to lower super-blocks in the extended super-blocks.

4. A method of recording picture information, comprising the steps of:
    dividing input picture information into first and second division-resultant signals, the input picture information relating to a ratio of "4:2:2" among sampling frequencies for a Y signal, a Cr signal, and a Cb signal;
    generating Y-signal DCT blocks, Cr-signal DCT blocks, and Cb-signal DCT blocks from the first division-resultant signal;
    generating Y-signal DCT blocks, Cr-signal DCT blocks, and Cb-signal DCT blocks from the second division-resultant signal;
    generating dummy DCT blocks distinguishable from the Y-signal DCT blocks related to the first and second division-resultant signals;
    grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;
    grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;
    compressing the first modification-resultant signal into a first compression-resultant signal by DCT and variable length encoding while maintaining a data amount of the first compression-resultant signal per "n" macro-blocks at a fixed amount, where "n" denotes a given natural number;
    compressing the second modification-resultant signal into a second compression-resultant signal by DCT and variable length encoding while maintaining a data amount of the second compression-resultant signal per "n" macro-blocks at a fixed amount;
    recording the first compression-resultant signal on first alternate tracks of a recording medium; and
    recording the second compression-resultant signal on second alternate tracks of the recording medium.

5. A method according to claim 4, further comprising the steps of:
    providing super-blocks each having 9 macro-blocks in a horizontal direction of a frame by 3 macro-blocks in a vertical direction of the frame;
    providing extended super-blocks each having two super-blocks arranged along the vertical direction of the frame;
    assigning the first division-resultant signal to picture data corresponding to upper super-blocks in the extended super-blocks;
    assigning the second division-resultant signal to picture data corresponding to lower super-blocks in the extended super-blocks;
    providing video sectors each having five super-blocks; and
    assigning two video sectors to one track of the recording medium.

6. An apparatus for compressing picture information, comprising:

means for dividing input picture information into first and second division-resultant signals, the input picture information relating to a ratio of "4:2:2" among sampling frequencies for a Y signal, a Cr signal, and a Cb signal;

means for generating Y-signal DCT blocks, Cr-signal DCT blocks, and Cb-signal DCT blocks from the first division-resultant signal;

means for generating Y-signal DCT blocks, Cr-signal DCT blocks, and Cb-signal DCT blocks from the second division-resultant signal;

means for generating dummy DCT blocks distinguishable from the Y-signal DCT blocks related to the first and second division-resultant signals;

means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

means for compressing the first modification-resultant signal into a first compression-resultant signal by DCT and variable length encoding while maintaining a data amount of the first compression-resultant signal per "n" macro-blocks at a fixed amount, where "n" denotes a given natural number; and means for compressing the second modification-resultant signal into a second compression-resultant signal by DCT and variable length encoding while maintaining a data amount of the second compression-resultant signal per "n" macro-blocks at a fixed amount.

7. An apparatus for recording picture information, comprising:

means for dividing input picture information into first and second division-resultant signals, the input picture information relating to a ratio of "4:2:2" among sampling frequencies for a Y signal, a Cr signal, and a Cb signal;

means for generating Y-signal DCT blocks, Cr-signal DCT blocks, and Cb-signal DCT blocks from the first division-resultant signal;

means for generating Y-signal DCT blocks, Cr-signal DCT blocks, and Cb-signal DCT blocks from the second division-resultant signal;

means for generating dummy DCT blocks distinguishable from the Y-signal DCT blocks related to the first and second division5 resultant signals;

means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

means for compressing the first modification-resultant signal into a first compression-resultant signal by DCT and variable length encoding while maintaining a data amount of the first compression-resultant signal per "n" macro-blocks at a fixed amount, where "n" denotes a given natural number;

means for compressing the second modification-resultant signal into a second compression-resultant signal by DCT and variable length encoding while maintaining a data amount of the second compression-resultant signal per "n" macro-blocks at a fixed amount;

means for recording the first compression-resultant signal on first alternate tracks of a recording medium; and means for recording the second compression-resultant signal on second alternate tracks of the recording medium.

8. An apparatus for expanding picture information, comprising:

means for expanding a first input signal into a first expansion-resultant signal by variable length decoding and inverse DCT;

means for expanding a second input signal into a second expansion-resultant signal by variable length decoding and inverse DCT;

means for removing two dummy DCT blocks from each of macro-blocks each having two Y-signal DCT blocks, one Cr-signal DCT block, one Cb-signal DCT block, and two dummy DCT blocks represented by the first expansion-resultant signal, and for converting the first expansion-resultant signal into a first dummy-free signal;

means for removing two dummy DCT blocks from each of macro-blocks each having two Y-signal DCT blocks, one Cr-signal DCT block, one Cb-signal DCT block, and two dummy DCT blocks represented by the second expansion-resultant signal, and for converting the second expansion-resultant signal into a second dummy-free signal; and means for combining the first and second dummy-free signals into output picture information relating to a ratio of "4:2:2" among sampling frequencies for a Y signal, a Cr signal, and a Cb signal.

9. An apparatus for reproducing picture information, comprising:

means for reading out a first record signal from first alternate tracks on a recording medium;

means for reading out a second record signal from first alternate tracks on the recording medium;

means for expanding the first read-out record signal into a first expansion-resultant signal by variable length decoding and inverse DCT;

means for expanding the second read-out record signal into a second expansion-resultant signal by variable length decoding and inverse DCT;

means for removing two dummy DCT blocks from each of macro-blocks each having two Y-signal DCT blocks, one Cr-signal DCT block, one Cb-signal DCT block, and two dummy DCT blocks represented by the first expansion-resultant signal, and for converting the first expansion-resultant signal into a first dummy-free signal;

means for removing two dummy DCT blocks from each of macro-blocks each having two Y-signal DCT blocks, one Cr-signal DCT block, one Cb-signal DCT block, and two dummy DCT blocks represented by the second expansion-resultant signal, and for converting the second expansion-resultant signal into a second dummy-free signal; and means for combining the first and second dummy-free signals into output picture information relating to a ratio of "4:2:2" among sampling frequencies for a Y signal, a Cr signal, and a Cb signal.

10. A recording medium having tracks on which picture information is recorded by a method comprising the steps of:

dividing input picture information into first and second division-resultant signals, the input picture information relating to a ratio of "4:2:2" among sampling frequencies for a Y signal, a Cr signal, and a Cb signal;

generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal;

generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

compressing the first modification-resultant signal into a first compression-resultant signal by DCT and variable length encoding while maintaining a data amount of the first compression-resultant signal per "n" macro-blocks at a fixed amount, where "n" denotes a given natural number;

compressing the second modification-resultant signal into a second compression-resultant signal by DCT and variable length encoding while maintaining a data amount of the second compression-resultant signal per "n" macro-blocks at a fixed amount;

recording the first compression-resultant signal on first alternate tracks of the recording medium; and recording the second compression-resultant signal on second alternate tracks of the recording medium.

11. A recording medium according to claim 10 which has the tracks on which the picture information is recorded by the method further comprising the steps of:

providing super-blocks each having 9 macro-blocks in a horizontal direction of a frame by 3 macro-blocks in a vertical direction of the frame;

providing extended super-blocks each having two super-blocks arranged along the vertical direction of the frame;

assigning the first division-resultant signal to picture data corresponding to upper super-blocks in the extended super-blocks;

assigning the second division-resultant signal to picture data corresponding to lower super-blocks in the extended super-blocks;

providing video sectors each having five super-blocks; and assigning two video sectors to one track of the recording medium.

12. A method of compressing picture information, comprising the steps of:

dividing input picture information into first and second division-resultant signals, the input picture information relating to a ratio of "4:2:2" among sampling frequencies for a Y signal, a Cr signal, and a Cb signal;

generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal;

generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal, wherein two Y-signal DCT blocks in each of the macro-blocks related to the first modification-resultant signal correspond to two regions of a frame respectively, and said two regions adjoin each other in a horizontal direction of the frame, and wherein two Y-signal DCT blocks, one Cr-signal DCT block, and one Cb-signal DCT block in each of the macro-blocks related to the first modification-resultant signal correspond to a common region of a frame;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal, wherein two Y-signal DCT blocks in each of the macro-blocks related to the second modification-resultant signal correspond to two regions of a frame respectively, and said two regions adjoin each other in a horizontal direction of the frame, and wherein two Y-signal DCT blocks, one Cr-signal DCT block, and one Cb-signal DCT block in each of the macro-blocks related to the second modification-resultant signal correspond to a common region of a frame;

compressing the first modification-resultant signal into a first compression-resultant signal by DCT and variable length encoding while maintaining a data amount of the first compression-resultant signal per "n" macro-blocks at a fixed amount, where "n" denotes a given natural number; and compressing the second modification-resultant signal into a second compression-resultant signal by DCT and variable length encoding while maintaining a data amount of the second compression-resultant signal per "n" macro-blocks at a fixed amount.

13. A method according to claim 12, further comprising the steps of:
separating every frame represented by the input picture information into "m" horizontally-extending band-like areas, where "m" denotes a given natural number;
assigning the first division-resultant signal to first alternate horizontally-extending band-like areas;
assigning the second division-resultant signal to second alternate horizontally-extending band-like areas;
recording the first compression-resultant signal on first alternate tracks of a recording medium; and
recording the second compression-resultant signal on second alternate tracks of the recording medium.

14. A method of compressing picture information, comprising the steps of:
dividing input picture information into first and second division-resultant signals, the input picture information relating to a ratio of "4:2:2" among sampling frequencies for a Y signal, a Cr signal, and a Cb signal;
generating Y-signal DCT blocks, Cr-signal DCT blocks, and Cb-signal DCT blocks from the first division-resultant signal;
generating Y-signal DCT blocks, Cr-signal DCT blocks, and Cb-signal DCT blocks from the second division-resultant signal;
generating dummy DCT blocks distinguishable from the Y-signal DCT blocks related to the first and second division-resultant signals;
grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;
grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;
compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal;
compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal;
maintaining a data amount of the first compression-resultant signal per "n" macro-blocks at a fixed amount, where "n" denotes a given natural number; and
maintaining a data amount of the second compression-resultant signal per "n" macro-blocks at a fixed amount.

15. A recording medium having tracks on which picture information is recorded by a method comprising the steps of:
dividing input picture information into first and second division-resultant signals, the input picture information relating to a ratio of "4:2:2" among sampling frequencies for a Y signal, a Cr signal, and a Cb signal;
generating Y-signal DCT blocks, Cr-signal DCT blocks, and Cb-signal DCT blocks from the first division-resultant signal;
generating Y-signal DCT blocks, Cr-signal DCT blocks, and Cb-signal DCT blocks from the second division-resultant signal;
generating dummy DCT blocks distinguishable from the Y-signal DCT blocks related to the first and second division-resultant signals;
grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;
grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;
compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal;
compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal;
maintaining a data amount of the first compression-resultant signal per "n" macro-blocks at a fixed amount, where "n" denotes a given natural number;
maintaining a data amount of the second compression-resultant signal per "n" macro-blocks at a fixed amount;
recording the first compression-resultant signal on first alternate tracks of the recording medium; and
recording the second compression-resultant signal on second alternate tracks of the recording medium.

16. In a system including at least first and second data compressors each for picture information relating to a ratio of one of "4:1:1" and "4:2:0" among sampling frequencies of a Y signal, a Cr signal, and a Cb signal, a method of compressing picture information, comprising the steps of:
dividing input picture information into first and second division-resultant signals, the input picture information relating to a ratio of "4:2:2" among sampling frequencies for a Y signal, a Cr signal, and a Cb signal;

generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal;

generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal, wherein said dummy DCT blocks in each macro-block cause the first modification-resultant signal to relate to a ratio of one of "4:1:1" and "4:2:0" among sampling frequencies of a Y signal, a Cr signal, and a Cb signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal, wherein said dummy DCT blocks in each macro-block cause the second modification-resultant signal to relate to a ratio of one of "4:1:1" and "4:2:0" among sampling frequencies of a Y signal, a Cr signal, and a Cb signal;

compressing the first modification-resultant signal by the first data compressor; and compressing the second modification-resultant signal by the second data compressor.

17. A method of compressing picture information, comprising the steps of:

dividing first input picture information into first and second division-resultant signals, the first input picture information relating to a ratio of "4:2:2" among sampling frequencies for a Y signal, a Cr signal, and a Cb signal;

generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal;

generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal;

generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

grouping the Y-signal DCT blocks, the Cr-signal DCT blocks, and the Cb-signal DCT blocks related to the second input picture information into macro-blocks each having four Y-signal DCT blocks, one Cr-signal DCT block, and one Cb-signal DCT block;

grouping the Y-signal DCT blocks, the Cr-signal DCT blocks, and the Cb-signal DCT blocks related to the third input picture information into macro-blocks each having four Y-signal DCT blocks, one Cr-signal DCT block, and one Cb-signal DCT block;

compressing one of the first modification-resultant signal and the second input picture information into a first compression-resultant signal by DCT and variable length encoding while maintaining a data amount of the first compression-resultant signal per "n" macro-blocks at a fixed amount, where "n" denotes a given natural number; and compressing one of the second modification-resultant signal and the third input picture information into a second compression-resultant signal by DCT and variable length encoding while maintaining a data amount of the second compression-resultant signal per "n" macro-blocks at a fixed amount.

18. A method according to claim 17, wherein each of the dummy DCT blocks has AC-coefficient data pieces all being "0".

19. A method according to claim 17, further comprising the steps of:

providing super-blocks each having 9 macro-blocks in a horizontal direction of a frame by 3 macro-blocks in a vertical direction of the frame;

providing extended super-blocks each having two super-blocks arranged along the vertical direction of the frame;

assigning one of the first division-resultant signal and the second input picture information to picture data corresponding to upper super-blocks in the extended super-blocks; and assigning one of the second division-resultant signal and the third input picture information to picture data corresponding to lower super-blocks in the extended super-blocks.

20. In a system including at least first and second data compressors each for picture information relating to a ratio of one of "4:1:1" and "4:2:0" among sampling frequencies of a Y signal, a Cr signal, and a Cb signal, a method of recording picture information, comprising the steps of:

dividing first input picture information into first and second division-resultant signals, the first input picture information relating to a ratio of "4:2:2" among sampling frequencies for a Y signal, a Cr signal, and a Cb signal;

generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal;

generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal;

generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

compressing one of the first modification-resultant signal and the second input picture information into a first compression-resultant signal by the first data compressor;

compressing one of the second modification-resultant signal and the third input picture information into a second compression-resultant signal by the second data compressor;

recording the first compression-resultant signal on a recording medium; and recording the second compression-resultant signal on the recording medium.

21. An apparatus for compressing picture information, comprising:

means for dividing first input picture information into first and second division-resultant signals, the first input picture information relating to a ratio of "4:2:2" among sampling frequencies for a Y signal, a Cr signal, and a Cb signal;

means for generating Y-signal DCT blocks, Cr-signal DCT blocks, and Cb-signal DCT blocks from one of the first division-resultant signal and second input picture information, the second input picture information relating to a ratio of one of "4:1:1" and "4:2:0" among sampling frequencies for a Y signal, a Cr signal, and a Cb signal;

means for generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal;

means for generating dummy DCT blocks distinguishable from the Y-signal DCT blocks related to the first and second division-resultant signals;

means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

means for compressing one of the first modification-resultant signal and the second input picture information into a first compression-resultant signal by DCT and variable length encoding while maintaining a data amount of the first compression-resultant signal per "n" macro-blocks at a fixed amount, where "n" denotes a given natural number; and means for compressing one of the second modification-resultant signal and the third input picture information into a second compression-resultant signal by DCT and variable length encoding while maintaining a data amount of the second compression-resultant signal per "n" macro-blocks at a fixed amount.

22. An apparatus for recording picture information, comprising:

means for dividing first input picture information into first and second division-resultant signals, the first input picture information relating to a ratio of "4:2:2" among sampling frequencies for a Y signal, a Cr signal, and a Cb signal;

means for generating Y-signal DCT blocks, Cr-signal DCT blocks, and Cb-signal DCT blocks from one of the first division5 resultant signal and second input picture information, the second input picture information relating to a ratio of one of "4:1:1" and "4:2:0" among sampling frequencies for a Y signal, a Cr signal, and a Cb signal;

means for generating Y-signal DCT blocks, Cr-signal DCT blocks, and Cb-signal DCT blocks from one of the second division-resultant signal and third input picture information, the third input picture information relating to a ratio of one of "4:1:1" and "4:2:0" among sampling frequencies for a Y signal, a Cr signal, and a Cb signal;

means for generating dummy DCT blocks distinguishable from the Y-signal DCT blocks related to the first and second division-resultant signals;

means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

means for compressing one of the first modification-resultant signal and the second input picture information into a first compression-resultant signal by DCT and variable length encoding while maintaining a data amount of the first compression-resultant signal per "n" macro-blocks at a fixed amount, where "n" denotes a given natural number;

means for compressing one of the second modification-resultant signal and the third input picture information into a second compression-resultant signal by DCT and variable length encoding while maintaining a data amount of the second compression-resultant signal per "n" macro-blocks at a fixed amount;

means for recording the first compression-resultant signal on a recording medium; and means for recording the second compression-resultant signal on the recording medium.

23. An apparatus for reproducing picture information, comprising:

means for expanding a first input signal into a first expansion-resultant signal by variable length decoding and inverse DCT;

means for expanding a second input signal into a second expansion-resultant signal by variable length decoding and inverse DCT;

means for, when each of macro-blocks represented by the first expansion-resultant signal contains dummy DCT blocks, removing said dummy DCT blocks from each of said macro-blocks to convert the first expansion-resultant signal into a first dummy-free signal;

means for, when each of macro-blocks represented by the second expansion-resultant signal contains dummy DCT blocks, removing said dummy DCT blocks from each of said macro-blocks to convert the second expansion-resultant signal into a second dummy-free signal;

means for combining the first and second dummy-free signals into first output picture information relating to a ratio of "4:2:2" among sampling frequencies for a Y signal, a Cr signal, and a Cb signal;

means for, when each of macro-blocks represented by the first and second expansion-resultant signal does not contain any dummy DCT blocks, using the first and second expansion-resultant signals as second output picture information and third output picture information each relating to a ratio of one of "4:1:1" and "4:2:0" among sampling frequencies for a Y signal, a Cr signal, and a Cb signal; and means for selecting either the first output picture information or a pair of the second output picture information and the third output picture information as an output signal.

24. An apparatus for compressing picture information, comprising:

means for dividing first input picture information into first and second division-resultant signals having segments corresponding to respective DCT blocks, the first input picture information relating to a ratio of "4:2:2" among sampling frequencies for a Y signal, a Cr signal, and a Cb signal;

means for generating DCT blocks from second input picture information, the second input picture information relating to a ratio of one of "4:1:1" and "4:2:0" among sampling frequencies for a Y signal, a Cr signal, and a Cb signal;

means for grouping the DCT blocks related to one of the first division-resultant signal and the second input picture information into macro-blocks each having a given number of DCT blocks;

means for grouping the DCT blocks related to the second division-resultant signal into macro-blocks each having the given number of DCT blocks;

means for compressing one of the first division-resultant signal and the second input picture information into a first compression-resultant signal by DCT and variable length encoding while maintaining a data amount of the first compression-resultant signal per "n" macro-blocks at a fixed amount, where "n" denotes a given natural number; and means for compressing the second division-resultant signal into a second compression-resultant signal by DCT and variable length encoding while maintaining a data amount of the second compression-resultant signal per "n" macro-blocks at a fixed amount.

25. A method of compressing picture information, comprising the steps of:

dividing input picture information into first second division-resultant signals, the input picture information relating to a ratio of "4:2:2" among sampling frequencies for a Y-signal, a Cr-signal, and a Cb-signal;

generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal; generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

compressing the first modification-resultant signal into a first compression-resultant signal by DCT and variable length encoding while maintaining a data amount of the first compression-resultant signal per "n" macro-blocks at a fixed amount, where "n" denotes a given natural number; compressing the second modification-resultant signal into a second compression-resultant signal by DCT and variable length encoding while maintaining a data amount of the second compression-resultant signal per "n" macro-blocks at a fixed amount; and placing helper information in a first predetermined area in the dummy DCT blocks, the first predetermined area corresponding to a second predetermined area in the Y-signal DCT blocks, the Cr-signal DCT blocks, and the Cb-signal DCT blocks, the second predetermined area storing information representing one of (1) a DC coefficient and (2) a DCT property.

26. A method according to claim 25, wherein the helper information in the dummy DCT blocks related to the first modification-resultant signal contains interpolation information for recovery of the second division-resultant signal, and the helper information in the dummy DCT blocks related to the second modification-resultant signal contains interpolation information for recovery of the first division-resultant signal.

27. A method of recording picture information, comprising the steps of:

dividing input picture information into first and second division-resultant signals, the input picture information relating to a ratio of "4:2:2" among sampling frequencies for a Y-signal, a Cr-signal, and a Cb signal;

generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal;

generating dummy DCT blocks distinguishable from the Y-signal DCT blocks related to the first second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first-division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

compressing the first modification-resultant signal into a first compression-resultant signal by DCT and variable length encoding while maintaining a data amount of the first compression-resultant signal per "n" macro-blocks at a fixed amount, where "n" denotes a given natural number;

compressing the second modification-resultant signal into a second compression-resultant signal by DCT and variable length encoding while maintaining a data amount of the second compression-resultant signal per "n" macro-blocks at a fixed amount;

placing helper information in a first predetermined area in the dummy DCT blocks, the first predetermined area corresponding to a second predetermined area in the Y-signal DCT blocks, the Cr-signal DCT blocks, and the Cb-signal DCT blocks, the second predetermined area storing information representing one of (1) a DC coefficient and (2) a DCT property, wherein the helper information in the dummy DCT blocks related to the first modification-resultant signal contains interpolation information for recovery of the second division-resultant signal, and the helper information in the dummy DCT blocks related to the second modification-resultant signal contains interpolation information for recovery of the first division-resultant signal; and recording the first and second compression-resultant signals on separate regions of a recording medium, respectively.

28. An apparatus for compressing picture information, comprising means for dividing input picture information into first and second division-resultant signals, the input picture information relating to a ratio of "4:2:2" among sampling frequencies for a Y-signal, a Cr-signal, and-signal;

means for generating Y-signal DCT blocks, Cr-signal DCT blocks, and Cb-signal DCT blocks from the first division-resultant signal;

means for generating Y-signal DCT blocks, Cr-signal DCT blocks, and Cb-signal DCT blocks from the second division-resultant signal;

means for generating dummy DCT blocks distinguishable from the Y-signal DCT blocks related to the first and second division-resultant signals;

means for grouping the Y-signal DCT blocks, the Cr-signal DCT blocks, and the Cb-signal DCT blocks related to the first division-resultant signal, and the dummy DCT blocks into macro-blocks each having two, Y-signal DCT blocks, one Cr-signal DCT block, one Cb-signal DCT block, and two dummy DCT blocks to modify the first division-resultant signal into a first modification-resultant signal;

means for grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

means for compressing the first modification-resultant signal into a first compression-resultant signal by DCT and variable length encoding while maintaining a data amount of the first compression-resultant signal per "n" macro-blocks at a fixed amount, where "n" denotes a given natural number;

means for compressing the second modification-resultant signal into a second compression-resultant signal by DCT and variable length encoding while maintaining a data amount of the second compression-resultant signal per "n" macro-blocks at a fixed amount; and means for placing helper information in a first predetermined area in the dummy DCT blocks, the first predetermined area corresponding to a second predetermined area in the Y-signal DCT blocks, the Cr-signal DCT blocks, and the Cb-signal DCT blocks, the second predetermined area storing information representing one of (1) a DC coefficient and (2) a DCT property.

29. An apparatus for recording picture information, comprising:

means for dividing input picture information into first and second division-resultant signals, the input picture information relating to a ratio of "4:2:2" among sampling frequencies for a Y-signal, a Cr-signal, and a Cb-signal;

means for generating Y-signal DCT blocks, Cr-signal DCT blocks, and Cb-signal DCT blocks from the first division-resultant signal;

means for generating Y-signal DCT blocks, Cr-signal DCT blocks, and Cb-signal DCT blocks from the second division-resultant signal;

means for generating dummy DCT blocks distinguishable from the Y-signal DCT blocks related to the first and second division-resultant signals;

means for grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

means for grouping the Y-signal DCT blocks, the Cr-signal DCT blocks, and the Cb-signal DCT blocks related to the second division resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal; means for compressing the first modification-resultant signal into a first compression-resultant signal by DCT and variable length encoding while maintaining a data amount of the first compression-resultant signal per "n" macro-blocks at a fixed amount, where "n" denotes a given natural number;

means for compressing the second modification-resultant signal into a second compression-resultant signal by DCT and variable length encoding while maintaining a data amount of the second compression-resultant signal per "n" macro-blocks at a fixed amount;

means for placing helper information in a first predetermined area in the dummy DCT blocks, the first predetermined area corresponding to a second predetermined area in the Y-signal DCT blocks, the Cr-signal DCT blocks and the Cb-signal DCT blocks, the second predetermined area storing information representing one of (1) a DC coefficient and (2) a DCT property;

means for recording the first compression-resultant signal on first alternate tracks of a recording medium; and means for recording the second compression-resultant signal on second alternate tracks of the recording medium.

30. An apparatus according to claim 29, wherein the helper information in the dummy DCT blocks related to the first modification-resultant signal contains interpolation information for recovery of the second division-resultant signal, and the helper information in the dummy DCT blocks related to the second modification-resultant signal contains interpolation information for recovery of the first division-resultant signal.

31. An apparatus for reproducing picture information, comprising:

means for reading out a first record signal from first alternate tracks on a recording medium;

means for reading out a second record signal from second alternate tracks on the recording medium;

means for expanding the first read-out record signal into a first expansion-resultant signal by variable length decoding and inverse DCT;

means for expanding the second read-out record signal into a second expansion-resultant signal by variable length decoding and inverse DCT;

means for extracting first helper information for the second record signal from first predetermined areas within dummy DCT blocks represented by the first read-out record signal, said first predetermined areas corresponding to second predetermined areas within Y-signal DCT blocks, Cr-signal DCT blocks, and Cb-signal DCT blocks, said second predetermined areas storing information representing one of (1) DC coefficients and (2) DCT properties;

means for extracting second helper information for the first record signal from first predetermined areas within dummy DCT blocks represented by the second read-out record signal, said first predetermined areas corresponding to second predetermined areas within Y-signal DCT blocks, Cr-signal DCT blocks, and Cb-signal DCT blocks, said second predetermined areas storing information representing one of (1) DC coefficients and (2) DCT properties;

means for removing two dummy DCT blocks from each of macro-blocks each having two Y-signal DCT blocks, one Cr-signal DCT block, one Cb-signal DCT block, and two dummy DCT blocks represented by the first expansion-resultant signal, and for converting the first expansion-resultant signal into a first dummy-free signal;

means for removing two dummy DCT blocks from each of macro-blocks each having two Y-signal DCT blocks, one Cr-signal DCT block, one Cb-signal DCT block, and two dummy DCT blocks represented by the second expansion-resultant signal, and for converting the second expansion-resultant signal into a second dummy-free signal; and means for combining the first and second dummy-free signals into output picture information relating to a ratio of "4:2:2" among sampling frequencies for a Y signal, a Cr signal, and a Cb signal.

32. A method of compressing picture information, comprising the steps of:

dividing input picture information into first and second division-resultant signals, the input picture information relating to a ratio of "4:2:2" among sampling frequencies for a Y-signal, a Cr-signal, and a Cb-signal;

generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal, generating dummy DCT blocks distinguishable from the Y-signal DCT blocks related to the first and second division-resultant signals, grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

compressing segments of the first modification-resultant signal which represent AC coefficients in two Y-signal DCT blocks, one Cr-signal DCT block, one Cb-signal DCT block, and two dummy DCT blocks in every macro-block by variable length encoding to compress the first modification-resultant signal into a first compression-resultant signal;

compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal;

maintaining a data amount of the first compression-resultant signal per "n" macro-blocks at a fixed amount, where "n" denotes a given natural number;

maintaining a data amount of the second compression-resultant signal per "n" macro-blocks at a fixed amount; and placing helper information in first predetermined areas within the dummy DCT blocks, the first predetermined area corresponding to second predetermined areas within the Y-signal DCT blocks, the Cr-signal DCT blocks, and the Cb-signal DCT blocks, the second predetermined areas storing information representing one of (1) DC coefficients and (2) DCT properties.

33. A recording medium having tracks on which picture information is recorded by a method comprising the steps of:

dividing input picture information into first and second division-resultant signals, the input picture information relating to a ratio of "4:2:2" among sampling frequencies for a Y-signal, a Cr-signal, and a Cb-signal; generating Y-signal DCT blocks, Cr-signal DCT blocks, and Cb-signal DCT blocks from the first division-resultant signal;

generating Y-signal DCT blocks, Cr-signal DCT blocks, and Cb-signal DCT blocks from the second division-resultant signal;

generating dummy DCT blocks distinguishable from the Y-signal DCT blocks related to the first and second division-resultant signals;

grouping the Y-signal DCT blocks, the Cr-signal DCT blocks, and the Cb-signal DCT blocks related to the first division-resultant signal, and the dummy DCT blocks into macro-blocks each having two Y-signal DCT blocks, one Cr-signal DCT block, one Cb-signal DCT block, and two dummy DCT blocks to modify the first division-resultant signal into a first modification-resultant signal;

grouping the Y-signal DCT blocks, the Cr-signal DCT blocks, and the Cb-signal DCT blocks related to the second division-resultant signal, and the dummy DCT blocks into macro-blocks each having two Y-signal DCT blocks, one Cr-signal DCT block, one Cb-signal DCT block, and two dummy DCT blocks to modify the second division-resultant signal into a second modification-resultant signal;

compressing segments of the first modification-resultant signal which represent AC coefficients in two Y-signal DCT blocks, one Cr-signal DCT block, one Cb-signal DCT block, and two dummy DCT blocks in every macro-block by variable length encoding to 5 compress the first modification-resultant signal into a first compression-resultant signal;

compressing segments of the second modification-resultant signal which represent DCT coefficients in two Y-signal DCT blocks, one Cr-signal DCT block, one Cb-signal DCT block, and two dummy DCT blocks in every macro-block by variable length encoding to compress the second modification-resultant signal into a second compression-resultant signal;

maintaining a data amount of the first compression-resultant signal per "n" macro-blocks at a fixed amount, where "n" denotes a given natural number;

maintaining a data amount of the second compression-resultant signal per "n" macro-blocks at a fixed amount;

placing helper information in first predetermined areas within the dummy DCT blocks, the first predetermined areas corresponding to second predetermined areas within the Y-signal DCT blocks, the Cr-signal DCT blocks, and the Cb-signal DCT blocks, the second predetermined areas storing information representing one of (1) DC coefficients and (2) DCT properties;

recording the first compression-resultant signal on first alternate tracks of the recording medium; and recording the second compression-resultant signal on second alternate tracks of the recording medium.

34. A method of compressing picture information, comprising the steps of:

dividing N-channel input picture information into a first N-channel division-resultant signal and a second N-channel division resultant signal, the N-channel input picture information relating to a ratio of "4:2:2" among sampling frequencies for a Y signal, a Cr signal, and a Cb signal, wherein N denotes a predetermined natural number greater than "1";

generating dummy DCT blocks distinguishable from Y-signal DCT blocks related to the first and second N-channel division-resultant signals;

adding the dummy DCT blocks to the first and second N-channel division-resultant signals to generate a first N-channel picture signal and a second N-channel picture signal which relate to a ratio of one of "4:1:1" and "4:2:0" among sampling frequencies for a Y signal, a Cr signal, and a Cb signal;

compressing the first N-channel picture signal into a first N-channel compression-resultant signal by DOT and variable length encoding; and compressing the second N-channel picture signal into a second N-channel compression-resultant signal by DCT and variable length encoding.

35. A method according to claim 34, wherein the predetermined natural number N is equal to 2.

36. A combination of a method arid an apparatus, the method comprising the steps of:

dividing N-channel input picture information into a first N-channel division-resultant signal and a second N-channel division-resultant signal, the N-channel input picture information relating to a ratio of "4:2:2" among sampling frequencies for a Y signal, a Cr signal, and a Cb signal, wherein N denotes a predetermined natural number greater than "1";

generating dummy DCT blocks distinguishable from Y-signal DCT blocks related to the first and second N-channel division-resultant signals;

adding the dummy DCT blocks to the first and second N-channel division-resultant signals to generate a first N-channel picture signal and a second N-channel picture signal which relate to a ratio of one of "4:1:1" and "4:2:0" among sampling frequencies for a Y signal, a Cr signal, and a Cb signal;

compressing the first N-channel picture signal into a first N-channel compression-resultant signal by DCT and variable length encoding; and compressing the second N-channel picture signal into a second N-channel compression-resultant signal by DCT and variable length encoding;

the apparatus comprising:

first means for resuming the first N-channel compression resultant signal into the first N-channel picture signal by variable length decoding and inverse DCT;

second means for resuming the second N-channel compression resultant signal into the second N-channel picture signal by variable length decoding and inverse DCT;

third means for removing the dummy DCT blocks from the first and second N-channel picture signals generated by the first and second means to recover the first and second N-channel division-resultant signals;

fourth means for combining the first and second N-channel division-resultant signals generated by the third means into an original N-channel picture information equal to the N-channel input picture information; and fifth means for selecting one from among the original N-channel picture information generated by the fourth means and a set of the first N-channel picture signal and the second N-channel picture signal equal to $2\mu$.

37. A combination of a method and an apparatus according to claim 36, wherein the predetermined natural number N is equal to 2.

* * * * *